(12) United States Patent
Nitta et al.

(10) Patent No.: US 7,113,163 B2
(45) Date of Patent: Sep. 26, 2006

(54) LIQUID CRYSTAL DISPLAY APPARATUS

(75) Inventors: Hiroyuki Nitta, Fujisawa (JP); Takeshi Maeda, Yokosuka (JP); Kazuyoshi Kawabe, Fujisawa (JP); Junichi Hirakata, Chiba (JP)

(73) Assignees: Hitachi, Ltd., Tokyo (JP); Hitachi Video and Information System, Inc., Yokohama (JP)

( * ) Notice: Subject to any disclaimer, the term of this patent is extended or adjusted under 35 U.S.C. 154(b) by 775 days.

(21) Appl. No.: 09/888,641

(22) Filed: Jun. 26, 2001

(65) Prior Publication Data

US 2002/0057238 A1   May 16, 2002

(30) Foreign Application Priority Data

Sep. 8, 2000 (JP) ............................. 2000-278672
Dec. 8, 2000 (JP) ............................. 2000-379779

(51) Int. Cl.
*G09G 3/36* (2006.01)
(52) U.S. Cl. ........................... 345/102; 345/84; 345/88
(58) Field of Classification Search .................. 345/87, 345/88, 89, 102, 98, 100, 99, 94, 95, 96, 345/97, 84; 349/61, 68, 69, 70
See application file for complete search history.

(56) References Cited

U.S. PATENT DOCUMENTS

| | | | | |
|---|---|---|---|---|
| 4,907,862 A | * | 3/1990 | Suntola ....................... | 349/61 |
| 5,461,397 A | | 10/1995 | Zhang et al. | |
| 5,731,794 A | | 3/1998 | Miyazawa | |
| 5,844,540 A | | 12/1998 | Terasaki | |
| 5,912,651 A | | 6/1999 | Bitzakidis et al. | |
| 5,995,070 A | * | 11/1999 | Kitada .......................... | 345/83 |
| 6,039,255 A | * | 3/2000 | Seo ....................... | 235/462.35 |
| 6,081,254 A | * | 6/2000 | Tanaka et al. .............. | 382/167 |
| 6,300,931 B1 | * | 10/2001 | Someya et al. ............. | 345/102 |
| 6,429,839 B1 | * | 8/2002 | Sakamoto ..................... | 345/87 |
| 6,456,266 B1 | | 9/2002 | Iba et al. | |
| 6,570,554 B1 | * | 5/2003 | Makino et al. ............. | 345/102 |
| 6,573,882 B1 | * | 6/2003 | Takabayashi ............... | 345/102 |
| 6,661,470 B1 | | 12/2003 | Kawakami et al. | |
| 2001/0043179 A1 | * | 11/2001 | Yoshinaga et al. ............ | 345/87 |
| 2001/0052891 A1 | * | 12/2001 | Yoshihara et al. .......... | 345/102 |
| 2002/0000960 A1 | | 1/2002 | Yoshihara et al. | |
| 2002/0008694 A1 | | 1/2002 | Miyachi et al. | |

FOREIGN PATENT DOCUMENTS

EP     0 668 701 A1    8/1995

(Continued)

*Primary Examiner*—Richard Hjerpe
*Assistant Examiner*—Jean Lesperance
(74) *Attorney, Agent, or Firm*—Antonelli, Terry, Stout and Kraus, LLP.

(57) ABSTRACT

The present invention includes a panel on which a plurality of pixels are located, a light-source for visualizing an image displayed on the plurality of pixels, a controlling circuit for controlling the light-source, and an image-signal tone characteristic controlling circuit. Moreover, the light-source controlling circuit has a function of repeating a period. Here, the period includes a 1st time-period during which an electric current having a 1st intensity is fed to the light-source, and a 2nd time-period during which an electric current having a 2nd intensity differing from the 1st intensity is fed to the light-source. The light-source controlling circuit controls the 1st time-period and the 2nd time-period in accordance with display information. Also, in accordance with the display information as well, the tone characteristic controlling circuit is controlled so that the excellent contrast will be always available.

8 Claims, 46 Drawing Sheets

FOREIGN PATENT DOCUMENTS

| | | |
|---|---|---|
| JP | 63-318524 | 12/1988 |
| JP | 6-160811 | 6/1994 |
| JP | 7-281647 | 10/1995 |
| JP | 9-244548 | 9/1997 |
| JP | 10-187127 | 7/1998 |
| JP | 11-65531 | 3/1999 |
| JP | 11-202285 | 7/1999 |
| JP | 11-202286 | 7/1999 |
| JP | 11-231832 | 8/1999 |
| JP | 2000-19487 | 1/2000 |
| JP | 2000-221469 | 8/2000 |
| JP | 2002-72988 | 3/2002 |
| WO | WO 97/31359 | 8/1997 |

* cited by examiner

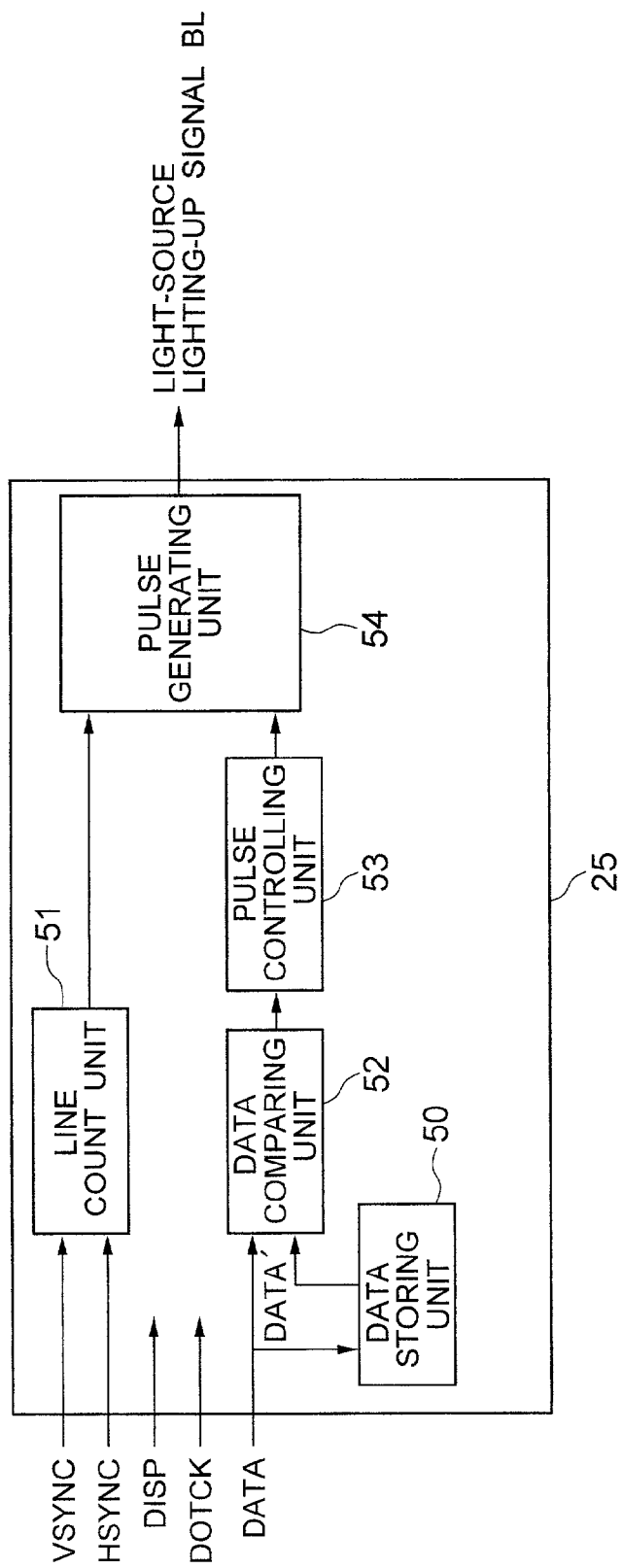

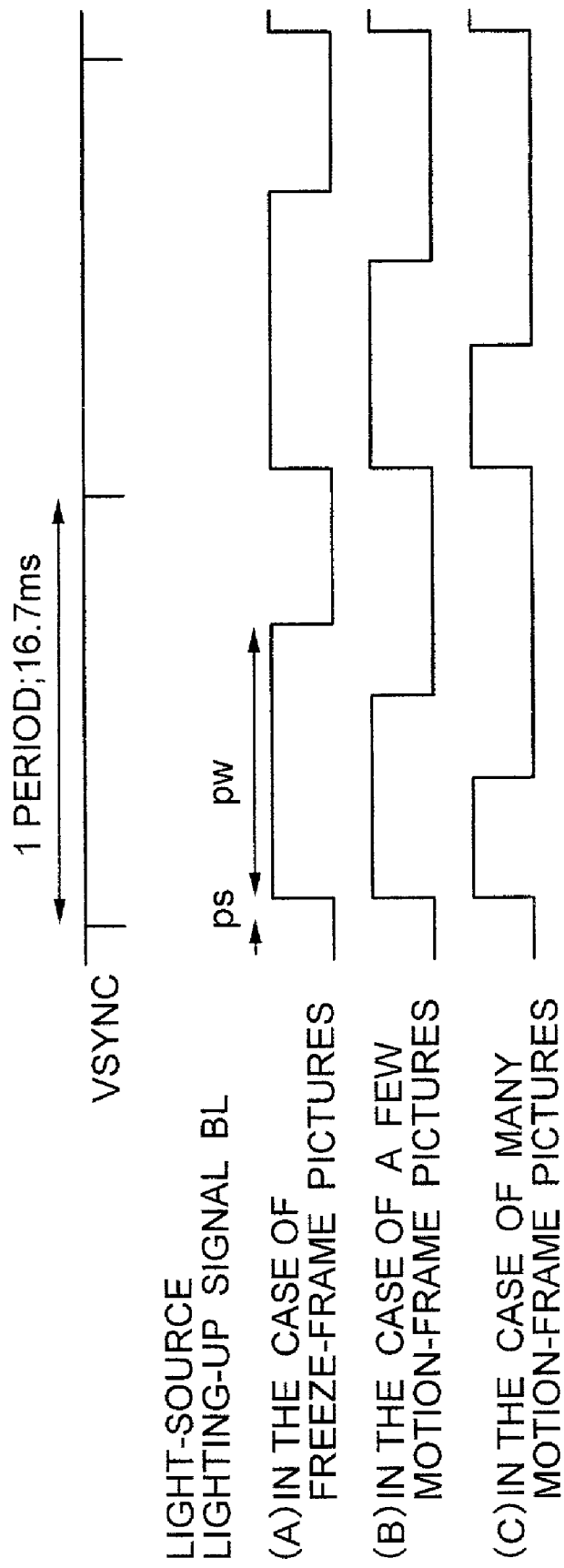

HOLD TYPE
LIGHT-EMISSION
IN THE PRIOR ART

FIG. 20A

SYNCHRONIZATION
SIGNAL : VSYNC

LIGHT-SOURCE
WAVEFORM
(HOLD TYPE)

LIQUID CRYSTAL
RESPONSE
WAVEFORM

TRANSITION TONE IS
DISPLAYED → DISPLAY
BLUR EXISTS

IMPULSE TYPE LIGHT-EMISSION
IN THE PRESENT DEVELOPMENT

FIG. 20B

SYNCHRONIZATION
SIGNAL:VSYNC

LIGHT-SOURCE
WAVEFORM
(HOLD TYPE)

LIQUID CRYSTAL
RESPONSE
WAVEFORM

NO TRANSITION TONE IS
DISPLAYED → NO DISPLAY
BLUR EXISTS

DISPLAY   DETECTION
SCREEN    POINTS

DISPLAY   DETECTION
SCREEN    POINTS

LIQUID CRYSTAL DISPLAY APPARATUS

BACKGROUND OF THE INVENTION

1. Field of the Invention

The present invention relates to a display apparatus using a liquid crystal display device, an electroluminescence device, or the like. More particularly, it relates to a display apparatus having a light-source that is suitable for enhancing the luminance of the display screen with a high-efficiency and for making the luminance uniform on the display screen.

2. Description of the Related Art

The display apparatus, which uses the liquid crystal display device (which is also referred to as "liquid crystal display panel"), the electroluminescence device (which, depending on a fluorescent material used, is classified into an organic-family and an inorganic-family and, hereinafter, is referred to as "EL device"), a field emission device (which, hereinafter, is referred to as "FE device"), or the like, performs the image display. However, unlike the case of a Braun tube (which, hereinafter, is referred to as "CRT", i.e., "cathode ray tube"), the display apparatus performs the image display under a condition that there is provided no space for 2-dimensionally scanning an electron beam on the back side of the display screen. Accordingly, as compared with the CRT, these display apparatuses have characteristics of being thinner and lighter-weighted, operating with a lower power consumption, and so on. These display apparatuses, in some cases, are referred to as "flat panel displays" from the characteristics in their outward appearance.

From the above-described advantages over the CRT, the display apparatus using the liquid crystal display device, the EL device, the FE device, or the like is becoming widely prevalent in various types of uses in substitution for a display apparatus using the CRT. In the background to this situation, there exist the technical innovations such as an enhancement in the picture-quality of the liquid crystal display device, the EL device, or the like. Meanwhile, in recent years, the prevalence of the multimedia and the Internet has been increasing a demand for the motion-frame picture display. As a result, in the display apparatus using the liquid crystal display device, improvements based on the liquid crystal material and the driving method are being made in order to implement the motion-frame picture display. Being not limited to the liquid crystal display apparatus, however, in the display apparatuses referred to as the flat panel displays, the implementation of a higher luminance for displaying an image comparable to that of the conventional CRT has also become an important problem.

In order to obtain the image comparable to that of the conventional CRT, an impulse type light-emission is of absolute necessity. In the impulse type light-emission, each pixel is scanned with an electron beam emitted from an electron gun, thereby causing a fluorescent substance in each pixel to perform the light-emission.

In contrast to this, the liquid crystal display apparatus, for example, employs a hold type light-emission where a light-source unit including a fluorescent lamp is used. On account of this, it has been regarded as difficult for the display apparatus to implement the complete motion-frame picture display.

SUMMARY OF THE INVENTION

As the technology for solving the above-described problems related to the liquid crystal display apparatus, the following has been reported: A method of making improvements in the liquid crystal material or in the display mode of liquid crystal cells (i.e., a liquid crystal layer sealed between the boards), and of using a directly-under type light-source unit (i.e., a light-source structure where a plurality of fluorescent lamps are located in a manner of being opposed to the display screen of the liquid crystal display device) as the light-source. FIG. 16 is a diagram for illustrating the result that the present inventor has obtained by analyzing an example of a lighting-up operation method for the directly-under type light-source unit, the example having been proposed for the motion-frame picture display. The diagram illustrates the layout of the directly-under type light-source unit where 8 tube-shaped fluorescent lamps are located in a manner of being opposed to the display screen (the dashed-line frame), and, as the luminance waveforms, timings of the respective lighting-up starting times for the respective lamps. The luminance waveforms illustrated in FIG. 16 indicate that the luminances are enhanced when the luminance waveforms become convex in an upward direction in the drawing. As clearly seen from FIG. 16, the lighting-up starting times for the respective fluorescent tubes are shifted in sequence from the starting times located on the upper side to the starting times located on the lower side. This sequential lighting-up operation, which is synchronized with a scanning period of an image display signal, has been repeated on the basis of a 1-frame image display time-period (i.e., a time-period during which the display signal is transferred to all the pixels on the display screen). (Refer to "Liquid Crystal", Vol. 3, No. 2 (1999), pp. 99–106).

On the other hand, there exists a technology by which the luminance of the light-source is modulated in correspondence with the scene of a motion-frame picture signal transmitted to the liquid crystal display apparatus. This technology allows the following operation: Reading out maximum luminance data, minimum luminance data, and average luminance data of the display signal transmitted to the liquid crystal display apparatus for each image included in the motion-frame picture signal, and, in correspondence with these data, controlling an electric current (hereinafter, referred to as "lamp current") that is to be fed to the light-source. Assuming that the lamp current is usually equal to a reference current (e.g., 4.5 mA), in the case of an image that is bright as a whole, the lamp current is set to be higher (e.g., 8 mA) than the reference current during a certain time-period, afterwards being restored back to the reference current. Conversely, in the case of an image that is dark as a whole, the lamp current is set to be lower (e.g., 1.5 mA) than the reference current. (Refer to "Nikkei Electronics", No. 757, Sep. 15, 1999, pp. 139–146).

This setting, in the former case (i.e., the image that is bright as a whole), feeds to the light-source the lamp current that is higher than the reference current, thereby resulting in a temperature increase in the light-source which is larger by the amount of feeding the higher lamp current. In the case of the fluorescent lamps, the temperature increase raises the mercury (Hg) vapor pressures inside the fluorescent lamps, thereby increasing the number of mercury atoms (i.e., mercury vapor quantity) inside the fluorescent lamps. Meanwhile, if there exist surplus mercury atoms inside the fluorescent lamps, the surplus mercury atoms heighten a probability that ultraviolet rays generated inside the fluorescent lamps by the collision between the mercury atoms and the electrons are absorbed into the mercury atoms, eventually decreasing the luminances of the fluorescent lamps themselves. In order to avoid this influence, after having set the lamp current to be higher than the above-described reference current during the above-described time-period, the lamp current is restored back to the reference current before the mercury vapor pressures inside the fluorescent lamps are altered. Changing the lamp current in this way makes the luminances of the fluorescent lamps higher than those of the fluorescent lamps at the time when the reference current is fed thereto. Also, in the latter case (i.e., the image that is dark as a whole), if the luminance of the light-source is high, it becomes required to suppress a slight leakage of the light from a pixel displaying black or a color close thereto. On the screen that is dark as a whole, even in a pixel the light-transmittance of which is set to be the highest within the screen, the absolute quantity of the light to be transmitted is small. On account of this, the lamp current is set to be lower than the reference current, thereby suppressing the luminance of the light-source so as to throttle the leakage of the light from the pixel displaying black or the color close thereto, and at the same time reducing the power consumption in the light-source.

From the combination of these two technologies, the dynamic range (i.e., the ratio of the maximum luminance/the minimum luminance) of the luminance in an image viewed in all the motion-frame pictures can be expanded up to 2.8 times as wide as the conventional dynamic range. Moreover, the contrast ratio thereof can be expanded up to 400~500:1, which is more than 2 times as high as that of the conventional liquid crystal display apparatus.

When the above-described technology of performing in sequence the lighting-up operation for the directly-under type light-source unit is executed in the liquid crystal display apparatus, for example, the number of the fluorescent lamps mounted on the directly-under type light-source unit is increased. This attempt shortens the light-emission times of the respective fluorescent lamps which are occupied during a 1-period (which is equivalent to the amount of 1 frame) lighting-up operation time-period. This eventually decreases the luminance efficiency of the directly-under type light-source unit as a whole.

Also, if the electric powers applied to the respective fluorescent lamps are increased in order to heighten the luminance of a displayed image, the resultant fever by the fluorescent lamps locally heats the liquid crystal cells, thereby reducing the uniformity as well.

The image display in the liquid crystal display apparatus is executed as follows: Liquid crystal molecules that are sealed into the liquid crystal cells of the liquid crystal display device mounted on the display apparatus are orientated in a direction corresponding to the image information (i.e., an electric field applied to the liquid crystal cells) so as to set the light-transmittances of the liquid crystal cells to be a desired value. For this purpose, it is desirable to maintain the viscosity within the liquid crystal cells at a proper value so that the liquid crystal molecules in the liquid crystal cells are securely orientated in the direction corresponding to the image information. Here, in some cases, a viscosity-increasing agent or a viscosity-decreasing agent, together with the liquid crystal molecules, is sealed into the liquid crystal cells. If, however, the temperatures of the liquid crystal cells are increased locally, the viscosity is lowered at this section. On account of this, the directions of a portion of the liquid crystal cells become random (equal-directing of the liquid crystal layer).

Consequently, only the liquid crystal cells at this section exhibit the light-transmittances not corresponding to the electric field applied to the liquid crystal molecules. This condition makes it difficult to raise, up to 300 cd/m$^2$ or higher, the display luminance by a transverse electric-field type liquid crystal display apparatus.

Also, when the above-described technology of adjusting the luminance of the light-source for each image included in the motion-frame picture signal is executed toward the liquid crystal display apparatus, from a practical standpoint, it is difficult to set the timing with which the lamp current, which is fed to the light-source at the time of displaying the image that is bright as a whole, is lowered from the value higher than the above-described reference current down to the reference current. As having been described earlier, in order to make the luminance of the light-source higher than the value at the time when the reference current is fed to the light-source, the lamp current that has been once set to be higher than the reference current must be restored back to the reference current before the mercury vapor pressures inside the fluorescent lamps are altered. However, the timing with which the lamp current is switched in this manner cannot help being set empirically in accordance with, for example, the correlation between measurement data of the temperature increase in the light-source (i.e., the fluorescent lamps) and the luminance of the light-source. Also, if the usage conditions for the display apparatus the examples of which include even a difference in the room temperature or the like should be taken into consideration, it is extremely difficult to set the timing with which the lamp current is switched. Furthermore, in this technology, since the light-source luminance at each image display point-in-time is changed in response to the brightness of each image, the contrast ratio for each image remains at an order that the conventional liquid crystal display apparatus makes it possible to accomplish. This, in other words, means the following: Even if this technology is applied to the liquid crystal display apparatus, when displaying an image the brightness of which remains almost unchanged over a certain fixed time-period (i.e., a time-period during which display data of a plurality of frames is transferred to the liquid crystal display apparatus), it is difficult to enhance the contrast ratio thereof.

It is an object of the present invention to provide a liquid crystal display apparatus and a control method therefor, the liquid crystal display apparatus enhancing the luminance of a displayed image with a high-efficiency and suppressing the heat-liberation of the light-source.

Also, it is another object of the present invention to provide a liquid crystal display apparatus that improves a blur in a motion-frame picture, and a control method therefor.

Also, it is still another object of the present invention to provide a liquid crystal display apparatus that enhances the contrast ratio, and a control method therefor.

In order to accomplish the above-described objects, in the present invention, the following configuration is employed: In a liquid crystal display apparatus that includes a liquid crystal panel and a light-source provided onto the liquid crystal panel for illuminating the panel, the light-source has a period constituted by a 1st light-emission luminance and a 2nd light-emission luminance, the time ratio of the 1st light-emission luminance and that of the 2nd light-emission luminance during the period being changed in accordance with display data supplied from the outside.

Here, the 1st light-emission luminance is higher than the 2nd light-emission luminance. As one example thereof, the time ratio of the 1st light-emission luminance during the period is set to be 60% or smaller when the display data is of motion-frame pictures, and is set to be 60% or larger when the display data is of freeze-frame pictures. Also, the 2nd light-emission luminance is set to be substantially 0, which is intended to enhance the reproducibility at the time when the afterimage and the luminance of the 2nd light-emission luminance are low.

Also, as one example of the controlling circuit configuration, the controlling circuit includes the following components: A data storing unit for storing the display data at least by the amount of 1 frame, a data comparing unit for comparing corresponding pixels between the display data stored in the data storing unit and the display data to be inputted, and a pulse controlling unit that, in correspondence with the comparison result by the data comparing unit, outputs a signal for controlling the time ratio of the 1st light-emission luminance during the period.

Also, the present invention includes a liquid crystal display apparatus where the comparison pixels compared by the data comparing unit have a distribution of being concentrated in a proximity to the center of a display unit of the above-described liquid crystal panel. Here, the proximity to the display unit may also be a region determined in advance. This region may also be contained within a fixed-length of distance from a predetermined pixel.

Also, in order to make the liquid crystal display apparatus correspond to the plurality of light-sources, the controlling circuit is configured as follows: The controlling circuit define to display panel with corresponding to each source light, and starting time of above-mentioned first luminous and second luminous luminance is organized that is able to change with according to display data supplying from outside with according to display data with each fields.

As another example of the controlling circuit configuration, the controlling circuit includes the following components: A luminance data generation controlling unit for generating luminance data from the respective image data of R, G, and B, a luminance distribution detection controlling unit that, from the generated luminance data, detects a luminance distribution state for the input image data by the amount of 1 frame, a folded-line point tone controlling unit for controlling a tone characteristic in accordance with the luminance distribution detection result, a backlight light-dimmer controlling unit for performing a light-dimmer control over a backlight in accordance with the luminance distribution detection result, and a blink backlight controlling unit for controlling a light-emission timing of the backlight for the display data by the amount of 1 frame.

Also, as still another example of the controlling circuit configuration, it is also allowable to employ a configuration that simultaneously has both of the configurations presented by the above-described two examples.

BRIEF DESCRIPTION OF THE DRAWINGS

FIG. 18 is a diagram for illustrating an example of a switching controlling circuit 25 illustrated in FIG. 17;

FIG. 19 is a timing diagram of a light-source lighting-up signal BL generated by the switching controlling circuit 25 illustrated in FIG. 18;

FIGS. 20A and 20B are comparison diagrams where the conventional hold type light-emission is compared with an impulse type light-emission according to the present invention;

DESCRIPTION OF THE EMBODIMENTS

Figure 1:
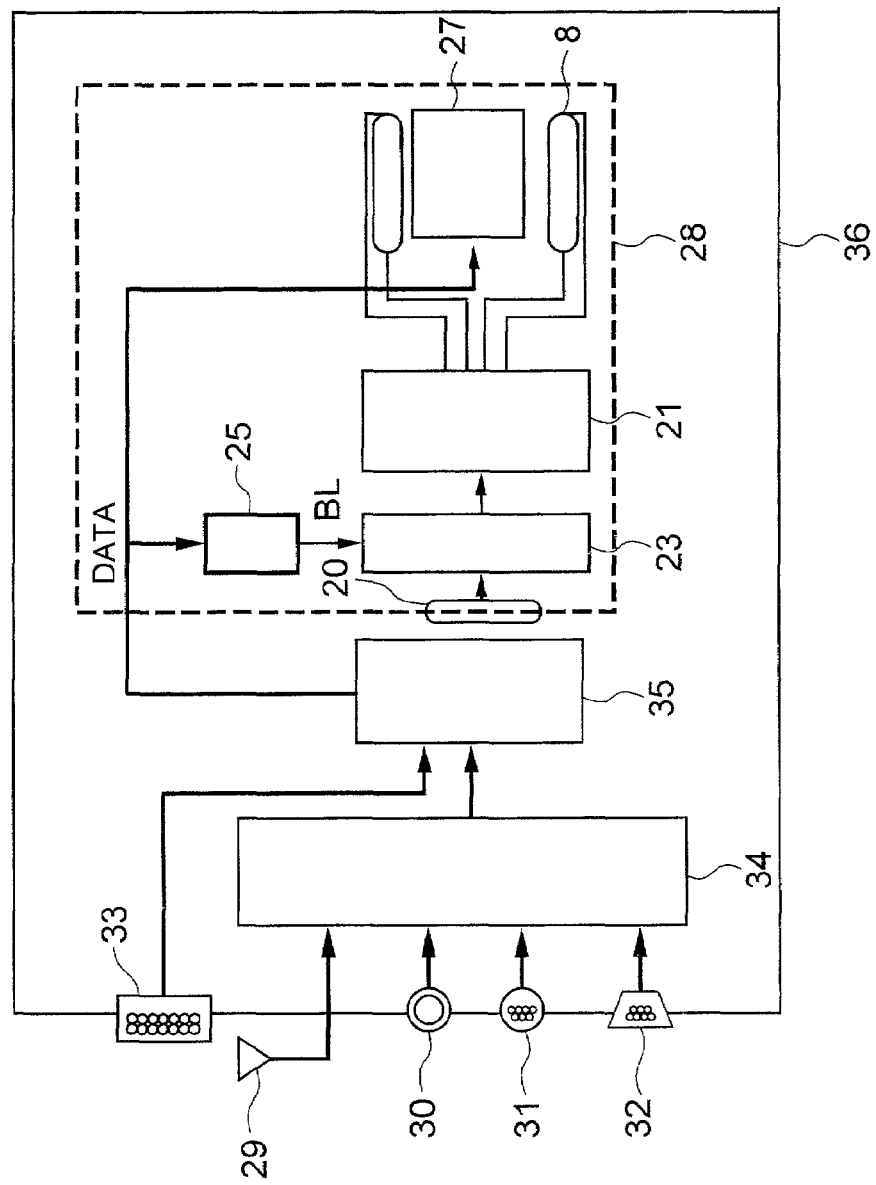
FIG. 1 is a schematic diagram for illustrating a liquid crystal display apparatus to which the present invention is applied.

The present invention includes a panel on which a plurality of pixels are located, a light-source for visualizing an image displayed on the plurality of pixels, and a controlling circuit for controlling the light-source. Here, during a 1st time-period, the controlling circuit feeds the light-source an electric current having a 1st intensity. During a 2nd time-period, the controlling circuit feeds the light-source an electric current having a 2nd intensity (which differs from the 1st intensity). Also, the controlling circuit repeats the 1st time-period and the 2nd time-period periodically. Furthermore, the controlling circuit controls the light-source so that the intensity of a light emitted from the light-source in this period (i.e., an integrated value obtained by integrating the luminance of the light during this period) will become higher than an integrated value of the luminance in the case where the light-source is lit up by a rating electric current during the same time-period. Incidentally, concerning the integrated value of the luminance in the case where the light-source is lit up by the rating current, the luminance being in a stable state in about 30 minutes after the lighting-up has been employed as the target to be integrated.

Also, in the case where the display apparatus is a liquid crystal display apparatus, the panel includes a pair of boards (at least one of which has a light-transmittance that is large enough to permit the light from the light-source to pass) located in such a manner as to be opposed to each other, and a liquid crystal layer (i.e., liquid crystal molecules, or the molecules including an additive agent such as a viscosity-decreasing agent) sealed between the pair of boards. Moreover, on at least one of the pair of boards, there are provided electrodes included in the pixels and signal lines for transferring image information to the electrodes. The panel configured in this manner is referred to as "liquid crystal display panel" or "liquid crystal display element". In the light-source, a fluorescent lamp or an optical element (e.g., a light-guiding plate) connected optically to the fluorescent lamp is located on at least one plane of the panel in a manner of being opposed thereto. In recent years, there has been also proposed a light-source using a light-emitting element array where, instead of the fluorescent lamp, a plurality of light-emitting elements are located along the panel. The present invention is applicable to a matrix type display apparatus. On account of this, the present invention is also applicable to a plasma display apparatus.

In the display apparatus according to the present invention, the large-or-small relationship between the 1st and the 2nd electric currents that are fed to the light-source is not particularly specified. However, as is the case with the conventional case, considering the case as well where the display apparatus is utilized under a condition of lighting up the light-source continuously, it is desirable to set the 2nd electric current to be smaller as compared with the 1st electric current.

Incidentally, in the liquid crystal display element, the luminance of an image to be displayed is calculated from an image-signal transferred to the display apparatus, and then the 1st and the 2nd current values and the time sharing of the 1st and the 2nd time-periods may be adjusted in agreement with the calculated luminance (a viewpoint 1). In particular, with respect to image data the luminance or the contrast of which need not be enhanced, the value of, especially, the larger one out of the 1st and the 2nd currents is suppressed, thereby saving the power consumption. In this case, even if the intensity of the light emitted from the light-source in the period (i.e., the integrated value obtained by integrating the luminance of the light during the period) becomes lower than the integrated value of the luminance in the case where the light-source is lit up by the rating-current during the same time-period, this situation presents no problem.

Hereinafter, the explanation will be given concerning the concrete modes of the present invention, referring to the drawings related therewith.

In the drawings that will be referred to in the following explanation, the configuration components having the same function are designated by the same reference numerals, and the repeated explanation thereof will be omitted.

FIG. 1 is a schematic diagram for illustrating a liquid crystal display apparatus on which a liquid crystal display module according to the present invention is mounted. In FIG. 1, the reference numerals denote the following components, respectively: 8 a fluorescent lamp, 20 a direct voltage source input terminal, 21 an inverter circuit, 23 a light-dimmer circuit, 25 a switching controlling circuit, 27 a liquid crystal panel, 28 the liquid crystal display module, 29 a television input terminal, 30 a video input terminal, 31 an S input terminal, 32 an analogue PC input terminal, 33 a digital PC input terminal, 34 an analogue image processing controlling unit, 35 a digital image processing controlling unit, and 36 the liquid crystal display apparatus.

In FIG. 1, the liquid crystal display apparatus 36 mainly allows a motion-frame picture from, as image inputs, the television input terminal 29, the video input terminal 30, the S input terminal 31, and so on, and mainly allows a freeze-frame picture from the analogue PC input terminal 32, the digital PC input terminal 33, and so on. The analogue image processing controlling unit 34 subjects inputted analogue image data to a luminance/color signal separation processing, an analogue/digital conversion processing, and so on, then outputting, as digital image data, the data to the digital image processing controlling unit 35. The digital image processing controlling unit 35 subjects the digital image data to an interlace/non-interlace conversion processing, an expansion processing, and so on, then outputting the data to the liquid crystal display module 28. In the liquid crystal display module 28, the inputted digital image data (DATA) is inputted into the switching controlling circuit 25 as well as into the liquid crystal panel 27. The switching controlling circuit 25 detects the state of this inputted digital image data (DATA). In addition, the switching controlling circuit 25 outputs a detection signal, i.e., the detection result, to the light-dimmer circuit 23. In accordance with the state of this detection signal, the light-dimmer circuit 23 outputs to the inverter circuit 21 a light-dimmer controlling signal for obtaining an excellent display state. This allows the light-dimmer circuit 23 to perform a light-source control over the fluorescent lamp 8.

Hereinafter, the explanation will be given in sequence concerning the details of the respective components.

Figure 3A:
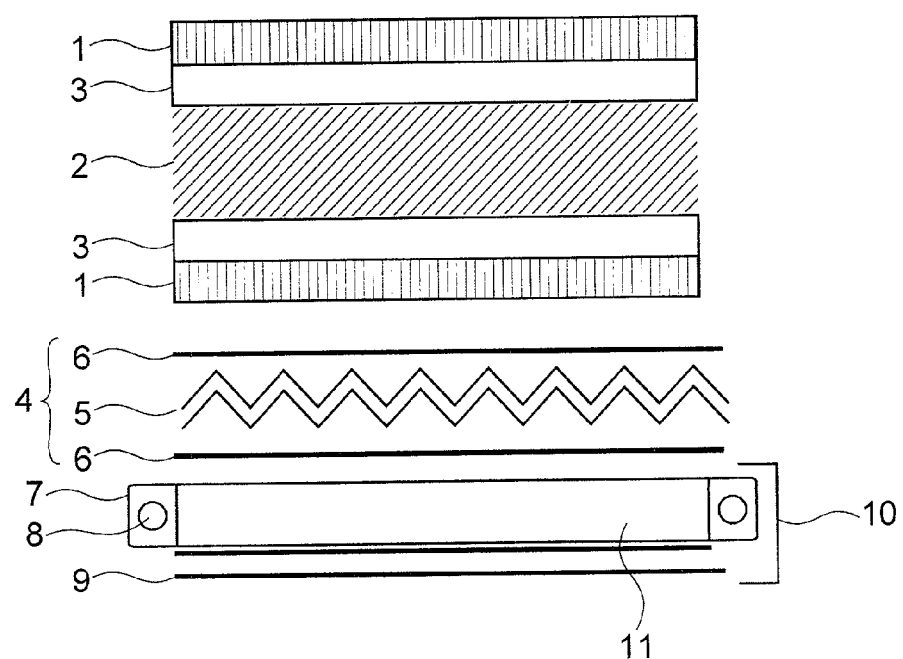
FIGS. 3A and 3B are diagrams for illustrating the structure of a liquid crystal display apparatus using a sidelight type light-source unit.
Figure 3B:
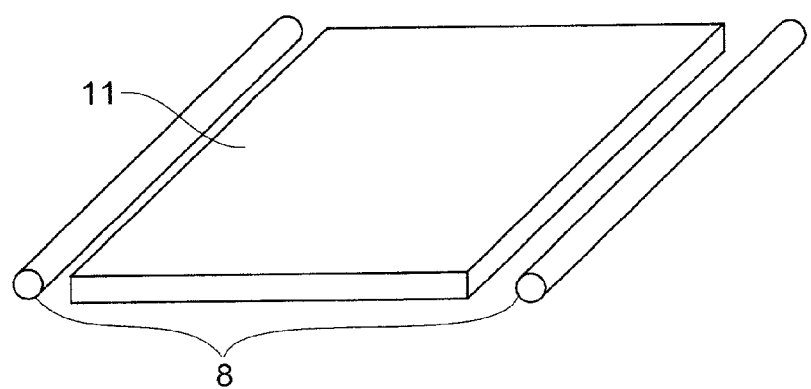
Figure 4A:
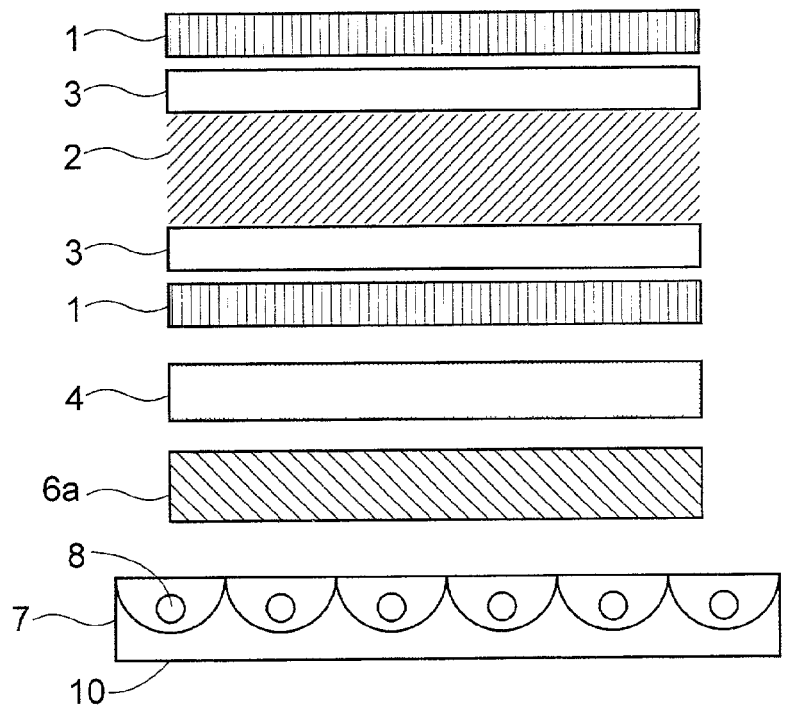
FIGS. 4A and 4B are diagrams for illustrating the structure of a liquid crystal display apparatus using a directly-under type light-source unit.
Figure 4B:
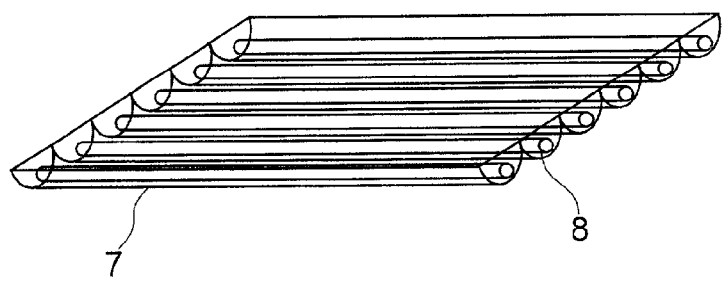

FIGS. 3A and 4A are cross-sectional views for conceptually illustrating the structures of the liquid crystal panel. FIGS. 3B and 4B are perspective vies for illustrating a light-source unit fixed onto the liquid crystal display apparatus. In any one of the drawings, the liquid crystal panel has a liquid crystal display element and a light-source unit 10 where the fluorescent lamp 8 is mounted. Here, the liquid crystal display element includes a pair of boards 3 the respective principal planes of which are located in a manner of being opposed to each other, and a liquid crystal layer 2 (i.e., liquid crystal molecules, or a mixture of the molecules and a viscosity-decreasing agent or the like are sealed) sandwiched between the pair of boards. In FIGS. 3A and 4A, on the principal planes of the boards 3, sheet polarizers 1 are provided on the sides opposite to the liquid crystal layer 2. Also, on at least one of the pair of boards 3, a plurality of pixels (not illustrated) are located in a 2-dimensional manner on the principal plane on the side of the liquid crystal layer 2. In the panel illustrated in either of FIGS. 3A and 4A, the user can see an image from the above in the drawings through the principal planes of the boards 3.

The liquid crystal panel illustrated in FIGS. 3A and 3B is referred to as "sidelight type" (or "edgelight type") from the location of the fluorescent lamp 8 in the light-source unit 10. The light-source unit 10 includes the following components: A light-guiding plate 11 having a quadrilateral-shaped upper plane located in a manner of being opposed to a lower plane of the above-described liquid crystal display element, the tube-shaped fluorescent lamps 8 located along at least one side plane (i.e., one side of the quadrilateral) of the light-guiding plate, a reflector 7 by which a light emitted from the fluorescent lamp 8 onto the opposite side of the light-guiding plate is launched into the side plane of the light-guiding plate, and a reflection film 9 by which a light propagating inside the light-guiding plate down toward its lower plane is caused to be reflected up toward its upper plane and is caused to illuminate the lower plane of the liquid crystal display element. Between the upper plane of the light-guiding plate 11 and the lower plane of the liquid crystal display element, there is located an optical sheet group 4 including a pair of diffusion films 6 and a prism sheet 5 sandwiched therebetween. In the sidelight type liquid crystal panel, the lower plane of the liquid crystal display element is located in such a manner that the lower plane is opposed not to the fluorescent lamp 8 but to the upper plane of the light-guiding plate 11 illustrated in FIG. 3B.

In contrast to this, the liquid crystal panel illustrated in FIGS. 4A and 4B is referred to as "directly-under type". This is named after the location that a plurality of fluorescent lamps 8 in the light-source unit 10 are located in a manner of being opposed to the lower plane of the liquid crystal display element (i.e., directly under the liquid crystal panel as illustrated in FIGS. 4A). In the light-source unit 10 used in the directly-under type liquid crystal panel, reflectors 7 are located so that lights emitted from the fluorescent lamps 8 down toward the lower side in the drawing are reflected so as to illuminate the upper side in the drawing (i.e., the lower plane of the liquid crystal display element). For this purpose, there are formed ups-and-downs for eliminating variations in the light intensities in the plurality of fluorescent lamps 8 and the clearances therebetween. As is the case with the sidelight type panel, an optical sheet group 4 is located between the light-source unit 10 and the liquid crystal display element. However, the diffusion sheets 6 located on the side of the light-source unit 10 in the sidelight type optical sheet group 4 have been replaced by a diffusion plate 6a. In the diffusion plate 6a, there is formed an optical pattern for eliminating the above-described variations in the light intensities in the plurality of fluorescent lamps 8 and the clearances therebetween.

Additionally, the detailed explanation of the sidelight type liquid crystal panel and that of the directly-under type liquid crystal panel have been given in, e.g., JP-A-7-281185 and JP-A-5-257142, respectively.

In the above-described liquid crystal panels, increasing or decreasing an applied electric field to the liquid crystal layer 2 sets the light-transmittance, thus displaying an image. For example, in a TFT (i.e., thin film transistor)-driven liquid crystal display apparatus (active matrix type) of the TN type or the vertical orientation type where the liquid crystal molecules are orientated at a twist angle of around 90°, or in a time-division-driven liquid crystal panel (passive matrix type) of the STN type where the molecules are orientated at a twist angle of 200° to 260°, with an increase in the applied electric field to the liquid crystal layer 2, the light-transmittance changes from its maximum value (white image) to its minimum value (black image).

On the other hand, in a TFT-driven liquid crystal panel referred to as the transverse electric-field type where the electric field to be applied to the liquid crystal layer 2 is applied in the direction along the board plane, with an increase in the applied electric field to the liquid crystal layer 2, the light-transmittance changes from its minimum value (black image) to its maximum value (white image).

In the case of the TN type or the vertical orientation type TFT-driven liquid crystal panel, as the value of $\Delta nd$ which is the product of a refractive-index anisotropy $\Delta n$ of the liquid crystal layer 2 and a cell gap (i.e., thickness of the liquid crystal layer 2) d, the range of 0.2 µm to 0.6 µm is desirable in order to make the contrast ratio and the brightness compatible with each other. As the value of $\Delta nd$ in the STN type liquid crystal panel, the range of 0.5 µm to 1.2 µm is preferable. As the value of $\Delta nd$ in the transverse electric-field type TFT-driven liquid crystal panel, the range of 0.2 µm to 0.5 µm is preferable.

Next, in accordance with the above-described viewpoint, the explanation will be given below concerning overviews of the aspects of the present invention in the liquid crystal panels configured as described above.

Figure 2:
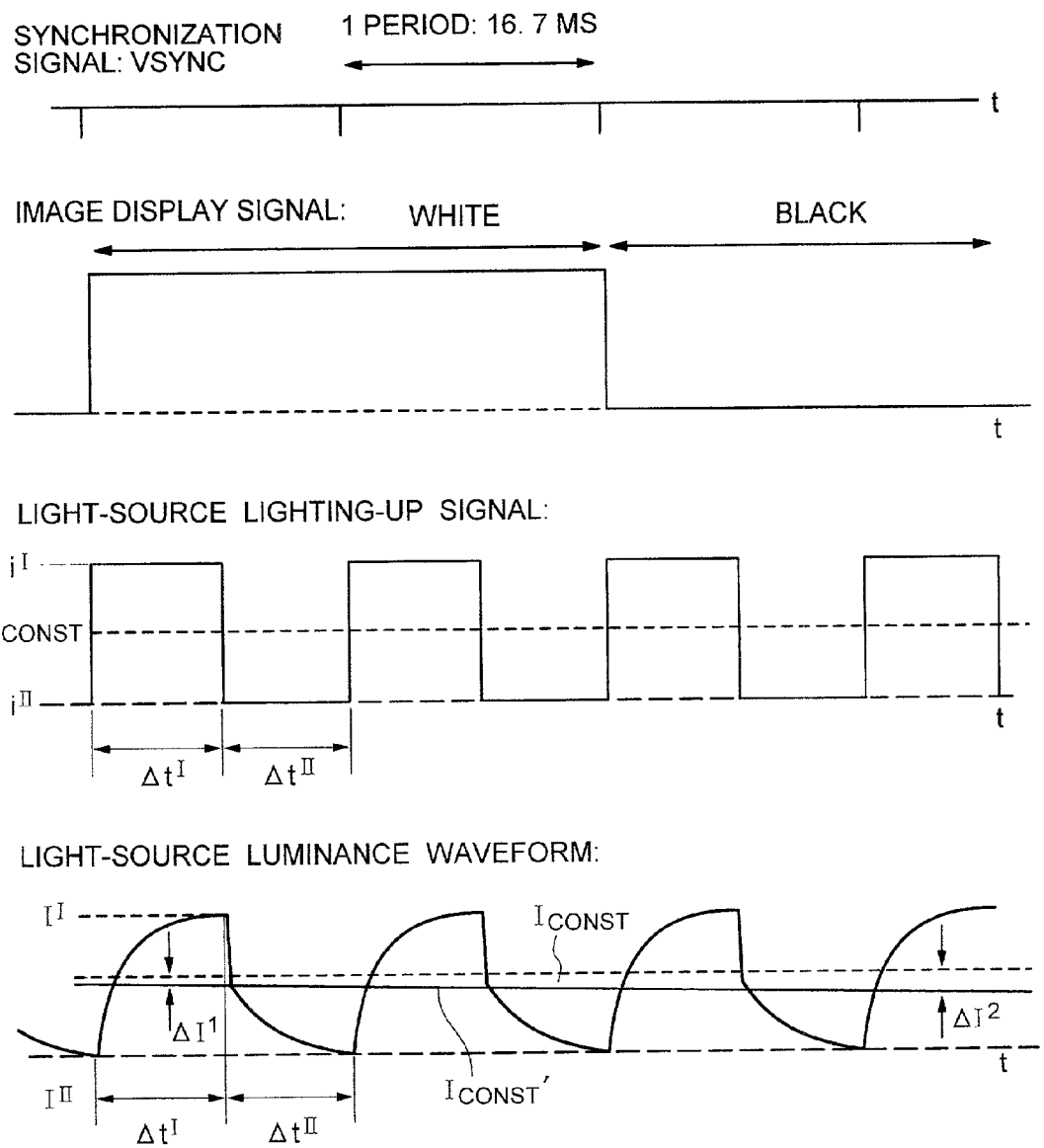
FIG. 2 are diagrams for illustrating luminance waveforms of a light-source and so on in the liquid crystal display apparatus to which the present invention is applied.

FIG. 2 are diagrams for illustrating a synchronization signal (i.e., a transferring timing of image information), an image display signal, a lighting-up signal of the light-source, and a luminance waveform of a light emitted from the light-source unit at the time when the present invention based on the viewpoint 1 is carried out toward the liquid crystal display apparatus. The light-source lighting-up signal is represented as a waveform indicating the following operation: The 1st electric current $i^I$ is fed to the light-source during a time of $\Delta t^I$ (i.e., the 1st time-period), and then the 2nd electric current $i^{II}$ smaller than the 1st electric current is fed to the light-source during a time of $\Delta t^{II}$ (i.e., the 2nd time-period), and an operation period of $\Delta t^I + \Delta t^{II}$, i.e., a summation of these two times, is repeated. In this example, $\Delta t^I$ and $\Delta t^{II}$ have been set to be equal to each other. Namely, the electric currents are fed to the light-source with the duty of 50%, and the value of the 2nd electric current $i^{II}$ is suppressed down to substantially 0 mA. Accordingly, assuming that a constant electric current is fed to the light-source with an electric power that the light-source consumes in the above-described operation period, it turns out that the electric current value is illustrated as an intermediate value $i^{const}$ between the 1st electric current and the 2nd electric current.

Furthermore, the luminance waveform of the light-source makes it possible to predict that the luminance corresponding to $i^{const}$ will be equivalent to an intermediate value $I^{const}$ (a dashed line) between a luminance $I^I$ corresponding to the 1st electric current (i.e., a value that the luminance reaches by the feeding of the 1st electric current during the predetermined time) and a luminance $I^{II}$ corresponding to the 2nd electric current (i.e., a value that the luminance reaches by the feeding of the 2nd electric current during the predetermined time). However, the continuous feeding of the current $i^{const}$ in a time equivalent to the plurality of operation periods gradually raises the light-source temperature, thereby resulting in a gradual increase in the light loss inside the light-source. On account of this, actually, the luminance of the light-source exhibits a value $I^{const'}$ (a solid line) that is lower than $I^{const}$ (the dashed line). Also, the temperature increase in the light-source with the lapse of time gradually expands, from $\Delta I^1$ to $\Delta I^2$, the difference between $I^{const}$ (the dashed line) and $I^{const'}$ (the solid line).

Figure 5A:
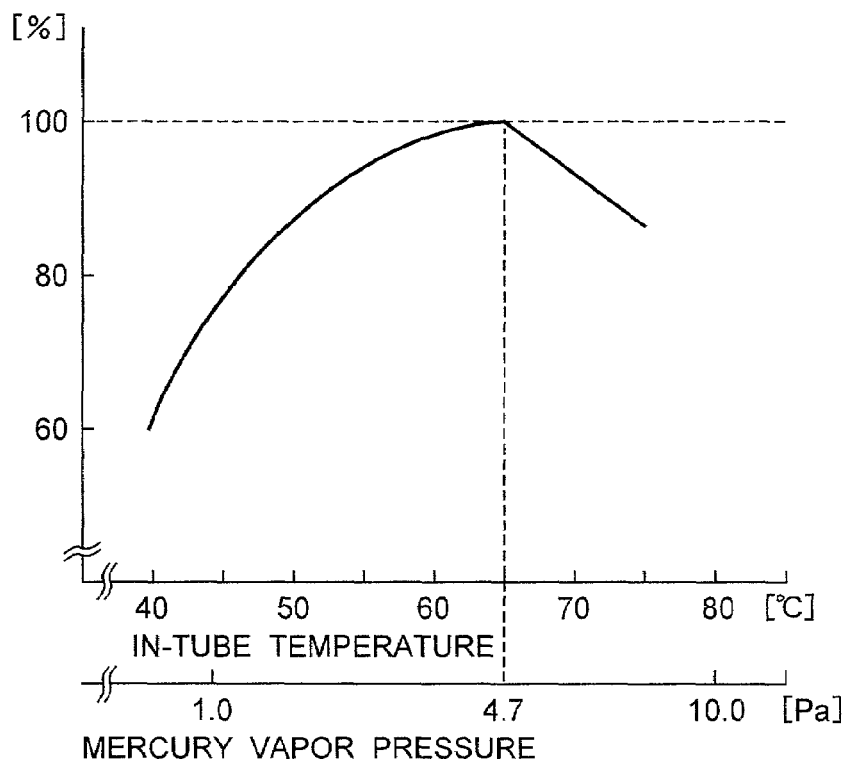
FIGS. 5A and 5B are diagrams for illustrating the in-tube temperature of a cold-cathode ray tube and the luminance characteristic toward a fed current.
Figure 5B:
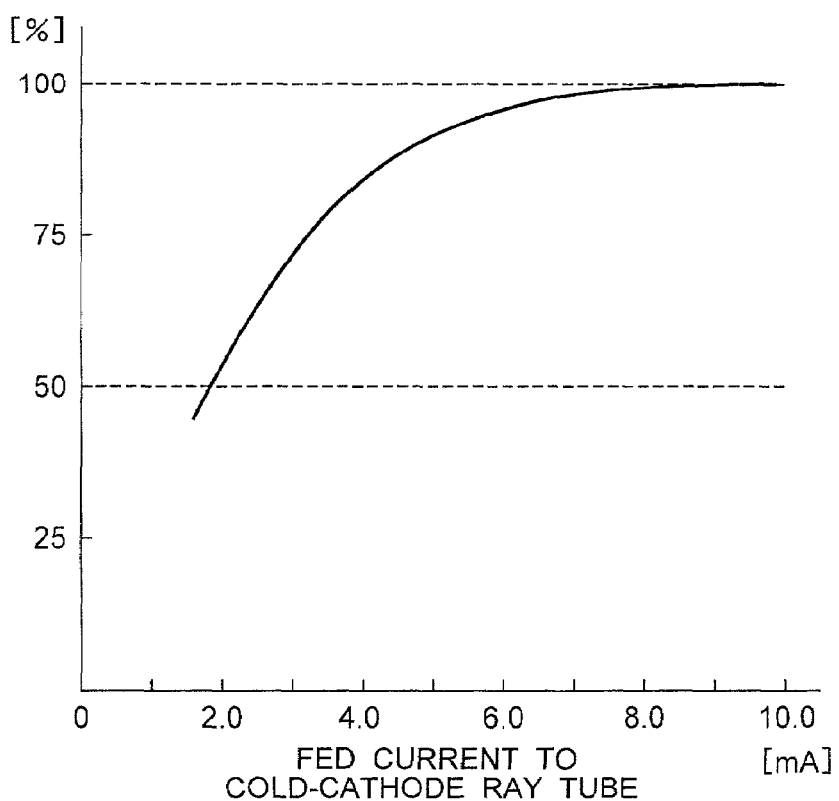

In contrast to this, if the time of $\Delta t^I$ during which the 1st current $i^I$ is fed to the light-source is set to be shorter than a turnaround time during which the temperature increase in the light-source caused by the 1st current $i^I$ reaches a certain value, it becomes possible to extract, without the light loss inside the light-source, the light of the luminance corresponding to the 1st current $i^I$. FIGS. 5A and 5B relate to a cold-cathode ray tube employed as one example of the light-source. FIG. 5A indicates the relationship between the in-tube temperature (which can be regarded as being equivalent to the in-tube mercury vapor pressure as well) and the luminance. FIG. 5B indicates the relationship between the luminance and a current fed to a pair of electrodes provided in the cold-cathode ray tube. The luminance of the cold-cathode ray tube depends on the in-tube mercury vapor pressure, in other words, the quantity of the mercury gas existing inside the tube. When the mercury gas quantity is smaller than a certain value (which, in this example, is equal to 4.7 Pa in terms of the mercury vapor pressure), an increase in the mercury gas quantity brings about an increase in the in-tube temperature, thereby raising the luminance of the cold-cathode ray tube itself as well. If, however, the mercury gas quantity exceeds the certain value, the mercury gas gradually absorbs the light generated inside the tube, eventually resulting in a decrease in the luminance of the cold-cathode ray tube as well. The tendency like this, being not limited to the cold-cathode ray tube and the mercury gas, can be recognized as long as the tube sphere contains an excitation material therein. The phenomenon similar to that in the cold-cathode ray tube occurs also in, for example, a xenon lamp.

Also, the mercury vapor pressure inside the cold-cathode ray tube can be regarded as being equivalent to the temperature inside the cold-cathode ray tube as well. Moreover, the temperature inside the cold-cathode ray tube is raised in response to the current fed between the pair of electrodes provided in the cold-cathode ray tube. Consequently, when continuously feeding the current to the cold-cathode ray tube, the rise in the luminance is saturated in response to the rise in the current value, and thus the luminance will be saturated at a certain value (Refer to FIG. 5B).

However, as illustrated in the luminance waveform of the light-source in the 1st time-period $\Delta t^I$ in FIG. 2, the feeding of the current $i^I$ to the cold-cathode ray tube raises its luminance gradually. This fact clearly shows that the rise in the in-tube temperature at the time of feeding a predetermined current to the cold-cathode ray tube occurs with a certain accompanying delay with respect to a feeding starting point-in-time of the current $i^I$. Moreover, considering a rewriting period of the image data signal in the liquid crystal display apparatus, it is desirable to set the above-described operation period of the light-source to be smaller than this period. This period is equal to, e.g., 16.7 ms (ms=milliseconds) at 60 Hz, and 8.4 ms at 120 Hz (these values are preferable for the motion-frame picture display). It is desirable to set the above-described operation period of the light-source to be smaller than these periods. However, by setting the above-described time sharing of the 1st and the 2nd time-periods and the above-described 1st and the 2nd currents in correspondence with this operation period, it is possible to reduce the influence of the above-described temperature rise. From the catalogue of the respective cold-cathode ray tubes referred to earlier, when lighting up the cold-cathode ray tube continuously with the rating current thereof (an example of its value: 6 mA), the following findings can be obtained depending on the surrounding temperature of the cold-cathode ray tube:

(1) At a surrounding temperature of 40° C., the luminance is saturated in about 150 seconds from the starting of the lighting-up, and a decrease in the luminance is unobserved even after the lapse of 200 seconds.

(2) At a surrounding temperature of 60° C., the luminance exhibits its maximum value in about 15 seconds from the starting of the lighting-up, and after that, the luminance is decreased slowly and attains to 90% of its maximum value after the lapse of 200 seconds.

(3) At a surrounding temperature of 80° C., the luminance exhibits its maximum value in about 10 seconds from the starting of the lighting-up, and for about 10 seconds after that, the luminance is rapidly decreased down to 80% of its maximum value, and thereafter, the luminance is decreased slowly until after the lapse of 200 seconds from the starting of the lighting-up.

Based on these findings, the present inventor has thought of the following idea and has confirmed its effect: Even if the 1st current has been set to be substantially 2 times as large as the rating current of the cold-cathode ray tube, the value of the 2nd current, which is set to be smaller as compared with the 1st current, and its feeding time (i.e., the 2nd time-period) are adjusted. This operation makes it possible to prevent the temperature rise in the cold-cathode ray tube.

Figure 6:
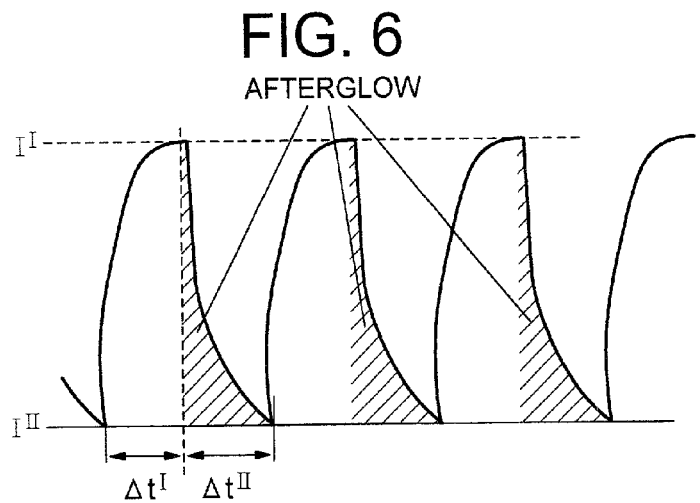
FIG. 6 is a diagram for illustrating the luminance response by the light-source unit according to the present invention.

Meanwhile, in the 2nd time-period, since the 2nd current smaller than the 1st current is fed to the light-source, the luminance of the light-source is decreased. However, when seen from the point-of-view of a luminance of the light that has passed through the liquid crystal display element (hereinafter, this luminance is referred to as "panel luminance"), the influence of the luminance decrease in the 2nd time-period is unexpectedly small. Having made the comparison with the use of an integrated value of the panel luminance in the above-described operation period (the duty: 50%) by the amount of $\Delta t^I + \Delta t^{II}$ at the time when the 2nd current is set to be 0 mA, concerning afterglow of the light-source which occur in the 2nd time-period, the following findings have been obtained experimentally (Refer to FIG. 6):

(4) When a pixel of the liquid crystal display element is white-displayed (i.e., an image-signal that makes the light-transmittance of this pixel its maximum value is sent to this pixel), the attenuation of the light that has passed through the pixel is smaller than having been expected. Moreover, an integrated value of the display luminance has become larger than the value at the time when the light-source is continuously lit up with the same electric power in the above-described operation period.

(5) When a pixel of the liquid crystal display element is black-displayed (i.e., an image-signal that makes the light-transmittance of this pixel its minimum value is sent to this pixel), the attenuation of the light that has passed through the pixel is sufficiently large. Moreover, an integrated value of the display luminance has been suppressed down to about one-half of the value at the time when the light-source is continuously lit up with the same electric power in the above-described operation period.

Being not limited to the liquid crystal display apparatus, the maximum luminance required for the display apparatus turns out to become the luminance of a pixel displayed brightest (i.e., in white) out of a plurality of pixels. In the other pixels, in particular, in a pixel displayed darkest (i.e., in black) or a pixel displayed in a tone close thereto (i.e., in dark gray), if the display luminances thereof are increased, the entire display screen becomes a whitish image. The user of the liquid crystal display apparatus regards this whitish image as looking inferior to the image by the CRT.

However, the above-described findings (4) and (5) that the present inventor et al. have obtained experimentally have proved the following: In comparison with the conventional method of feeding the current continuously, as described above, the modulation of the current fed to the light-source with the predetermined duty makes it possible to enhance the luminance of the pixel displayed brightest on the display screen and, conversely, makes it possible to suppress the luminance of the pixel displayed darkest. Furthermore, the findings (4) and (5) have proved the following: When the power consumptions in the above-described duty are made equal to each other, as compared with the case of lighting up the light-source continuously, the above-described maximum luminance is enhanced tremendously.

Although the grounds for this phenomenon have not been elucidated completely, the experimental results have clearly demonstrated the following: In the pixel where the light-transmittance is set to be a fixed height or more, the afterglow of the light-source in the time-period during which the current vales is suppressed (i.e., the above-described 2nd time-period) has maintained its luminance more than expected. The consideration given so far clearly proves that the present invention can accomplish the object and the other objects described already.

Incidentally, the findings (4) and (5) have been derived from the result of a spectrum intensity obtained as follows: The panel luminance sensitivity of the liquid crystal display apparatus is measured in compliance with the conditions stipulated in ED-2522 of EIAJ (Standards of Electronic & Mechanical Industries Association of Japan), and the spectrum intensity for each wavelength in the visible-light area (i.e., 380 nm~780 nm) is obtained by subjecting the panel luminance to a luminous efficiency correction (i.e., converting the panel luminance into a light amount that the human eyes actually percept). This measurement is executed under a condition that the liquid crystal display apparatus is placed in a darkroom and a luminance meter is set 50 cm apart from the liquid crystal display element and is located perpendicularly to the display region. As the luminance meter that is preferable for executing such a measurement, there exists, e.g., the PR704 type manufactured by Photo Research Corp. This apparatus allows the luminance to be determined as the value of a per-unit solid angle light-flux that does not depend on the measurement distance or the measurement area. This apparatus also makes it possible to measure the following, respectively: The integrated value of the luminance in a desired time, e.g., the above-described operation period by the amount of $\Delta t^I + \Delta t^{II}$, a variation in the luminance during the time, and a luminance distribution of the liquid crystal display element within the display screen. Additionally, generally speaking, the contrast ratio described previously can be determined from the ratio of "a luminance at the time when the entire display screen is white-displayed/a luminance at the time when the entire display screen is black-displayed". Instead of using this general method, the contrast ratio may also be determined in the following way:

(1) A portion of the display screen (i.e., the pixels forming an image) is caused to be white-displayed (by sending, to the pixels, an image-signal that makes the light-transmittances of the pixels their maximum values).

(2) A test pattern that causes another portion of the display screen (i.e., the pixels forming the image) to be black-displayed (i.e., sends, to the pixels, an image-signal that makes the light-transmittances of the pixels their minimum values) is displayed on the liquid crystal display element.

(3) Calculating the luminance of the white-displayed portion and that of the black-displayed portion (at this time, the respective display regions are assumed to be the same in size), the contrast ratio is determined as the luminance ratio therebetween.

In applying the present invention based on the viewpoint 1 to the liquid crystal display apparatus, when the above-described operation period of the light-source is set to be smaller than the rewriting period (i.e., 16.7 ms at 60 Hz, 8.4 ms at 120 Hz) of the image data signal in the liquid crystal display apparatus, it is desirable to dispense the liquid crystal material (i.e., the liquid crystal layer) used therein so that a response time of the liquid crystal material will be suppressed shorter than the rewriting period (the above-described 16.7 ms at 60 Hz or 8.4 ms at 120 Hz) of the data signal. However, if, as compared with the rewriting period of the data signal, the response time of the liquid crystal material is exceedingly slower by the amount of a predetermined time, there occurs a ghost phenomenon (i.e., a multiple profile). On account of this, it is more desirable to shift a timing of the rewriting period of the image data signal from that of the above-described operation period of the light-source.

Consequently, it is advisable to make the two timings different by establishing a predetermined phase difference between the operation period, which includes the 1st time-period $\Delta t^I$ and the 2nd time-period $\Delta t^{II}$ illustrated in FIG. 2, and the rewriting period of the image data signal (i.e., the period of the synchronization signal Vsync illustrated in FIG. 2).

So far, the explanation has been given regarding the modes of the present invention. Next, based on the following embodiments, the explanation will be added below regarding the further details.

<Embodiment 1>

In the present embodiment, the sidelight type liquid crystal apparatus illustrated in FIGS. 3A and 3B is configured using the pair of glass boards 3 that are 0.7 mm thick, and a thin film transistor for the TFT driving is formed for each pixel on one of the boards. Concerning the liquid crystal layer 2 sandwiched between the pair of boards 3, the dielectric constant anisotropy $\Delta n\epsilon$ is set to be positive and $\Delta nd$ is set to be 0.41 μm. Also, although the twist angle of the liquid crystal molecules sealed in the liquid crystal layer 2 is made equal to 90°, lowering the twist angle down to, e.g., 70°, is desirable in order to make the liquid crystal response-rate faster. In the case of suppressing the twist angle, $\Delta nd$ that is appropriate therefor becomes even smaller (e.g., 0.35 μm), and accordingly shortening the cell gap is necessary.

The light-source unit 10 used in the present embodiment is of the configuration wherein, as illustrated in the perspective view in FIG. 3B, the one fluorescent lamp (the cold-cathode ray tube) 8 that is 4 mmϕ in outer diameter is located each in the long-side direction of the light-guiding plate 11, i.e., the two fluorescent lamps in total. Although not illustrated in the drawing here, the following components may also be located: The diffusion sheet for enhancing the luminance, a recursive polarization reflection film, and a lens sheet for controlling the angle dependence of an emitted light.

Figure 7A:
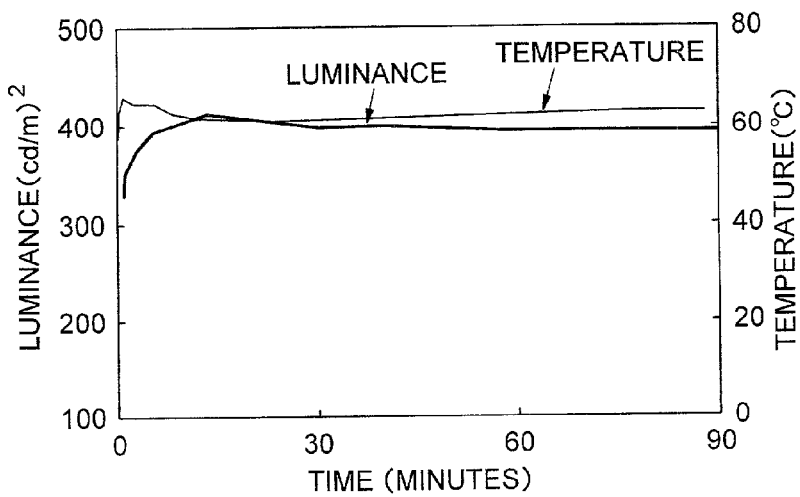
FIGS. 7A and 7B are diagrams for illustrating the elapsed-time change of the display luminance of a liquid crystal display apparatus where a cold-cathode ray tube is employed as the light-source, and the elapsed-time change of the cold-cathode ray tube temperature.
Figure 7B:
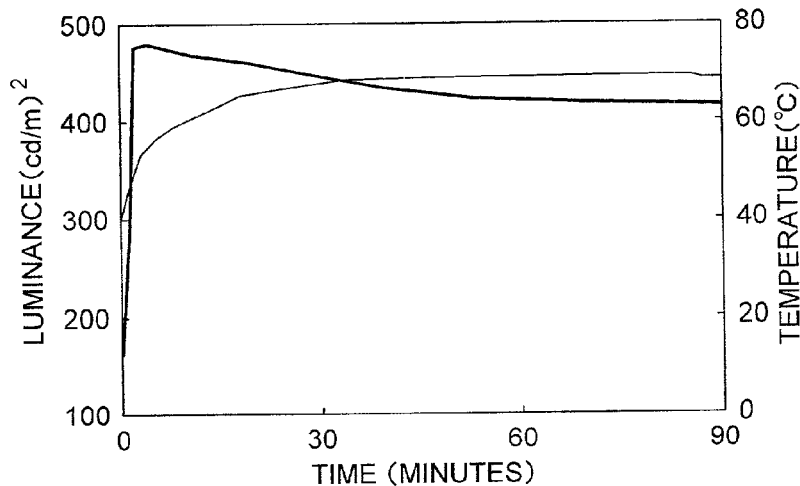

In the present embodiment, with the above-described 1st current and 2nd current set to be 10 mA and 0 mA, respectively, the 1st and the 2nd currents are fed to the fluorescent lamps 8 with the duty of 50%. As illustrated in FIG. 7A, the surface temperature of the fluorescent lamps 8 is raised with the lapse of time. In the meantime, as illustrated in FIG. 7A, the luminance is raised with time and, after that, is attenuated temporarily, then being saturated soon.

Setting the duty to be 50% or less in this way makes the following possible: The temperature rises in the central portions of the fluorescent lamps 8 are suppressed down to 70° C. or less. Also, the difference between a maximum value and a minimum value of the luminances in the display region (i.e., effective display region) of the liquid crystal display element (liquid crystal display panel) becomes equal to more than 20% as large as the average value therebetween. Also, even if the duty is suppressed down to 50% or less, the maximum value of the luminance is made equal to 200 cd/m² or more, and the minimum value of the luminance is suppressed down to 2 cd/M² or less.

By the way, the lamp diameter of the fluorescent lamps used in the light-source unit is usually about 2.6 mm, it is also possible to use a 3 mm diameter type having an increased glass thickness, and a 4 mm or more diameter type having an even thicker inner diameter and increased containing quantities of the gas and the mercury. In general, the lamp surface area becomes larger as the lamp diameter is increased, which is advantageous to the heat-dissipation. Furthermore, there also exist effects such as a lowering in the lighting-up voltage and an extension of the lamp lifespan (i.e., luminance half-value). Also, when using the cold-cathode ray tube (the fluorescent lamp) that is 2.6 mm in diameter (outer diameter), applying the tube current of 6 mA or more regardless of the length thereof results in the heat-liberation, which lowers the light-emission efficiency (i.e., the luminance). In contrast to this, in the present embodiment, the outer diameter of the fluorescent lamps 8 is enlarged, thereby suppressing the influence of the heat-liberation. This has also enhanced a discharge efficiency by the fed current inside the fluorescent lamps, thereby making it possible to obtain a sufficient luminance even if the duty is suppressed down to 50% or lower.

Figure 8:
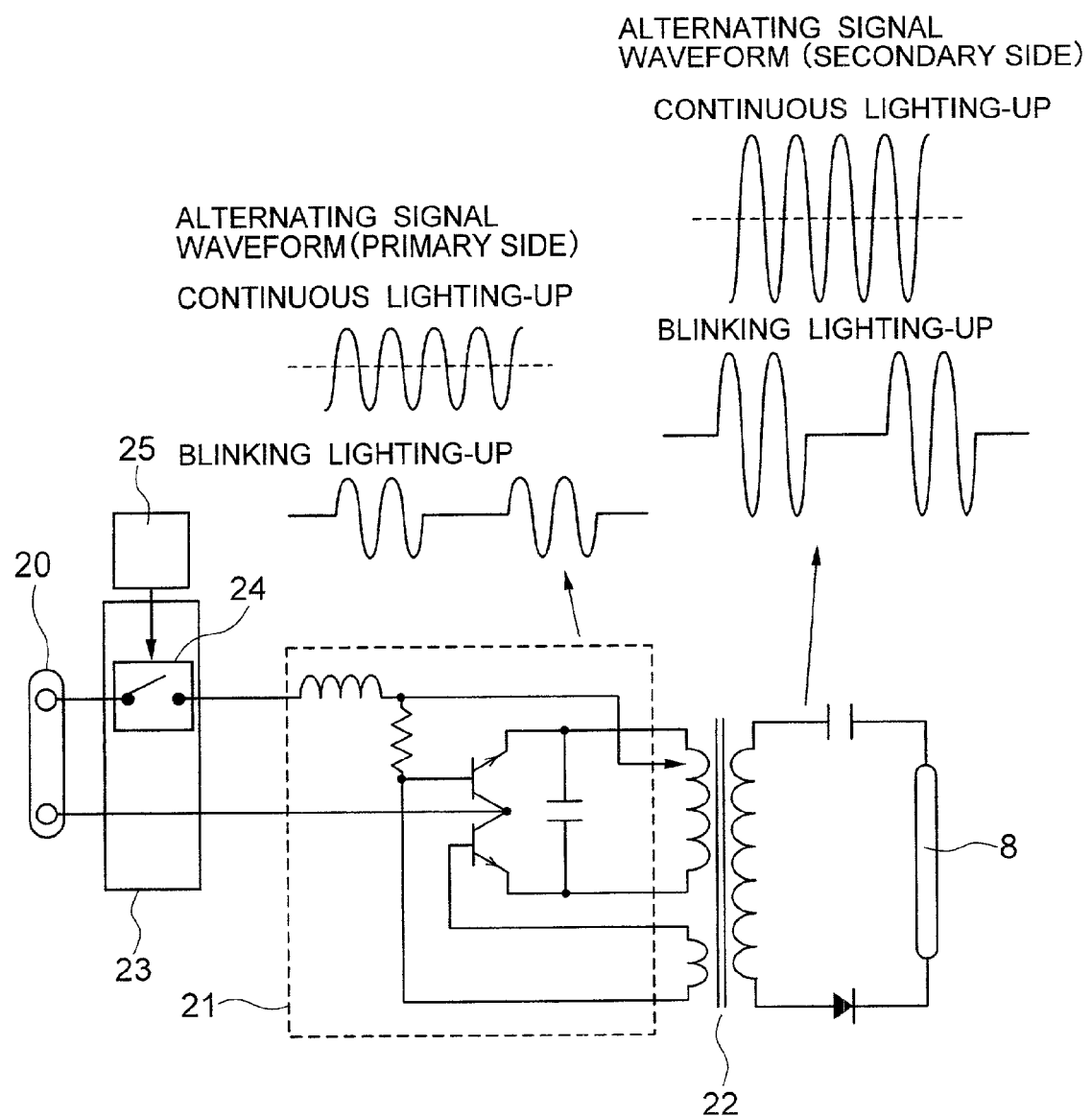
FIG. 8 is a diagram for illustrating an embodiment of a controlling circuit for executing a blinking lighting-up of the light-source according to the present invention.
Figure 9:
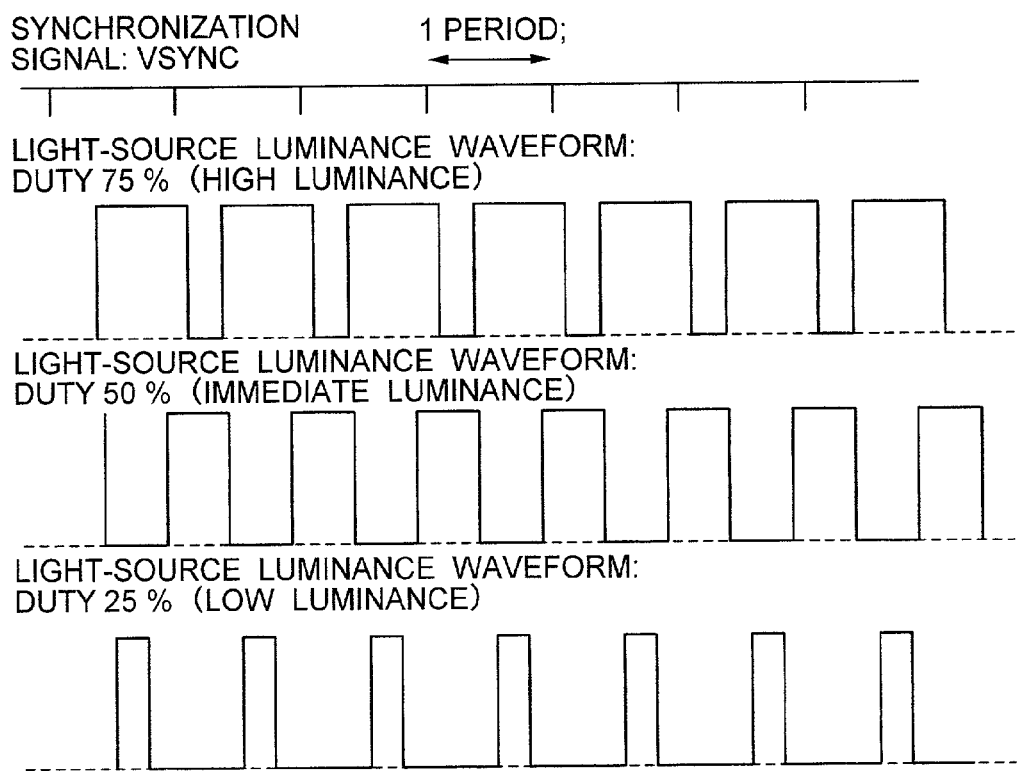
FIG. 9 is a diagram for illustrating an embodiment of the setting of a blinking lighting-up ratio of the light-source according to the present invention.
Figure 10:
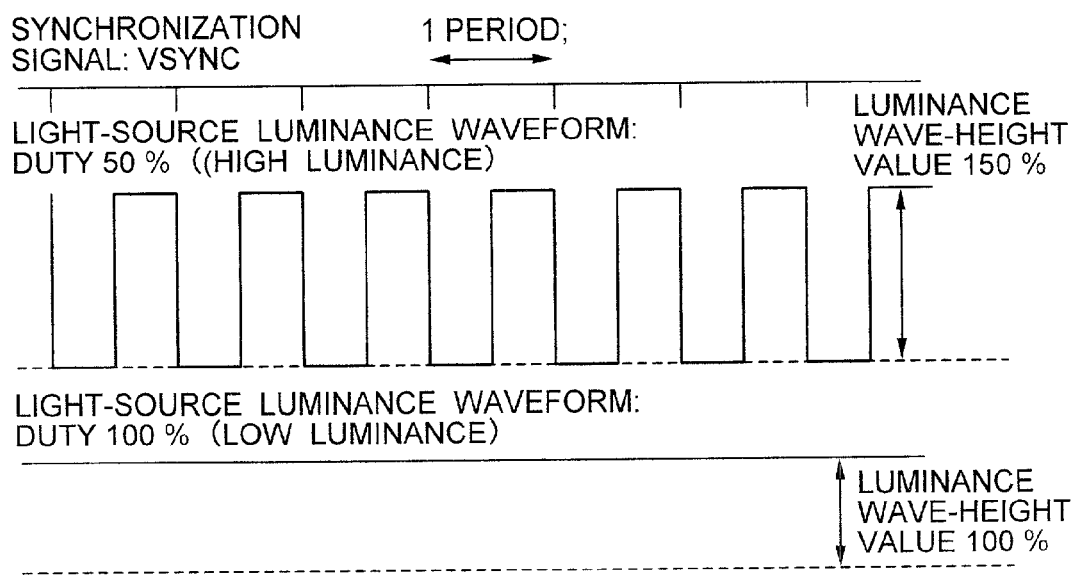
FIG. 10 is a diagram for illustrating an embodiment of the setting of the blinking lighting-up ratio of the light-source according to the present invention.

In the present embodiment, using a light-dimmer circuit illustrated in FIG. 8, it is allowable to set the ratio change of the above-described 1st time-period (i.e., the lighting-up time-period) or that of the above-described 2nd time-period (i.e., the pausing time-period) during the above-described lighting-up period of the light-source, and the change in the applied voltage for lighting up the lamps of the light-source, or it is also allowable to perform these settings simultaneously. In the light-dimmer in the lighting-up period (i.e., as illustrated in light-source luminance waveform signals in FIG. 9, the light-dimmer based on the ratio change of the lighting-up time-period or that of the pausing time-period), it is also possible to set the above-described lighting-up period to be either of the lighting-up time-period and the pausing time-period. Accordingly, as illustrated in FIG. 9, it is also possible to improve the light-emission efficiency by always providing the pausing time-period without fully lighting up the lamps in the above-described lighting-up period of the light-source. Also, as illustrated in FIG. 10, it is also allowable to blink the lamps only when the high luminances are obtained.

Additionally, in FIG. 9, the range of the high luminance is defined as being 300 cd/m² or more, the range of the immediate luminance is defined as being 200 to 299 cd/m² including 200 to 250 cd/m², and the range of the low luminance is defined as being 199 cd/m² or less including 100 cd/m².

<Embodiment 2>

Next, in this embodiment, the explanation will be given below concerning a modulation lighting-up of the light-source suitable for displaying the motion-frame pictures.

In the liquid crystal display apparatus, in order to obtain motion-frame picture display characteristics that are comparable to those of the CRT, the lighting-up in the light-source is switched from the all-the-time lighting-up to the blinking lighting-up that has the lighting-up time-period and the pausing time-period, respectively. This makes it possible to implement the impulse type light-emission such as the CRT. At this time, as illustrated in the respective drawings in FIG. 9, it is also possible to change the period of the blinking while maintaining the data rewriting period (i.e., the period of Vsync here) at a constant value.

In this way, the impulse type light-emission comparable to the CRT can also be implemented in the liquid crystal display apparatus using the blinking lighting-up light-source unit, thereby allowing the motion-frame picture display to be implemented. In the conventional light-source unit, since the fluorescent lamps are always lit up (i.e., the continuous lighting-up) regardless of whether the image-signal is of the bright display or the dark display, the energy efficiency has been worsened. In contrast to this, the illumination light-quantity of the light-source is controlled in compliance with the information amount of the image-signal. This enhances the light-emission efficiency of the fluorescent lamps, thereby making it possible to implement a further luminance enhancement based on the saving of the power consumption and the suppression of the rise in the lamp temperature. Namely, the illumination light-quantity of the light-source is decreased when the image is dark, and the illumination light-quantity is increased when the image is bright. This makes it possible to control the relationship between the luminance and the tone characteristic, i.e., the so-called tone curve characteristic, in agreement with the brightness of the background and the image-signal. In this way, the time ratio of the above-described 1st time-period (i.e., the lighting-up time-period) and that of the above-described 2nd time-period (i.e., the pausing time-period when the 2nd current is set to be 0 mA) are changed in correspondence with the information on the bright-or-dark of the image-signal, thereby controlling the illumination light-quantity of the light-source.

Figure 11A:
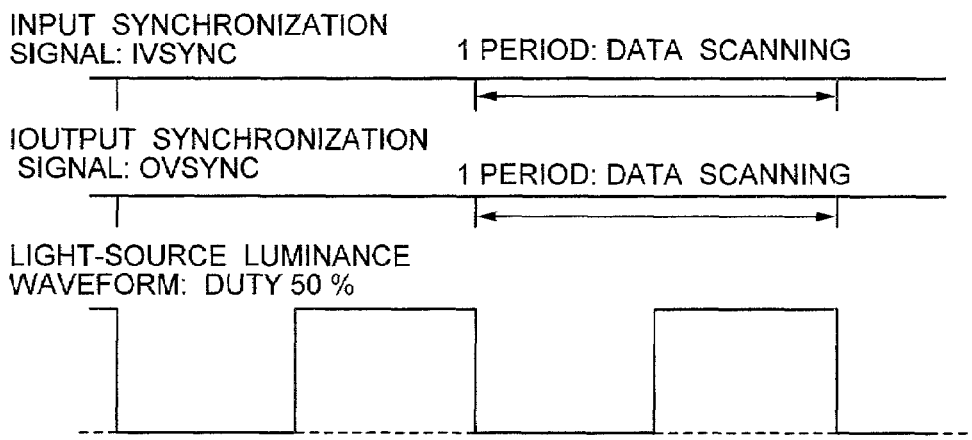
FIGS. 11A, 11B, and 11C are diagrams for illustrating an embodiment of the setting of a blinking lighting-up period of the light-source according to the present invention.
Figure 11B:
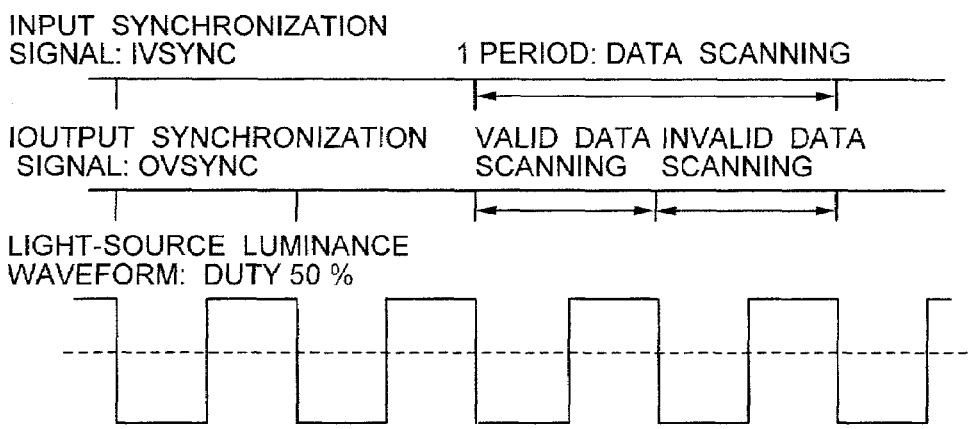

Also, the time ratio of the lighting-up time-period and that of the pausing time-period are changed in correspondence with the information amount about a movement of the image-signal, i.e., the lighting-up time-period is shortened when the movement is fast, thereby allowing a more beautiful motion-frame picture display. Namely, in agreement with the state of the image-signal, when the movement is slow, the slowness in the liquid crystal response-rate presents no problem. Accordingly, frame frequencies of input/output are made to coincide with each other, and the lighting-up time-period and the pausing time-period of the light-source, by being made to correspond to this output frame frequency, are also controlled by the output frame period (FIG. 11A). Next, when the movement of the image-signal is faster as compared with the above-described case, in order to improve (i.e., speed up) the liquid crystal response-rate, the output frame frequency is made 2 times faster than the input frame frequency so as to insert dummy data. The lighting-up time-period and the pausing time-period of the light-source, by being made to correspond to this, are also controlled by the output frame period (FIG. 11B).

Figure 11C:
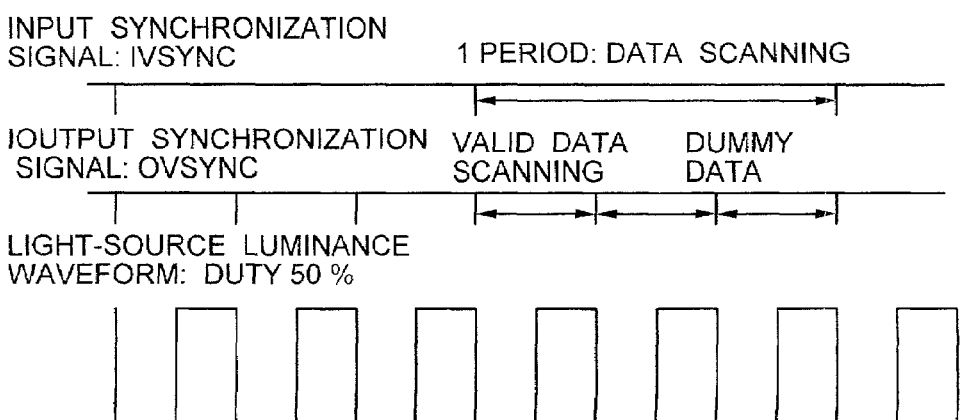

Moreover, when the movement of the image-signal is faster as compared with the above-described case, the output frame frequency is made 3 times faster than the input frame frequency so as to insert more amount of dummy data, thereby improving the response-rate. The lighting-up time-period and the pausing time-period of the light-source, by being made to correspond to this, are also controlled by the output frame period (FIG. 11C).

Figure 12:
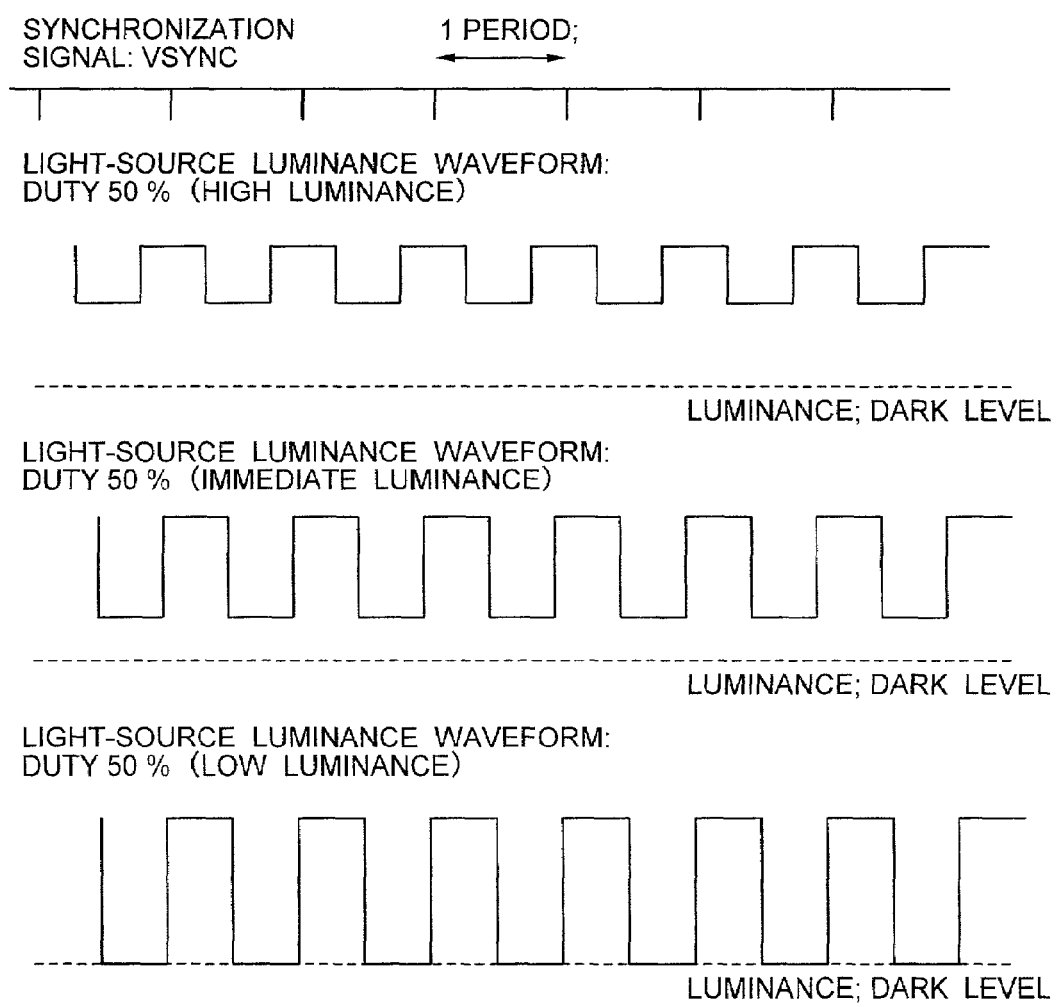
FIG. 12 is a diagram for illustrating an embodiment of the setting of a pausing time-period in the blinking lighting-up of the light-source according to the present invention.

At this time, it is advisable to perform the control so that the effective value of the current applied to the lamps for causing the light-source to perform the light-emission during each lighting-up period becomes substantially constant regardless of the ratio of the above-described lighting-up time-period and that of the above-described pausing time-period of the light-source. Also, changing the current effective value makes it possible to change the illumination light-quantity of the light-source. Also, by setting the luminance in the above-described pausing time-period not to be completely 0 but to be a certain constant luminance as illustrated in FIG. 12, it is possible to ensure a sufficient luminance even in the case where the entire screen exhibits a high luminance. Here, it is desirable to shorten, to a certain extent, a time-period where the luminance in the pausing time-period is enhanced.

Figure 16:
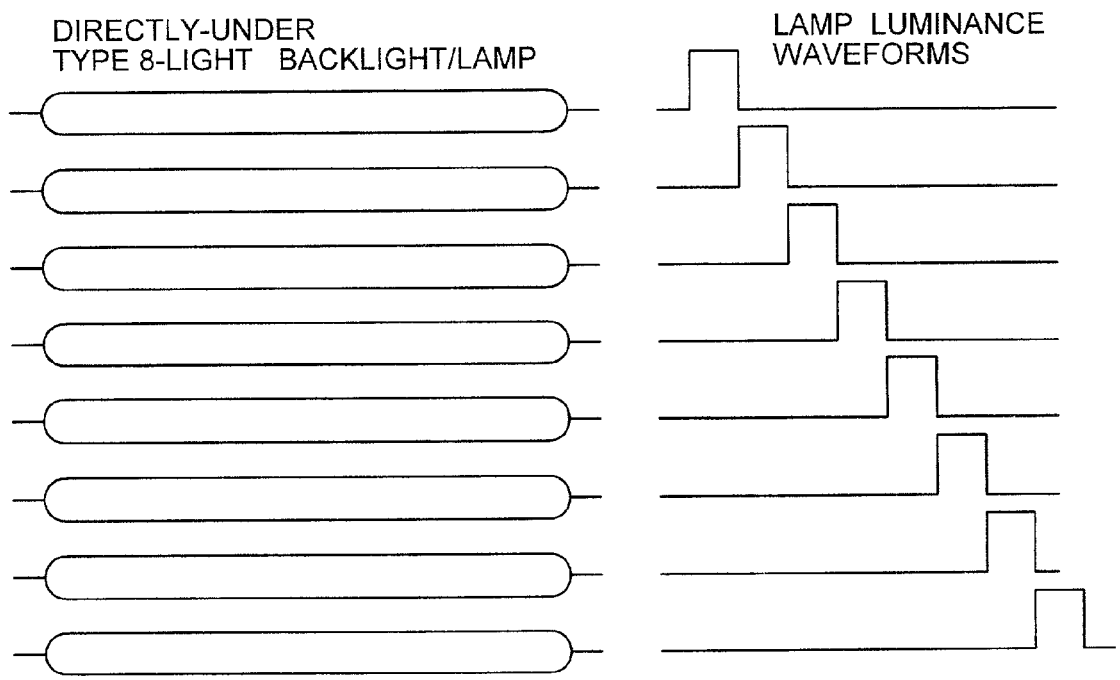
FIG. 16 is a diagram for illustrating the result that the present inventor has obtained by analyzing the lighting-up operation method for the directly-under type light-source unit that belongs to the prior art.

In order to implement a more complete motion-frame picture display, it is required not only to cause the light-source unit to perform the impulse type light-emission but also to synchronize data scanning timings of the image-signal with timings of the blinking of the light-source as illustrated in FIG. 16. In general, as the data scanning timings of the image-signal, there exist a vertical or a horizontal synchronization signal, a frame signal, a scanning line signal, and the like. The scanning periods and the blinking periods of these signals are made equal to each other so as to synchronize the scanning timings. In such a case, although the use of the directly-under type light-source unit is desirable and exhibits the outstanding effect, the use of the sidelight type light-source unit is also possible by the up-and-down division thereof.

In the up-and-down divided sidelight type light-source unit, when the above-described period including the lighting-up time-period and the pausing time-period in the light-source is equal to the rewriting period of the displayed image-signal, and when there exist n signal scanning lines of the above-described display apparatus, the starting time of a n/2th signal scanning may be synchronized with the lighting-up starting time of the light-source. Namely, the image-signal is synchronized with the blinking of the light-source at the center of the screen, thereby allowing the motion-frame picture display. Furthermore, when the period including the lighting-up time-period and the pausing time-period in the light-source is equal to the rewriting period of the displayed image-signal, and when there exist the n signal scanning lines of the above-described display apparatus, the starting time of a n=1st signal period may be delayed by a certain amount of time from the lighting-up starting time of the light-source. Here, when this delay time is set to be the starting time of the n/2th signal scanning, the result becomes the same as that in the method described earlier.

Also, in implementing the motion-frame picture display, it is effective to set the pausing time-period of the light-source to be more than ½0th as long as the lighting-up starting time, and to set the luminance in the pausing time-period to be less than 90% as high as the luminance in the lighting-up starting time.

In a liquid crystal display apparatus that includes a liquid crystal panel including a pair of opposed-located boards at least one of which has electrodes and a liquid crystal layer sandwiched between the boards, a controlling circuit for applying to the above-described electrodes a voltage corresponding to a displayed image-signal, and a light-source for illuminating the liquid crystal panel, the following configuration is required in order to obtain a much more beautiful motion-frame picture display: The light-source includes a lamp, a reflector for reflecting a light emitted from the lamp, and a light-guiding plate for guiding the reflected light to the liquid crystal layer, the lamp being located in the length direction of at least one side of a side plane of the light-guiding plate, the light-source having a period including a lighting-up time-period and a pausing time-period, an illumination light-quantity of the light-source being changed by a time ratio of the lighting-up time-period and that of the pausing time-period during the period and a voltage value for causing the light-source to perform the light-emission. The light-source unit in the display apparatus is referred to as the so-called sidelight type, and the 1 lamp is, or the 2 or 3 lamps are used and located in the thickness direction. Also, in what position of the 4 sides of the light-guiding plate the lamp should be located is determined by the luminance of the display apparatus and the transmittances of the liquid crystal cells.

Although the 1 lamp is located along the long-side of the light-guiding plate in a high-transmittance liquid crystal such as the TN type liquid crystal, in order to obtain a higher luminance, the 1 lamp may be each located along the 2 long-sides, or the 1 lamp may be each located along the short-side. Besides, the lamps may not be a linearly straight-line type but be the L-character type or the ⊐-character type having winding points. In the IPS mode with a low transmittance, the 2 or 3 lamps may be each located along the 2 long-sides.

In addition, in a liquid crystal display apparatus that includes a liquid crystal panel including a pair of opposed-located boards at least one of which has electrodes and a liquid crystal layer sandwiched between the boards, a controlling circuit for applying to the above-described electrodes a voltage corresponding to a displayed image-signal, and a light-source for illuminating the liquid crystal panel, employing the following configuration becomes required: The light-source includes a plurality of fluorescent lamps located directly under the effective display region of the liquid crystal panel, and a plurality of reflectors for reflecting lights from the respective lamps. The light-source has a period including a lighting-up time-period and a pausing time-period. It is also required to change an illumination light-quantity of the light-source by a time ratio of the lighting-up time-period and that of the pausing time-period during the period and a voltage value for causing the light-source to perform the light-emission. This light-source unit is the directly-under type. The number of the lamps is about 4 to 12 in the long-side direction or about 4 to 20 in the short-side direction, depending on the luminance and the screen size.

In the light-source unit, conventionally, the lamps have been located outside the effective display region of the liquid crystal panel. This is intended to prevent the liquid crystal cells from being heated by the heat-liberation of the lamps. The liquid crystal has a property that the value of the refractive index is varied by the temperature change and the transmittance is varied accordingly. On account of this, in the case of being heated locally, its partial transmittance, i.e., the luminance or the brightness, is varied, becoming the display unevenness. The light-source unit of the present invention, however, exhibits a less heat-liberation, thus making it unlikely that such a display unevenness will occur. Accordingly, it is possible to locate the lamps in the light-source inside the display region as is the case with, e.g., the directly-under type. This also makes it possible to reduce the outer configuration size of the display apparatus.

As the lamps used in the light-source unit explained so far, the following are available: A cold-cathode fluorescent lamp, a hot-cathode fluorescent lamp, a xenon lamp, or a vacuum fluorescent display tube. The cold-cathode fluorescent lamp has a characteristic of exhibiting a less heat-liberation. However, in order to perform the heat-dissipation more effectively, enlarging the lamp surface area is required, and it is advisable to set the light-source lamp diameter to be 3 mm or more. Also, setting the glass thickness of the light-source lamp to be 1 mm or more in order to increase the heat specific-gravity results in a more effective heat-dissipation. It is also possible to thicken the light-source lamp diameter and to replace an in-lamp contained gas by xenon.

Based on the explanation given so far, the concrete configurations will be described below concerning the liquid crystal module according to the present invention.

Figure 13A:
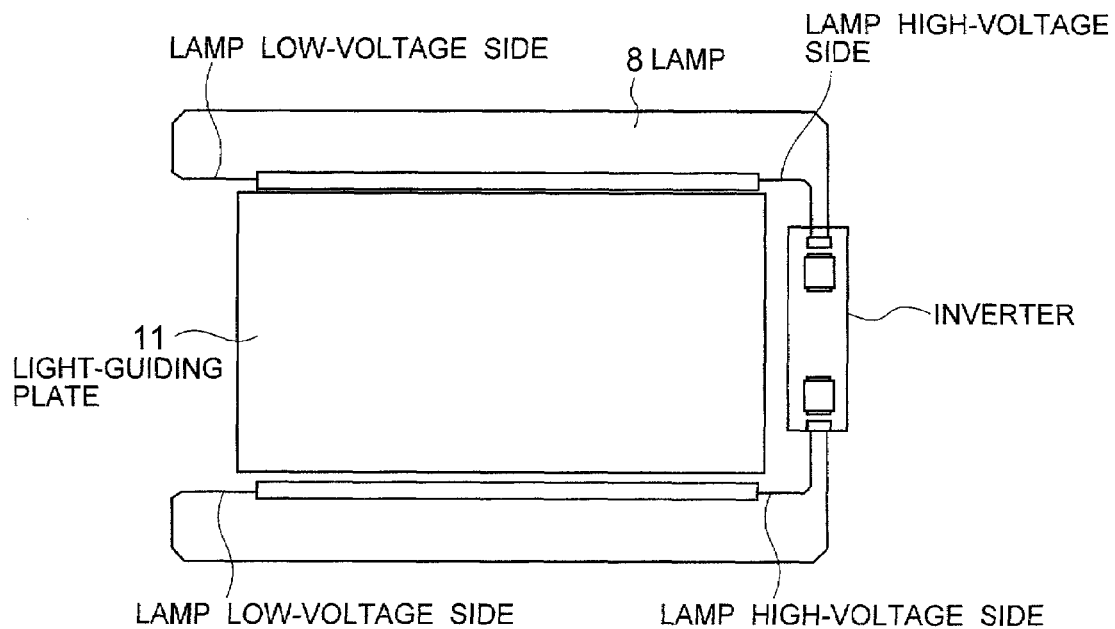
FIGS. 13A and 13B are diagrams for illustrating an embodiment of the sidelight type light-source unit according to the present invention.
Figure 13B:
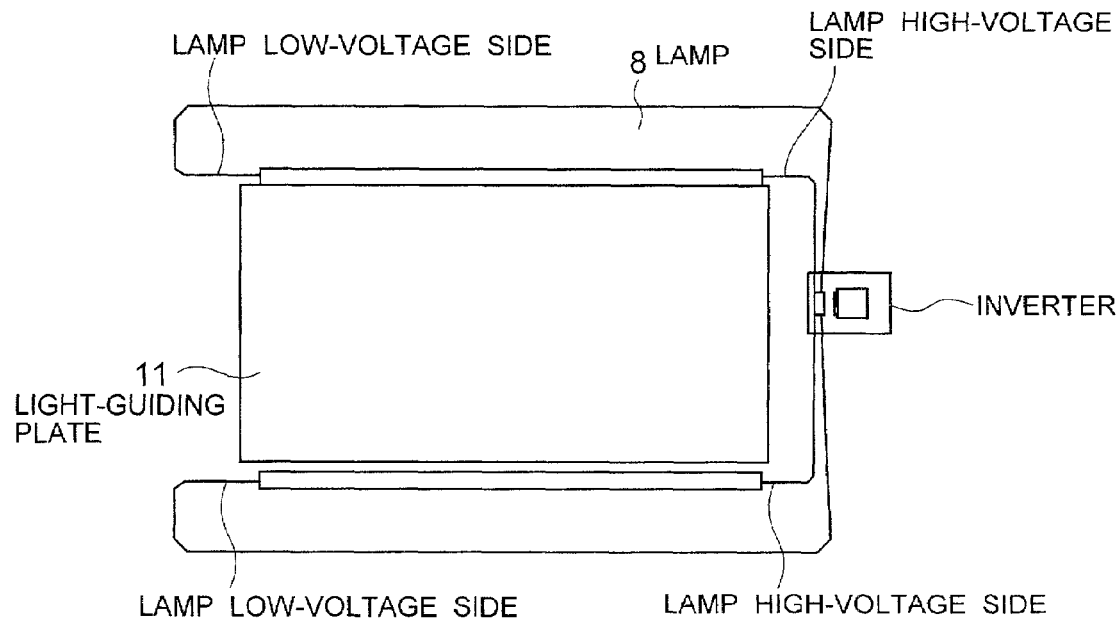

FIGS. 13A and 13B illustrate an embodiment of the light-source unit where one fluorescent lamp 8 is each located along two long-sides of a light-guiding plate 11. FIG. 13A illustrates an inverter location where one transformer lights up the one lamp. Instead, as illustrated in FIG. 13B, the one transformer is able to light up the two lamps. In this case, the reduction in the component number leads to a cost saving. Here, the inverter, which is a generic term for a circuit for lighting up the lamps, includes a converting circuit for converting a direct voltage to an alternating voltage, a current controlling circuit, a frequency modulating circuit, a voltage raising current by the transformer, and so on. Also, in addition to the transformer, the use of a piezoelectric element is possible.

Figure 14A:
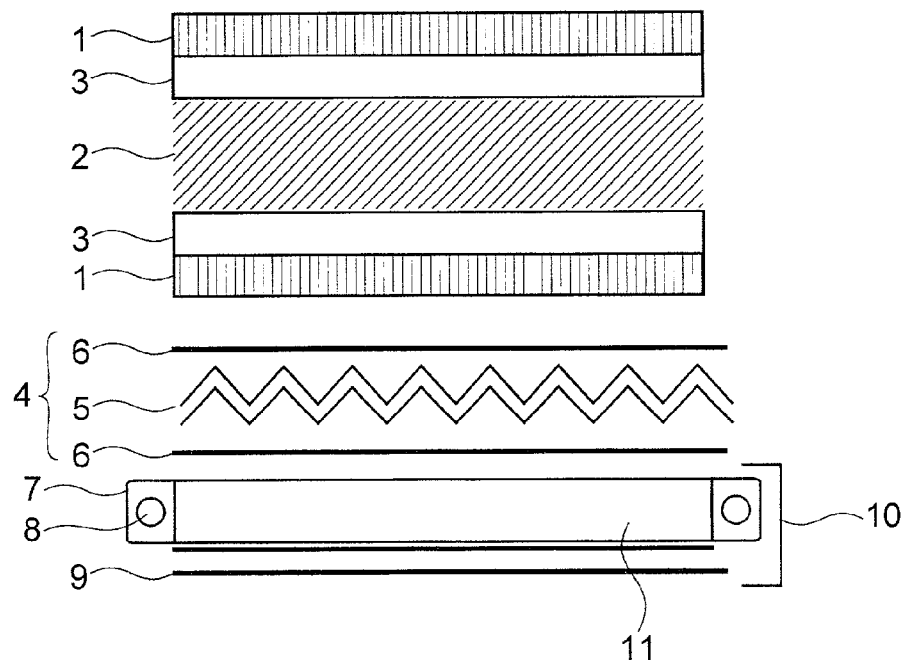
FIGS. 14A and 14B are diagrams for illustrating the structure of the liquid crystal display apparatus (i.e., a transverse electric-field mode liquid crystal display apparatus) using the sidelight type light-source unit according to the present invention.
Figure 14B:
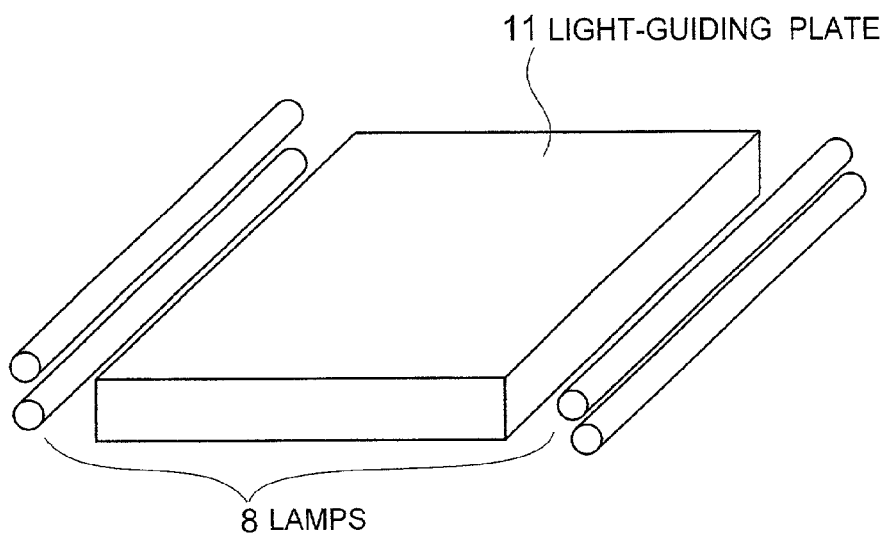
Figure 15:
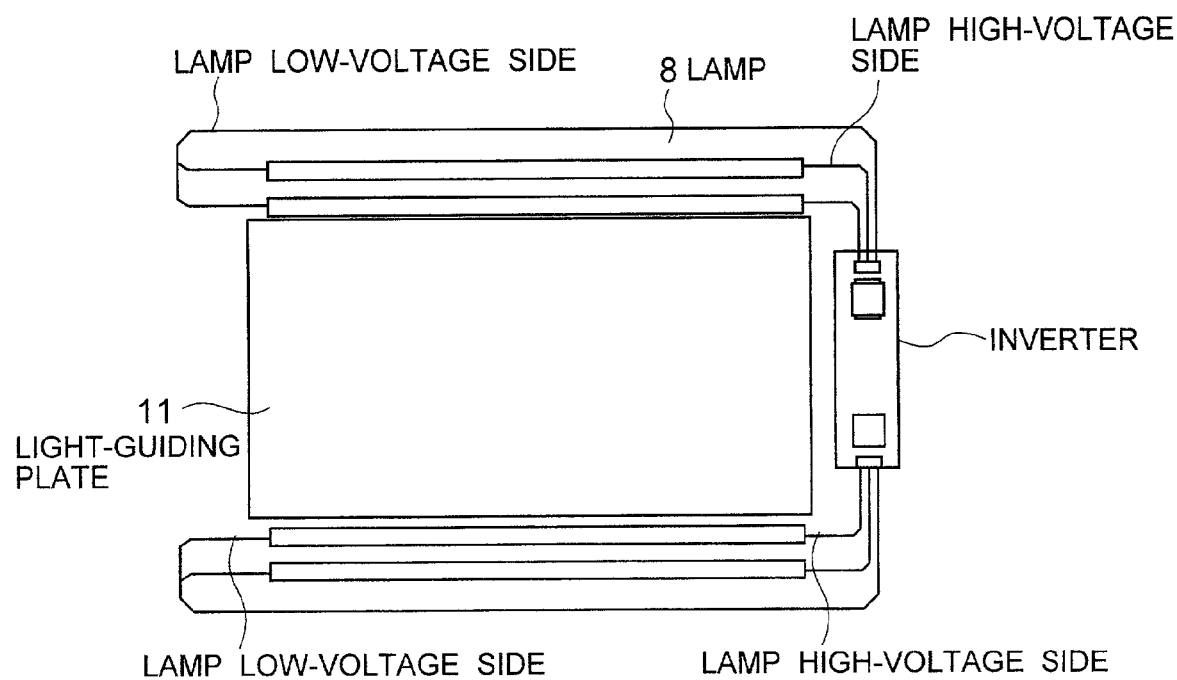
FIG. 15 is a diagram for illustrating the layout of an inverter apparatus used in the liquid crystal display apparatus illustrated in FIGS. 13A, 13B.

FIGS. 14A and 14B illustrate an embodiment of a liquid crystal panel including a transverse electric-field mode liquid crystal display element where a liquid crystal layer 2 has $\Delta nd=0.28$ μm and is parallel-oriented at the twist angle 0°, and an electric field parallel to the board planes is applied thereto. FIG. 14A illustrates a cross-sectional view of the liquid crystal display apparatus. Also, FIG. 14B illustrates a perspective view of a light-source unit 10 mounted thereon. The light-source unit 10 has a sidelight type structure where 2×2, i.e., 4 in total, cold-cathode ray tubes that are 4 mmφ in diameter are located in the long-side direction. Here, it is desirable that the inverter location be of a configuration where, as illustrated in FIG. 15, the one transformer lights up the two fluorescent lamps 8.

<Embodiment 3>

In this embodiment, the explanation will be given below regarding a system for executing a control over the blinking lighting-up of the light-source suitable for the motion-frame picture display in correspondence with the detection of the movement amount.

As described earlier, in the liquid crystal display apparatus, in order to obtain the motion-frame picture display characteristics comparable to those of the CRT, the light-source is switched from the all-the-time lighting-up to the blinking lighting-up that has the lighting-up time-period and the pausing time-period, respectively. This makes it possible to implement the impulse type light-emission such as the CRT. The explanation will be given below concerning the control over this blinking.

Figure 17:
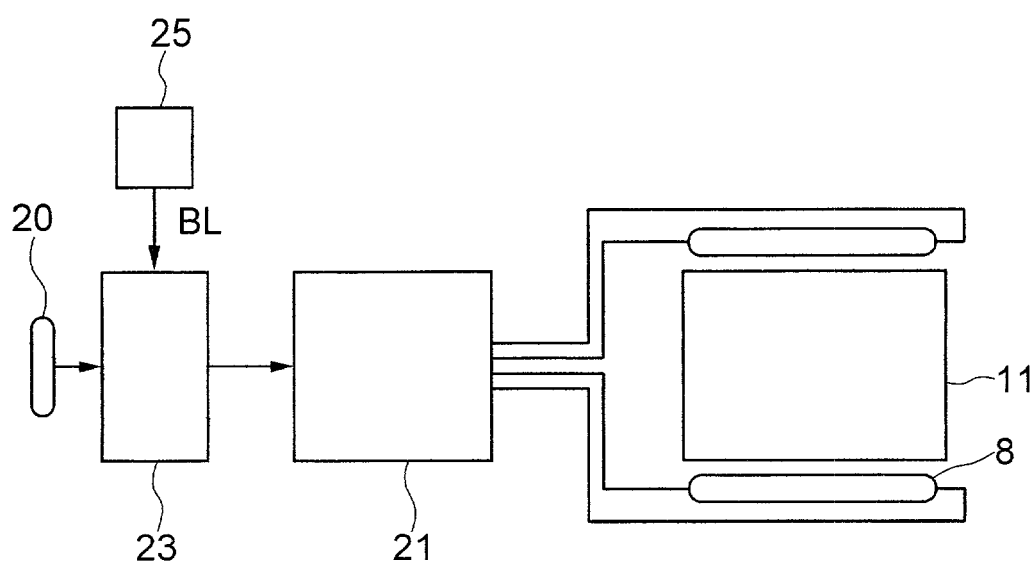
FIG. 17 is a diagram for illustrating the configuration of a controlling circuit for the sidelight type light-source unit according to the present invention.

First, consider the case where, with respect to the display region of the liquid crystal display apparatus, the entire display region as a whole is blinking-lit up simultaneously. Here, the explanation will be given employing, as an example, the system using a sidelight type light-source where one fluorescent lamp 8 is each located along two long-sides of the display region. FIG. 17 illustrates the configuration of a controlling circuit for the sidelight type light-source, wherein the reference numerals denote the following components: 20 an input terminal for feeding a direct power-supply voltage from the liquid crystal display apparatus itself, a television apparatus mounting this thereon, or the like, 23 a light-dimmer circuit for converting the power-supply voltage to a direct voltage equivalent to a voltage to be applied to the light-source, 21 an inverter circuit for converting the direct voltage to an alternating voltage, and 25 a switching controlling circuit for controlling the time ratio of the above-described 1st time-period (i.e., the lighting-up time-period) and that of the above-described 2nd time-period (i.e., the pausing time-period when the 2nd current is set to be 0 mA).

As described earlier, the time ratio of the 1st lighting-up luminance (i.e., the lighting-up time-period) and that of the 2nd lighting-up luminance (i.e., the pausing time-period in the present example) are changed in correspondence with the information amount about the movement of the image-signal, thereby allowing the more beautiful motion-frame picture display. Namely, as illustrated in FIGS. 11A, 11B, and 11C, the lighting-up time-period is made shorter when the movement is fast and the lighting-up time-period is made longer when the movement is slow, or the lighting-up time-period is made shorter when the moving information amount (i.e., the moving pixel number) over the entire surface of the display region is large and the lighting-up time-period is made longer when the moving information amount is small, thereby allowing the more beautiful motion-frame picture display. At this time, the current effective value applied to the lamps for causing the light-source to perform the light-emission during each lighting-up period is changed in correspondence with the ratio of the lighting-up time-period and that of the pausing time-period of the light-source. This changes the illumination light-quantity of the light-source, thus making it possible to stabilize the luminance level of the motion-frame picture display. For example, the time-period in which the 1st lighting-up luminance occupies the period including the 1st lighting-up luminance and the 2nd lighting-up luminance is changed in correspondence with a ratio with which the moving pixel number occupies the pixel number constituting the screen of the entire display region by the display data. If, for example, the ratio with which the moving pixel number occupies the pixel number constituting the entire screen by the display data is equal to 10% or more over 3 frames, the display data is judged to be of motion-frame pictures, and the ratio of the 1st lighting-up luminance is set to be 50% or less. In the cases other than the above, the display data is judged to be of freeze-frame pictures, and the ratio of the 1st lighting-up luminance is set to be 50% or more.

Referring to FIG. 18, an example of the switching controlling circuit 25 will be explained below. FIG. 18 illustrates the configuration of the switching controlling circuit 25, wherein the reference numerals denote the following components: 50 a data storing unit (which, in this case, is a frame memory) for storing display information (Data) by the amount of 1 frame and reading the information in the next frame, 52 a data comparing unit for comparing, on the basis of the corresponding pixels, the present frame display data (Data) with the previous frame display data (Data') read from the data storing unit 50, 53 a pulse controlling unit for fetching an output from the data comparing unit 52 on the basis of the amount of 1 display region (i.e., the amount of 1 frame) so as to generate a starting time p s of the 1st time-period (i.e., the lighting-up time-period) of the light-source lighting-up signal BL and a time pw of the 1st time-period (the unit of ps and pw is assumed to be a horizontal time-period that is equal to one period of Hsync), 51 a line count unit for performing an initialization by the vertical synchronization signal Vsync so as to count the horizontal synchronization signal Hsync, and 54 a pulse generating unit for generating the light-source lighting-up signal BL by a line count value outputted by the line count unit 51 and p s and pw outputted by the pulse controlling unit 53. Here, the data comparing unit 52 compares, on the basis of 1 display pixel (which is synchronized with 1 clock of Dotck), the present frame display data (Data) with the previous frame display data (Data') read from the data storing unit 50. As a result of this, if both of the display data are different from each other, the display data are judged to be of the motion-frame pictures and a motion-frame picture judgement signal is outputted toward the 1 display pixel.

The pulse controlling unit 53 adds the motion-frame picture judgement signals from the data comparing unit 52 by the amount of 1 screen of the display region so as to cut and classify the addition result in a step-like manner, thereby distinguishing the movement information amount of the motion-frame pictures in the display region and setting the starting time ps of the 1st time-period and the time pw of the 1st time-period. In the data comparison between the adjacent frames, when the data that occupy a constant or more ratio (50% or more) with respect to the entire display region which actually displays the image data are in disagreement with each other, the moving information amount is defined as being large. Also, when the data that occupy the constant or less ratio are in disagreement, the moving information amount is defined as being small. Incidentally, the large-or-small of the information amount may also be defined by the comparison with a predetermined information amount. Moreover, the definition of the agreement/disagreement of the data is as follows: In the comparison of the respective pixels, in the case of the data with constant or more tones (e.g., 128 or more tones in the case of 256 tones in total), the data are judged to be in disagreement with each other. Also, in the case of the data with the constant or less tones, the data are judged to be in agreement. FIG. 19 illustrates a timing diagram of the light-source lighting-up signal BL generated by the switching controlling circuit 25 configured as described above. A notation (a) in FIG. 19 illustrates the light-source lighting-up signal BL in the case where, as a result of the comparison by the data comparing unit 52, almost no change has been judged to exist (i.e., a display close to freeze-frame pictures, as describe later, when comparing a pixel 1 frame previously with a corresponding pixel of input data, the amount of the disagreement is found to be 10% or less). A notation (b) in FIG. 19 illustrates BL in the case of a few motion-frame pictures (when comparing the pixel 1 frame previously with the corresponding pixel of the input data, the amount of the disagreement is found to be in the range of 10% to 50%) (when compared with (a), more of the movement information amount exists in (b)). A notation (c) in FIG. 19 illustrates BL in the case of many motion-frame pictures (when comparing the pixel 1 frame previously with the corresponding pixel of the input data, the amount of the disagreement is found to be 50% or more).

In general, the response-rate of the liquid crystal necessitates the 1-frame period or more. Consequently, as illustrated in FIG. 20A, in the conventional hold type all-the-time lighting-up of the light-source, by the time the tone attains to a reach step value to be implemented, a transition tone appears in a state of becoming a display blur. In order to improve this display blur, the lighting-up timings based on the pulse-width and the phase of the light-source are synchronized with timings in which the tone attains to the tone data to be reached. This makes it possible to suppress the display of the transition tone, thereby allowing an excellent motion-frame picture display with a less blur.

Also, the above-described data storing units 50 are provided by the amount of a plurality of frames, thereby making it possible not only to execute the comparison between the adjacent frame data but also to execute the motion-frame picture detection for the time-period of the plurality of frames. This makes it possible to grasp the tendency of the movement, thus allowing a more faithful motion-frame picture judgement.

Figure 21A:
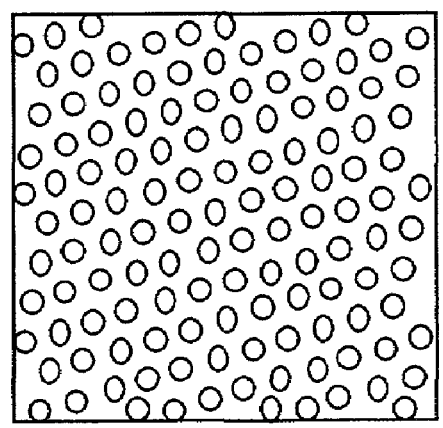
FIGS. 21A and 21B are diagrams for illustrating an embodiment of a detection point of the data comparison in the present invention.
Figure 21B:
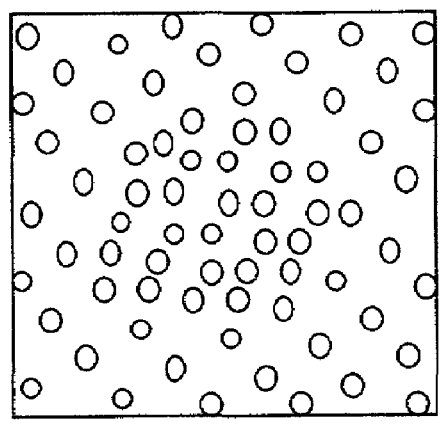

In the switching controlling circuit 25 explained so far, the frame memory is provided as the data storing unit 50 so as to store the display data by the amount of arbitrary frames, thereby executing the data comparison concerning the display data by the amount of arbitrary frames and generating the light-source lighting-up signal BL in correspondence with the comparison result. However, accompanying the display region's expansion (which means the display resolution here) of the liquid crystal display apparatus, the memory capacity of the data storing unit 50 is increased. When the display region was small, the switching controlling circuit 25 could be implemented by a 1-chip of controlling circuit (i.e., LSI). Because of this capacity increase, however, the switching controlling circuit 25 must become a circuit of a 2-chip-or more of controlling circuit configuration where the data storing unit 50 is externally attached as the liquid crystal display region is expanded. This becomes a problem not only from the cost side of the controlling circuit but also from the implementation side of the board components. Accordingly, instead of the above-described method of storing the display data in the entire display region by the amount of 1 frame, the data storing unit 50 may also be formed into the following register configuration: Data comparing pixels (i.e., detection points) have been determined in advance in the display region, and only the display data on the pixels are stored. However, the total number of the pixels to be compared, which is determined by a restriction on the controlling circuit size, is required to be determined so that the total number in the case of using the frame memory and that in the case of being formed into the register configuration become substantially the same result. Here, FIGS. 21A, 21B illustrate examples of the data comparing pixels (i.e., the detection points). FIG. 21A illustrates the case where the detection points are set uniformly over the display region of the display screen. FIG. 21B illustrates the case where the detection points are set in a manner of being concentrated onto the center of the screen. In the case of FIG. 21A where the points are distributed uniformly, the point number that becomes equal to a constant ratio with respect to the entire display region which actually displays the display data (for example, when the constant ratio is set to be 10%, if the actual display region includes horizontal 1024 pixels×vertical 768 pixels, i.e., 786432 pixels in total, the point number becomes equal to its 10%, i.e., 78643 pixels) is distributed uniformly over the actual display region. Meanwhile, in the case of FIG. 21B illustrating the central distribution, the constant ratio point number (i.e., 78643 pixels) is distributed more in the central portion than in the peripheral portion over the display region.

In the recent personal computers, the OS (i.e., operating system) employing the Windows system has become the mainstream, and thus the computers allow a plurality of windows to be displayed on the screen. In addition, since it can be considered that the window being in use at present is often displayed in the center of the screen, the setting of the detection points in FIG. 21B becomes effective.

Figure 22:
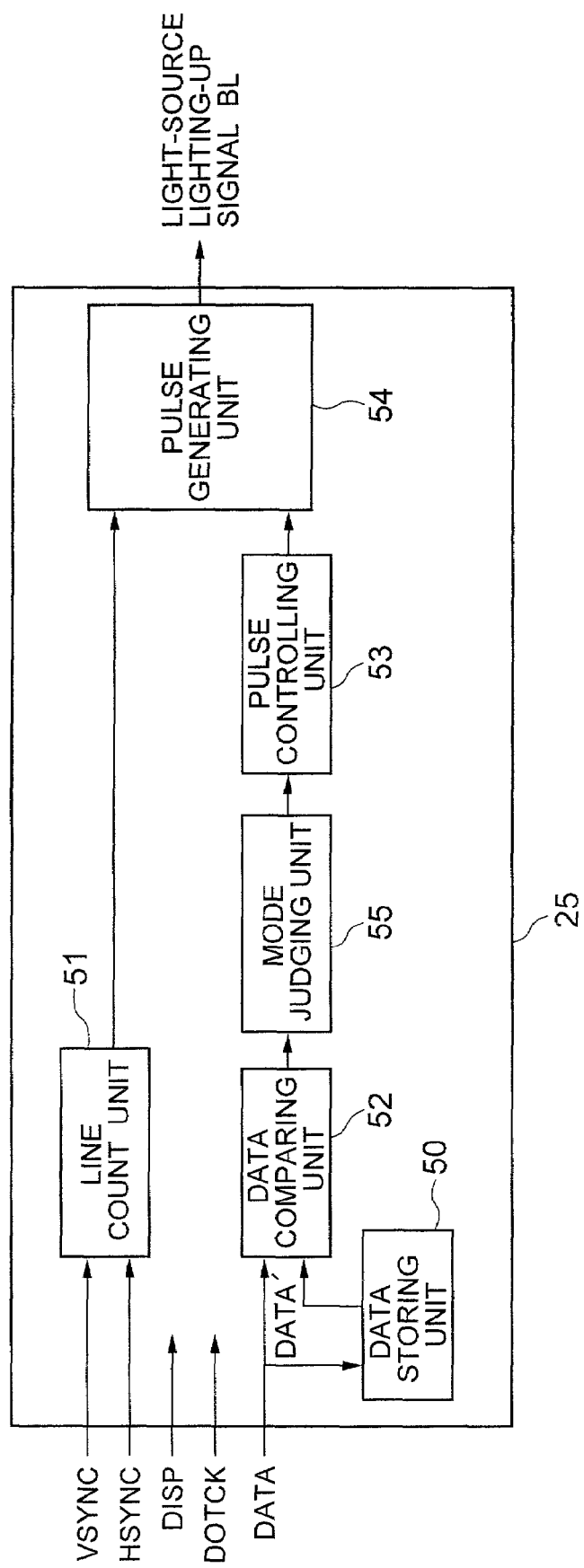
FIG. 22 is a diagram for illustrating an embodiment of the switching controlling circuit 25 illustrated in FIG. 17.

In order to implement a more complete motion-frame picture display, it is advisable not only to cause the light-source unit to perform the impulse type light-emission but also to synchronize the data scanning timings of the image-signal with the timings of the blinking of the light-source. In the present embodiment, in the center of the screen, the data scanning timings of the image-signal have been synchronized with the timings of the blinking of the light-source. However, being not limited to this method, it is also advisable to determine the lighting-up starting time in correspondence with the image information of the entire display region. Referring to FIG. 22, an example of the switching controlling circuit 25 for implementing this method will be explained below.

Figure 23:
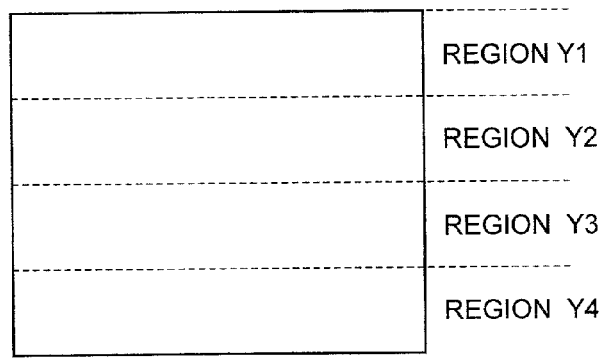
FIG. 23 is a diagram for illustrating a dividing method for a display screen for explaining the switching controlling circuit 25 illustrated in FIG. 22.
Figure 24:
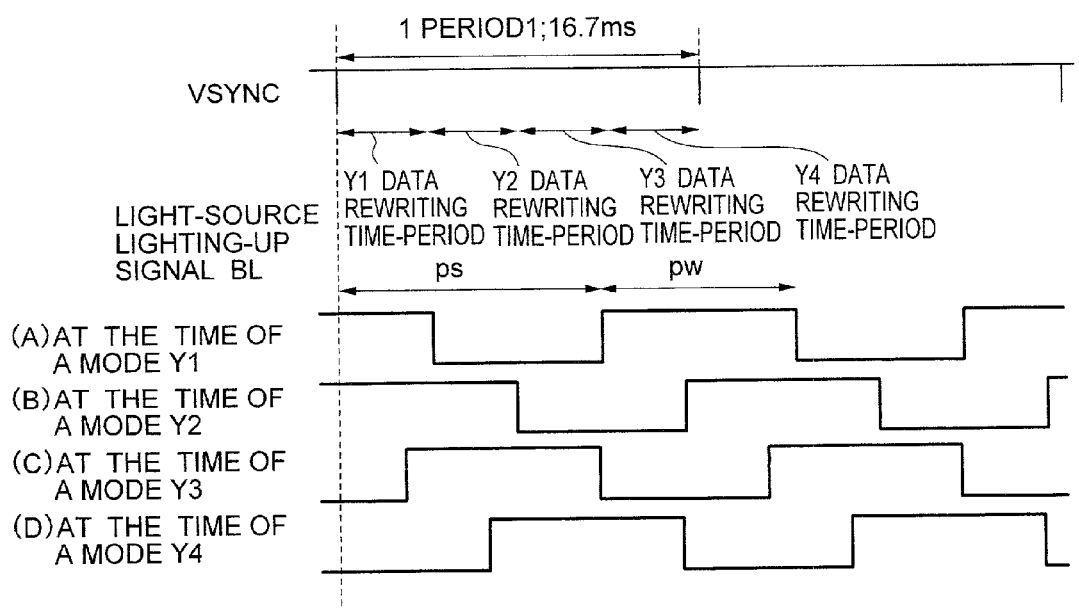
FIG. 24 is a timing diagram of a light-source lighting-up signal BL generated by the switching controlling circuit 25 illustrated in FIG. 22.

A switching controlling circuit 25 illustrated in FIG. 22 is the same as the circuit explained in FIG. 18, except for the location of a mode judging unit 55 for dividing the display region into a plurality of regions (e.g., dividing the display region into 4 regions as illustrated in FIG. 23) so as to judge in which region there exist many motion-frame picture displays. The data comparing unit 52 compares, on the basis of 1 display pixel (which is synchronized with 1 clock of Dotck), the present frame display data (Data) with the previous frame display data (Data') read from the data storing unit 50. As a result of this, if both of the display data are different from each other, the display data are judged to be of the motion-frame pictures and the motion-frame picture judgement signal is outputted toward the 1 display pixel. The mode judging unit 55, as illustrated in FIG. 23, divides the display region into the 4 regions and adds the motion-frame picture judgement signals for each region, then outputting, from this addition result, a mode signal for indicating a region where there exist the most motion-frame picture judgement signals. Next, in accordance with the mode signal, the pulse controlling unit 53 sets a starting time ps of the 1st time-period and a time pw of the 1st time-period. FIG. 24 illustrates an example of a timing diagram of the light-source lighting-up signal BL generated by the switching controlling circuit 25 configured as described above. A notation (a) in FIG. 24 illustrates the light-source lighting-up signal BL at the time of a mode Y1 where, in the uppermost portion Y1 within the divided display regions illustrated in FIG. 23, the most motion-frame pictures exist in comparison with the other 3 regions. Namely, the starting time ps of the 1st time-period and the time pw of the 1st time-period are set so that the 2nd time-period (i.e., the pausing time-period) will start immediately after the writing of the display data in this region Y1 has been terminated (i.e., the starting time of a n/4th signal scanning when there exist n signal scanning lines of the display apparatus).

Hereinafter, similarly, notations (b), (c) and (d) in FIG. 24 illustrate the case where the 2nd display region Y2 is in the mode, the case where the 3rd display region Y3 is in the mode, and the case where the 4th display region Y4 is in the mode, respectively.

Figure 25:
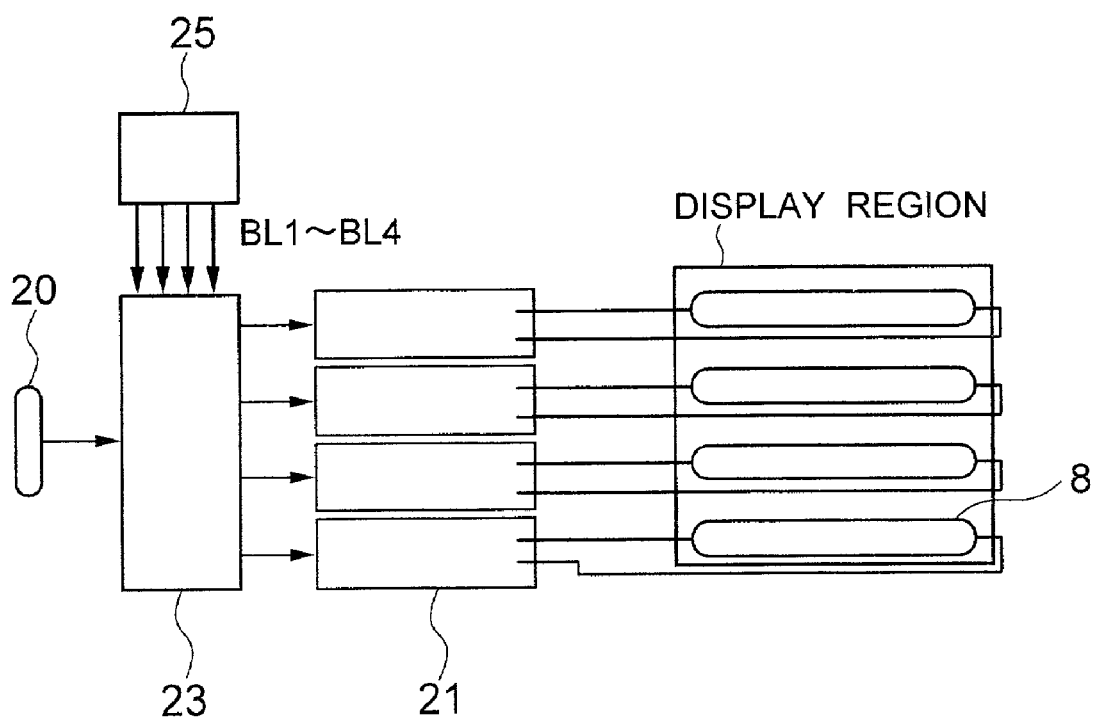
FIG. 25 is a diagram for illustrating the configuration of a controlling circuit for the directly-under type light-source unit according to the present invention.
Figure 26:
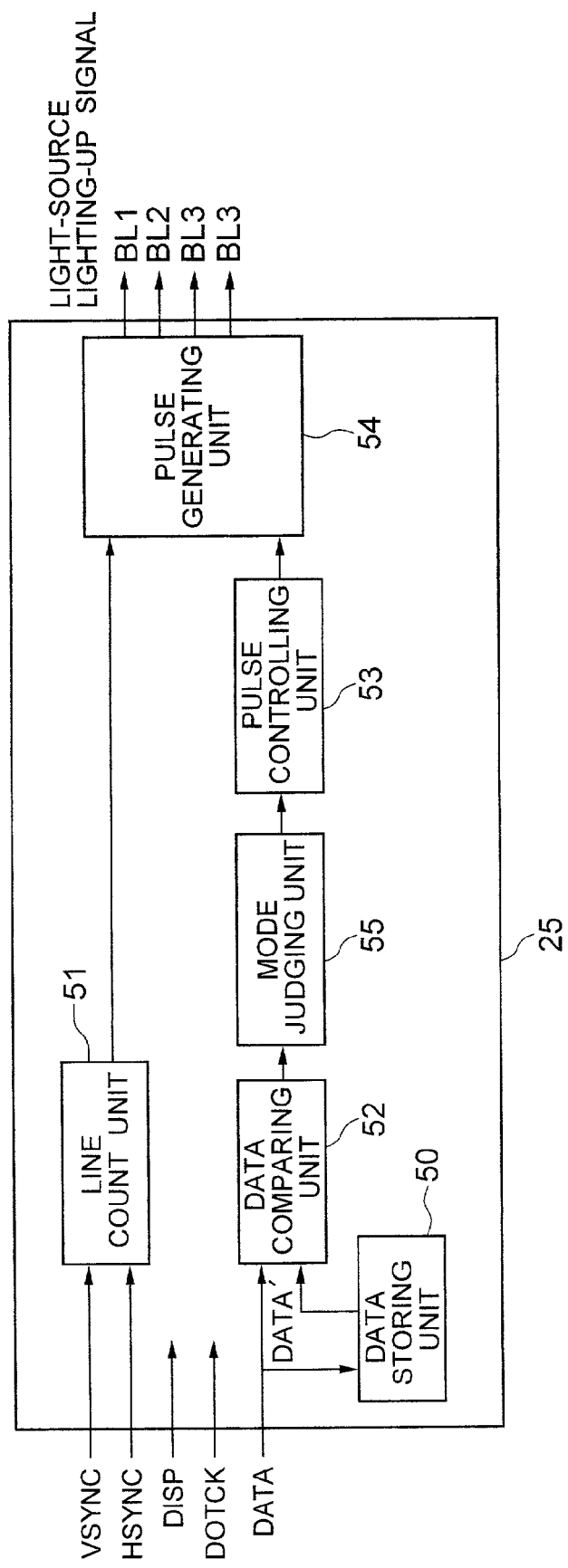
FIG. 26 is a diagram for illustrating an embodiment of the switching controlling circuit 25 illustrated in FIG. 25.

Next, consider the case where the display region of the liquid crystal display apparatus is divided into a plurality of regions so as to blinking-light up the respective regions individually. Here, since a system using the directly-under type light-source can be easily implemented, the explanation will be given below employing the system as an example. FIG. 25 illustrates the configuration of a controlling circuit for the directly-under type light-source. Four fluorescent lamps 8 are provided, and inverters 21 for controlling the lamps are each prepared for the respective lamps, i.e., the four inverters 21 in total. The other reference numerals denote the starting components: 20 an input terminal for feeding a direct power-supply voltage, 23 a light-dimmer circuit for converting the power-supply voltage to a direct voltage equivalent to a voltage to be applied to the light-source, and 25 a switching controlling circuit for controlling the time ratio of the above-described 1st time-period (i.e., the lighting-up time-period) and that of the above-described 2nd time-period (i.e., the pausing time-period when the 2nd current is set to be 0 mA). FIG. 26 illustrates the configuration of the switching controlling circuit 25.

Since the directly-under type light-source is configured by the 4 fluorescent lamps 8, the display region is divided into 4 regions as is the case with the display region illustrated in FIG. 23. The switching controlling circuit 25 generates and outputs light-source lighting-up signals BL1 to BL4 for executing the control over the blinking lighting-up of the respective fluorescent lamps 8. The data comparing unit 52 compares, on the basis of 1 display pixel (which is synchronized with 1 clock of Dotck), the present frame display data (Data) with the previous frame display data (Data') read from the data storing unit 50. As a result of this, if both of the display data are different from each other, the display data are judged to be of the motion-frame pictures and the motion-frame picture judgement signal is outputted toward the 1 display pixel. The mode judging unit 55, as illustrated in FIG. 23, divides the display region into the 4 regions and adds the motion-frame picture judgement signals for each region, then outputting, from this addition result, the mode signal for indicating a region where there exist the most motion-frame picture judgement signals. The mode signal does not simply select and indicate the 1 region where there exist the most motion-frame picture judgement signals, but also may indicate 2 or more regions, depending on the display. Also, in the case of indicating the 2 or more regions, it presents no problem whether the 2 regions are adjacent regions or dispersed regions. In addition, it is possible to easily control the 2 regions by the large-or-small relationship in the addition result of the per-region motion-frame picture judgement signals outputted from the mode judging unit 55.

Figure 27:
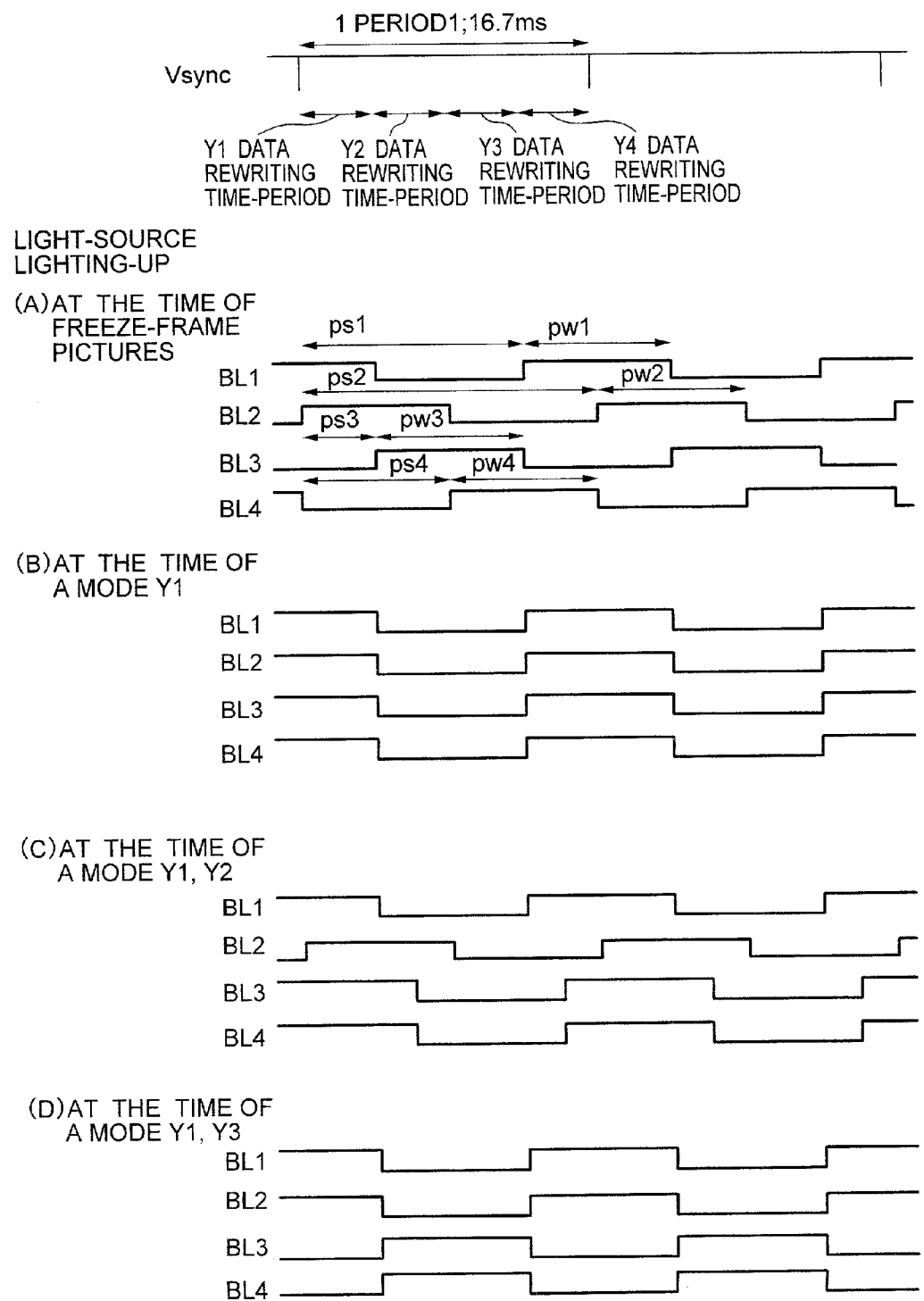
FIG. 27 is a timing diagram of light-source lighting-up signals BL 1 to BL 4 generated by the switching controlling circuit 25 illustrated in FIG. 26.

Next, in accordance with the mode signal, the pulse controlling unit 53 sets starting times (i.e., ps 1 to ps 4) of the 1st time-period and times (i.e., pw 1 to pw 4) of the 1st time-period in the light-source lighting-up signals BL1 to BL4 for the respective display regions. Next, the pulse generating unit 54 generates the light-source lighting-up signals BL1 to BL4 by the line count value outputted by the line count unit 51 and ps 1 to ps 4 and pw 1 to pw 4 outputted by the pulse controlling unit 53. FIG. 27 illustrates an example of a timing diagram of the light-source lighting-up signals BL1 to BL4 generated by the switching controlling circuit 25 configured as described above. A notation (a) in FIG. 27 illustrates BL1 to BL4 in the case where there exist a few motion-frame displays (naturally, the case of freeze-frame pictures is also included) or in the case where, even if there exist motion-frame pictures to some extent, a difference in their total number cannot be detected for each region (i.e., there exists no mode). Because there exists no mode, an optimum setting is performed for each region. Namely, in the region Y1, the starting time ps 1 of the 1st time-period and the time pw 1 of the 1st time-period are set so that the 2nd time-period will start immediately after the writing of the display data in this region Y1 has been terminated (i.e., the starting time of a n/4th signal scanning when there exist n signal scanning lines of the display apparatus), thereby generating the light-source lighting-up signal BL1. Hereinafter, similarly, in the region Y2, ps 2 and pw 2 are set so that the 2nd time-period will start immediately after the writing of the display data in this region Y2 has been terminated (i.e., the starting time of a 2n/4th signal scanning when there exist the n signal scanning lines of the display apparatus), thereby generating BL2. In the region Y3, ps 3 and pw 3 are set so that the 2nd time-period will start immediately after the writing of the display data in this region Y3 has been terminated (i.e., the starting time of a 3n/4th signal scanning when there exist the n signal scanning lines of the display apparatus), thereby generating BL3. In the region Y4, ps 4 and pw 4 are set so that the 2nd time-period will start immediately after the writing of the display data in this region Y4 has been terminated (i.e., the starting time of a nth signal scanning when there exist the n signal scanning lines of the display apparatus), thereby generating BL4. A notation (b) in FIG. 27 illustrates BL1 to BL4 in the case where the most motion-frame picture judgement signals exist in the region Y1 (i.e., the mode Y1). In order to optimize the motion-frame picture display in the region Y1, the lighting-up control over the light-source is executed under a condition that the other regions Y2 to Y4 are synchronized with the region Y1. Namely, the starting times ps 1 to ps 4 of the 1st time-period and the times pw 1 to pw 4 of the 1st time-period are set to be the same value so that the 2nd time-period will start immediately after the writing of the display data in the region Y1 has been terminated (i.e., the starting time of a n/4th signal scanning when there exist the n signal scanning lines of the display apparatus), thereby generating the light-source lighting-up signals BL1 to BL4. Also, a notation (c) in FIG. 27 illustrates BL1 to BL4 in the case where many of the motion-frame picture judgement signals exist in the regions Y1 and Y2 (i.e., the modes Y1, Y2). In order to optimize the motion-frame picture displays in the regions Y1, Y2, an optimum setting is performed with respect to each of the regions, and the lighting-up control over the light-source is executed under a condition that the other regions Y3, Y4 are synchronized with the regions Y1, Y2 (here, an average value between the optimum setting of Y1 and that of Y2 is employed). Namely, in the region Y1, ps 1 and pw 1 are set so that the 2nd time-period will start immediately after the writing of the display data in the region Y1 has been terminated (i.e., the starting time of a n/4th signal scanning when there exist the n signal scanning lines of the display apparatus), thereby generating the light-source lighting-up signal BL1. In the region Y2, ps 2 and pw 2 are set so that the 2nd time-period will start immediately after the writing of the display data in the region Y2 has been terminated (i.e., the starting time of a 2n/4th signal scanning when there exist the n signal scanning lines of the display apparatus), thereby generating BL2. In the regions Y3 and Y4, ps 3, ps 4 and pw 3, pw 4 are set so that the 2nd time-period will start immediately after the writing of an immediate row display data in the region Y2 has been terminated (i.e., the starting time of a 5n/8th signal scanning when there exist the n signal scanning lines of the display apparatus), thereby generating BL3, BL4. Furthermore, a notation (d) in FIG. 27 illustrates BL1 to BL4 in the case where many of the motion-frame picture judgement signals exist in the regions Y1 and Y3 (i.e., the modes Y1, Y3). In order to optimize the motion-frame picture displays in the regions Y1, Y3, an optimum setting is performed with respect to each of the regions, and the lighting-up control over the light-source is executed under a condition that the other region Y2 is synchronized with the region Y1 and the other region Y4 is synchronized with the region Y3. Namely, in the regions Y1 and Y2, ps 1, ps 2 and pw 1, pw 2 are set so that the 2nd time-period will start immediately after the writing of the display data in the region Y1 has been terminated (i.e., the starting time of a n/4th signal scanning when there exist the n signal scanning lines of the display apparatus), thereby generating the light-source lighting-up signals BL1, BL2. In the regions Y3 and Y4, ps 3, ps 4 and pw 3, pw 4 are set so that the 2nd time-period will start immediately after the writing of an immediate line display data in the region Y3 has been terminated (i.e., the starting time of a 3n/4th signal scanning when there exist the n signal scanning lines of the display apparatus), thereby generating BL3, BL4.

Additionally, FIG. 27 has illustrated the light-source lighting-up signals in correspondence with the mode judging result of the motion-frame picture display. Being not limited thereto, however, it presents no problem at all to perform the setting so that the motion-frame picture display becomes the most appropriate. Also, although the explanation has been given here regarding the method of performing the control in accordance with the mode judgement alone, as having been described earlier in FIG. 19, it presents no problem at all to set the starting times (i.e., ps 1 to ps 4) of the 1st time-period and the times (i.e., pw 1 to pw 4) of the 1st time-period in each region in correspondence with the total number of the motion-frame pictures.

Next, the description will be given below concerning a light-source lighting-up control in response to the display luminance of a displayed image.

Figure 28:
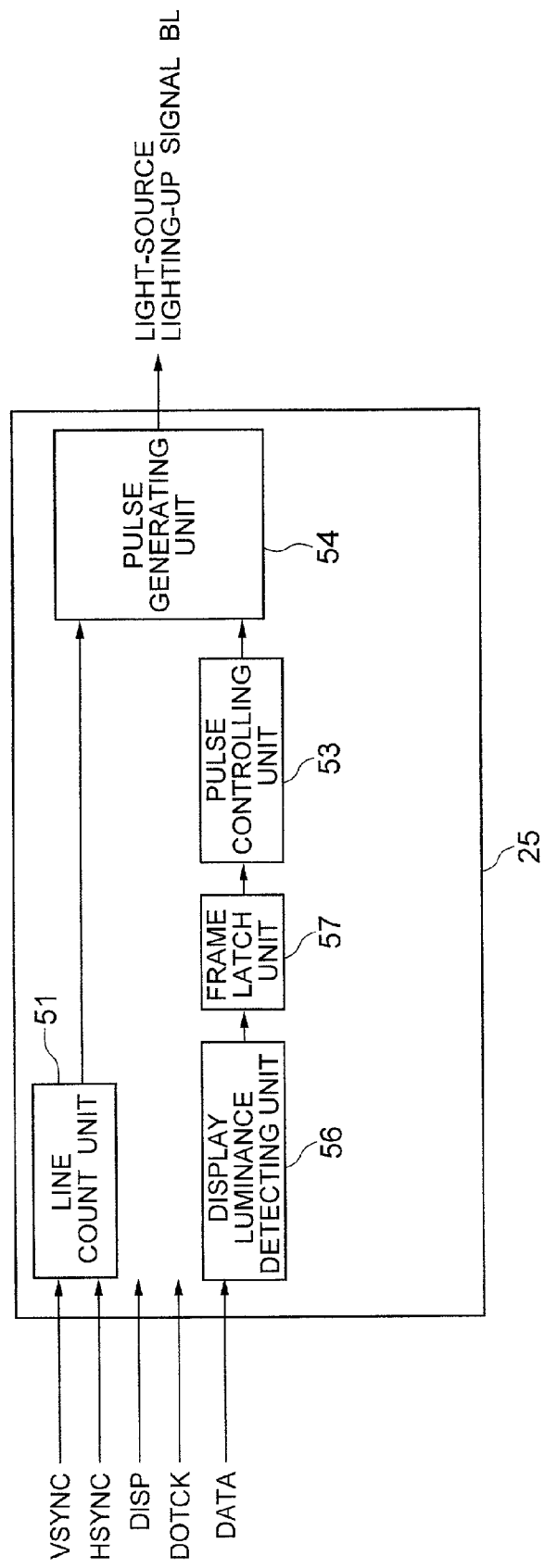
FIG. 28 is a diagram for illustrating a switching controlling circuit 25 for implementing a light-source lighting-up control in correspondence with the display luminance of a displayed image according to the present invention.
Figure 29:
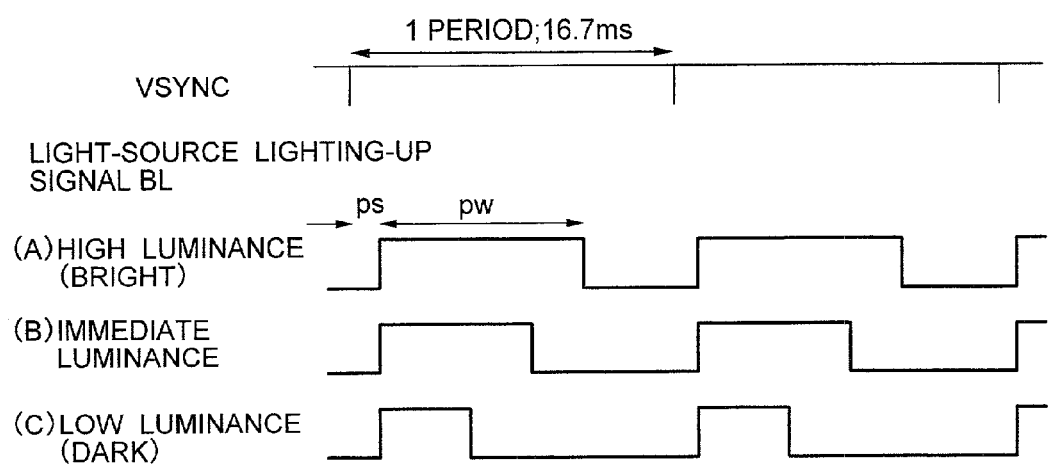
FIG. 29 is a timing diagram of a light-source lighting-up signal BL generated by the switching controlling circuit 25 illustrated in FIG. 28.

In the conventional light-source unit, since the fluorescent lamps are always lit up regardless of whether the image-signal is of the bright display or the dark display, the energy efficiency has been worsened. In contrast to this, the illumination light-quantity of the light-source is controlled in compliance with the information amount of the image-signal (e.g., the luminance information or the like). This enhances the light-emission efficiency of the fluorescent lamps, thereby making it possible to implement a further luminance enhancement based on the saving of the power consumption and the suppression of the rise in the lamp temperature. Namely, the illumination light-quantity of the light-source is decreased when the image is dark, and the illumination light-quantity is increased when the image is bright. In this way, the time ratio of the above-described 1st time-period (i.e., the lighting-up time-period) and that of the above-described 2nd time-period (i.e., the pausing time-period when the 2nd current is set to be 0 mA) are changed in correspondence with the information on the bright-or-dark of the image-signal, thereby making it possible to control the light-source illumination light-quantity. FIG. 28 is a diagram for illustrating a switching controlling circuit 25 for performing this lighting-up control. In the drawing, the reference numerals denote the following components: 56 a display luminance detecting unit for accumulating the luminance information by the amount of 1 frame from the inputted display data so as detect a display luminance (i.e., average luminance) level over the entire display region, 57 a frame latch unit for latching the result by the display luminance detecting unit 56 for a constant time-period, 53 a pulse controlling unit that, in accordance with the display luminance detection result which is the output from 57, sets a starting time ps of the 1st time-period and a time pw of the 1st time-period in a light-source lighting-up signal for each display region, and 54 a pulse generating unit for generating the light-source lighting-up signal BL by a line count value outputted by a line count unit 51 and ps and pw outputted by the pulse controlling unit 53. FIG. 29 illustrates a timing diagram of the light-source lighting-up signal BL generated by the switching controlling circuit 25 configured as described above.

A notation (a) in FIG. 29 illustrates the light-source lighting-up signal BL in the case where, as a result of the display luminance detecting unit 56, the average luminance of the screen is found to be high (i.e., bright). A notation (b) in FIG. 29 illustrates BL in the case where the average luminance is found to be immediate. A notation (c) in FIG. 29 illustrates BL in the case where the average luminance is found to be low (i.e., dark). Incidentally, when a switching is made at a high-speed between the display data with a high display luminance and the display data with a low display luminance, if, in synchronization with this switching, the light-source illumination light-quantity is also switched at a high-speed, this switching is visualized as a flicker of the display, thus becoming a problem. Accordingly, in the present controlling circuit, the display luminance information latching unit 57 is provided, thereby relaxing the high-speed switching of the light-source illumination light-quantity.

Figure 30:
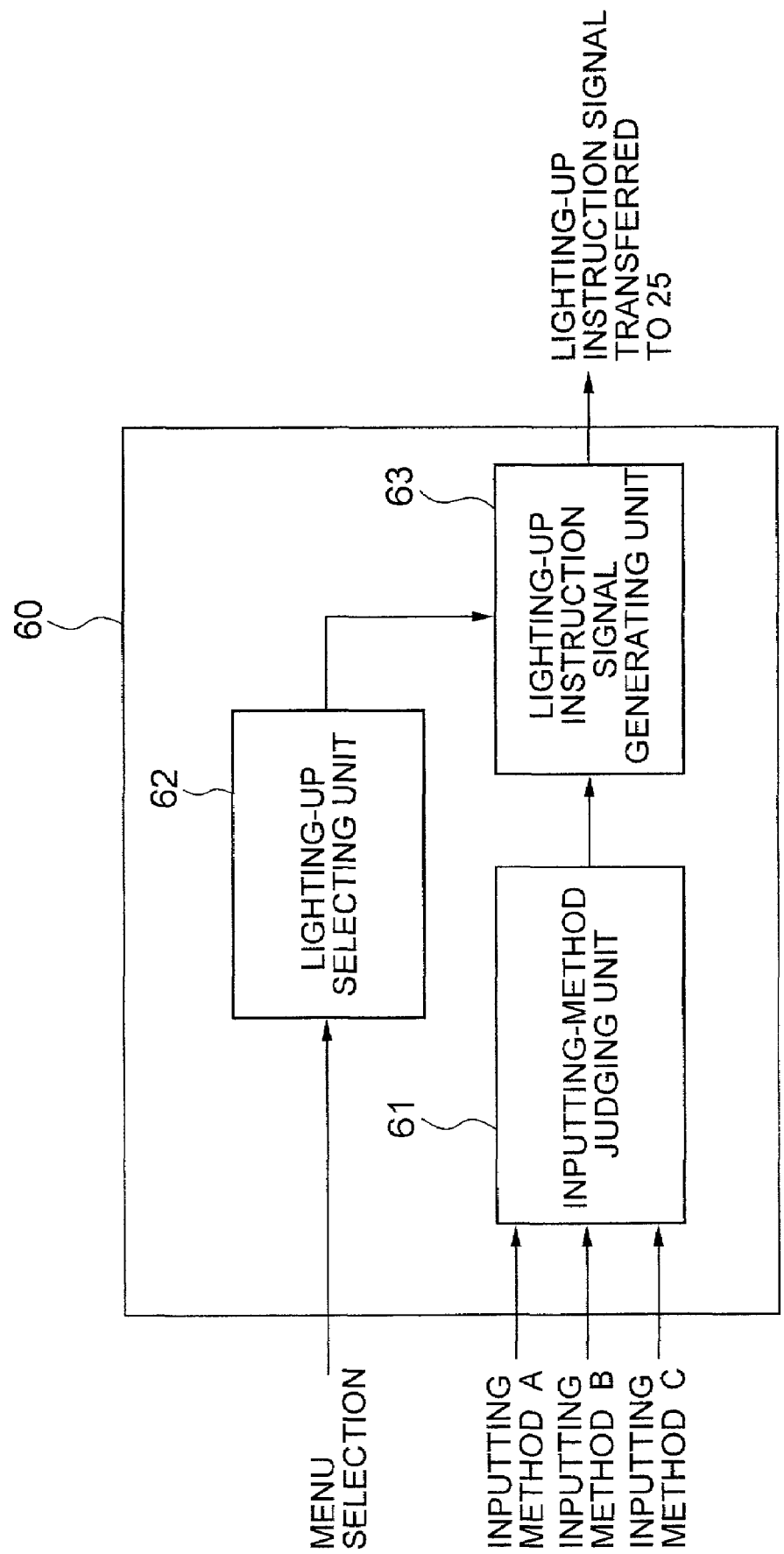
FIG. 30 is a diagram for illustrating the configuration of a lighting-up method instructing circuit 60 according to the present invention.

Also, depending on an image displayed on the liquid crystal display apparatus, or depending on the user's convenience, there are some cases where the ordinary continuous lighting-up is employed instead of the blinking lighting-up of the light-source according to the present invention. On account of this, it is desirable to equip the above-described switching controlling circuit with a section for inputting a lighting-up menu selection signal from the outside. FIG. 30 illustrates an example of this section. FIG. 30 is a diagram for illustrating the configuration of a lighting-up method instructing circuit 60, wherein the reference numerals denote the following components: 61 an inputting-method judging unit for judging the inputting method of a display image-signal, 62 a lighting-up selecting unit by which the user determines whether or not to employ the above-described blinking lighting-up of the light-source (i.e., menu selection), and 63 a lighting-up instruction signal generating unit for outputting a lighting-up instruction signal for allowing the blinking lighting-up to be executed in accordance with the output results from 61 and 62. At present, as the display apparatuses mounting the liquid crystal display apparatus thereon, there exist a liquid crystal monitor, a liquid crystal television, or the like. As the inputting methods of the display image-signal of these apparatuses, there exist an analogue RGB inputting in use for a personal computer, a composite inputting and an S image terminal inputting in use for a video monitor, a color-difference inputting in use for a DVD player, an antenna inputting in use for a television, or the like. On account of this, the inputting-method judging unit 61 judges what the inputting method is in view of a connection state between the inputting methods and the display apparatuses. As the result by the inputting-method judging unit 61, if the inputting method is judged to be, e.g., the analogue RGB inputting in use for a personal computer, the lighting-up instruction signal generating unit 63 judges that there exist a few motion-frame pictures, instructing the apparatus not to execute the blinking lighting-up of the light-source. Meanwhile, if the inputting method is judged to be, e.g., the inputting in use for a video monitor or a television, the unit 63 judges that most of the pictures are the motion-frame pictures, instructing the apparatus to execute the blinking lighting-up of the light-source. Additionally, assuming that these will be set automatically, the menu selection plays a role of allowing the user to freely select the blinking lighting-up of the light-source.

<Embodiment 4>

In this embodiment, the explanation will be given below concerning a system that, in correspondence with the tone characteristic detection of input image data, executes a tone control and a light-source blinking lighting-up control which are suitable for the motion-frame picture display. Incidentally, the present embodiment describes, as its one configuration example, a display system that the present inventor has prototyped in order to confirm the effect actually with the use of a TFT module mounting an 8-lamp directly-under type backlight.

Figure 31:
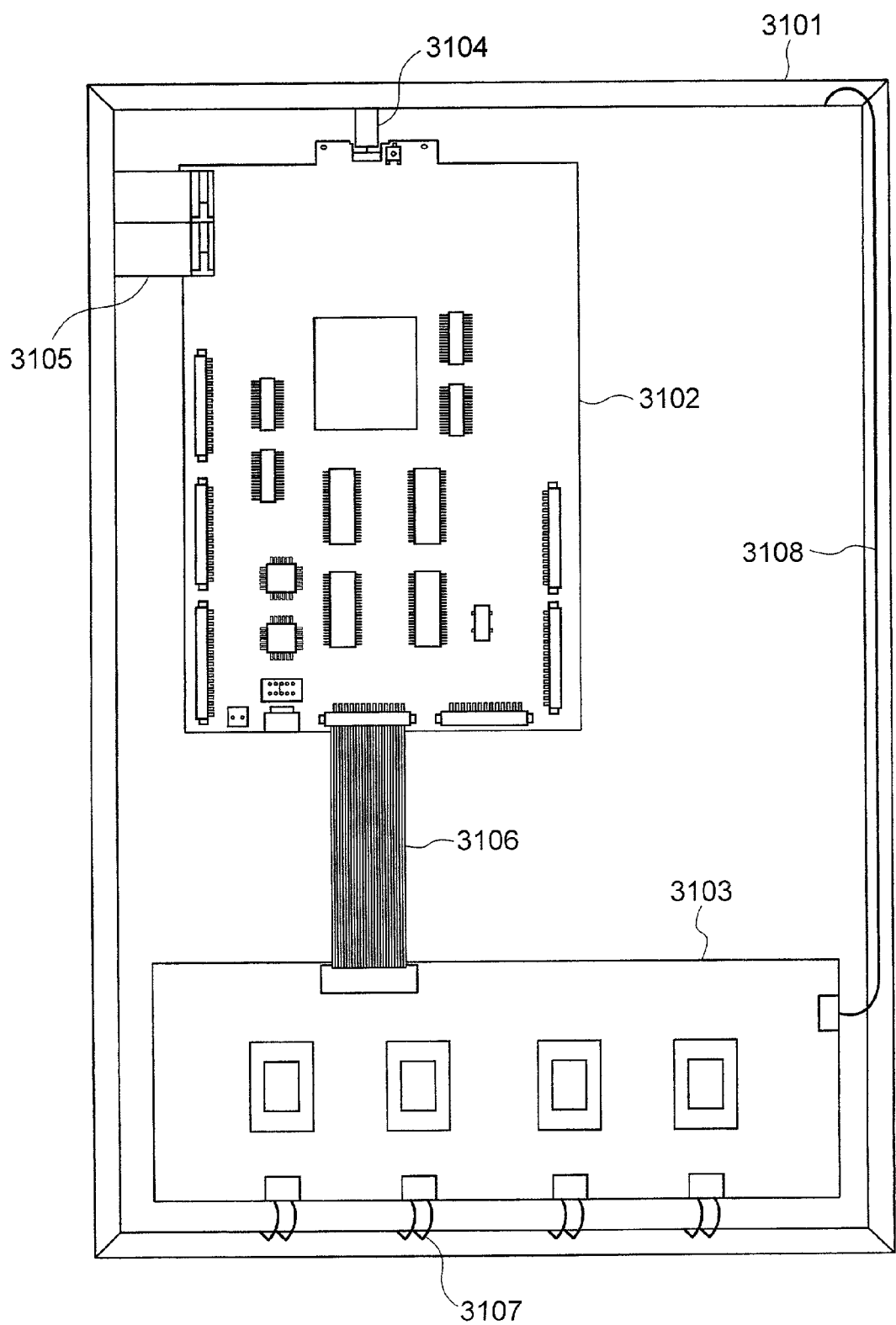
FIG. 31 is a schematic configuration diagram of a liquid crystal display module according to another embodiment of the present invention.

FIG. 31 is a schematic configuration diagram of the liquid crystal display module according to the present invention.

In FIG. 31, the reference numerals denote the following components, respectively: 3101 a liquid crystal module, 3102 a liquid crystal driving control board (hereinafter, referred to as "TCON board"), 3103 an inverter board, 3104 a for-gate flat cable (hereinafter, referred to as "gate FPC"), 3105 a for-drain flat cable (hereinafter, referred to as "drain FPC"), 3106 an inverter controlling cable (hereinafter, referred to as "inverter cable"), 3107 a lamp high-voltage side cable, and 3108 a lamp low-voltage side cable.

As illustrated in FIG. 31, the TCON board 3102 and the inverter board 3103 are implemented on the back surface of the liquid crystal module 3101. At first, from the system side, an image-signal and a power-supply voltage are fed to the TCON board 3102. The TCON board 3102 executes processings such as an image processing and a timing processing, then outputting the image-signal and a timing signal to the liquid crystal module 3101 through the gate FPC 3104 and the drain FPC 3105. At the same time, the TCON board controls the inverter board 3103 through the inverter cable 3106, and lights up the lamps with a tube current quantity fed by the lamp high-voltage side cable 3107. A back-current to the inverter board is returned back through the lamp low-voltage side cable 3108. Additionally, the present example illustrates the directly-under type liquid crystal module where the lamps are located with an equal spacing therebetween on the back surface of the liquid crystal module.

Figure 32:
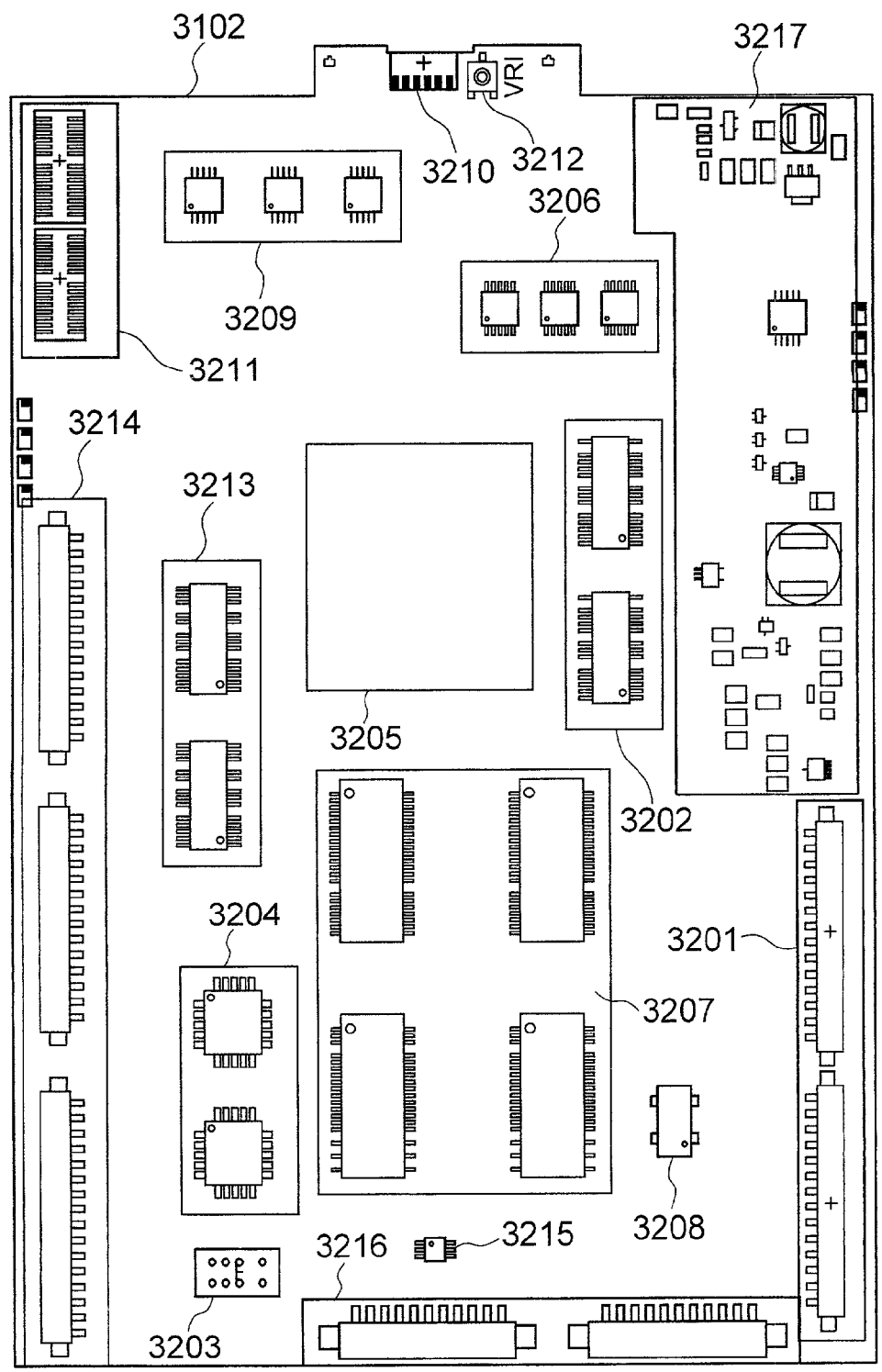
FIG. 32 is a schematic configuration diagram of a TCON board implemented on the back surface of the liquid crystal display module according to the present invention.

FIG. 32 is a schematic configuration diagram of the TCON board implemented on the back surface of the liquid crystal display module according to the present invention.

In FIG. 32, the reference numerals denote the following components, respectively: 3201 a low-voltage differential digital image-signal inputting connector unit (hereinafter, referred to as "image-signal inputting connector unit"), 3202 an image data conversion (i.e., low-voltage differential→TTL) LSI 1, 3203 a FPGA logic data setting connector, 3204 a FPGA logic data setting ROM, 3205 a liquid crystal panel controlling FPGA or LSI, 3206 an operation mode setting SW of the FPGA (or the LSI) 3205, 3207 a frame memory, 3208 an oscillator, 3209 a tone voltage controlling comparator, 3210 a for-gate signal connector, 3211 a for-drain signal connector, 3212 variable resister for common voltage setting, 3213 an image data conversion (i.e., TTL→low-voltage differential) LSI 2, 3214 a low-voltage differential digital image-signal outputting connector unit (hereinafter, referred to as "image-signal outputting connector unit"), 3215 a D/A conversion converter, 3216 an inverter control connector unit, and 3217 a power-supply circuit unit.

At first, a low-voltage differential digital image-signal from the system is inputted into the image-signal inputting connector unit 3201. The inputted image-signal is converted into an image-signal of the TTL format by the image data conversion (i.e., low-voltage differential→TTL) LSI 1 3202. The image-signal after being converted is inputted into the FPGA or LSI 3205. Here, at the time of the FPGA mounting, logical information that has been set in advance into the FPGA logic data setting ROM 3204 through the FPGA logic data setting connector 3203 is read into the above-described FPGA 3205 simultaneously with the starting-up. At the time of the LSI mounting, since a logic circuit has been built in the LSI 3205 in advance, the FPGA logic data setting connector 3203 and the FPGA logic data setting ROM 3204 become unnecessary (Hereinafter, in the present embodiment, the explanation will be given employing the LSI as the example). The setting in the operation mode setting SW 3206 controls various types of functions that the above-described LSI 3205 has. The above-described LSI 3205 allows the frame memory 3207 to be connected with the outside thereof. The use of the frame memory 3207 permits an input/output asynchronous image processing to be executed. In this case, in an output-side (i.e., liquid crystal display side) image processing, it is also possible to use a specific clock generated by the oscillator 3208. In the image data outputting form from the above-described LSI 3205, there exist 2 channels. The 1st channel is a channel where the image data is outputted to the liquid crystal panel 3101 so as to drive a built-in driver IC directly. In this case, the image output from the LSI 3205 is outputted to the liquid crystal panel 3101 through the for-drain signal connector 3211. At the same time, the LSI 3205 outputs a gate signal to the liquid crystal panel 3101 through the for-gate signal connector 3210. At this time, the V-B characteristic, which is a relationship between the tone data and the display luminance that correspond to the image output outputted through the for-drain signal connector 3211, is determined by the tone voltage controlling comparator 3209 and a resistance vale associated therewith. Also, a common voltage adjusting VR 3212 adjusts the common voltage that becomes a reference voltage for alternately-driving the liquid crystal. The 2nd channel is a channel where the image data outputted from the LSI 3205 is converted by the image data conversion (i.e., TTL→low-voltage differential) LSI 2 3213, then being outputted through the image-signal outputting connector unit 3214. In the above-described 2 image data outputting forms, the display may be performed using the 1st channel alone. Also, the LSI 3205 controls the D/A converter 3215 so as to supply an output from the D/A converter 3215 to the inverter board 3103 through the inverter control connector unit 3216, thereby executing a brightness control over the lamps. The power-supply circuit 3217 executes the generation of a power-supply voltage needed inside the TCON board 3102, one example of which is as follows: With +5 V voltage employed as the input, a DC/DC converter generates the power-supply voltages of −4V, +2.5V, +3.3V, +5V, +15V, and +20V, respectively.

Figure 33:
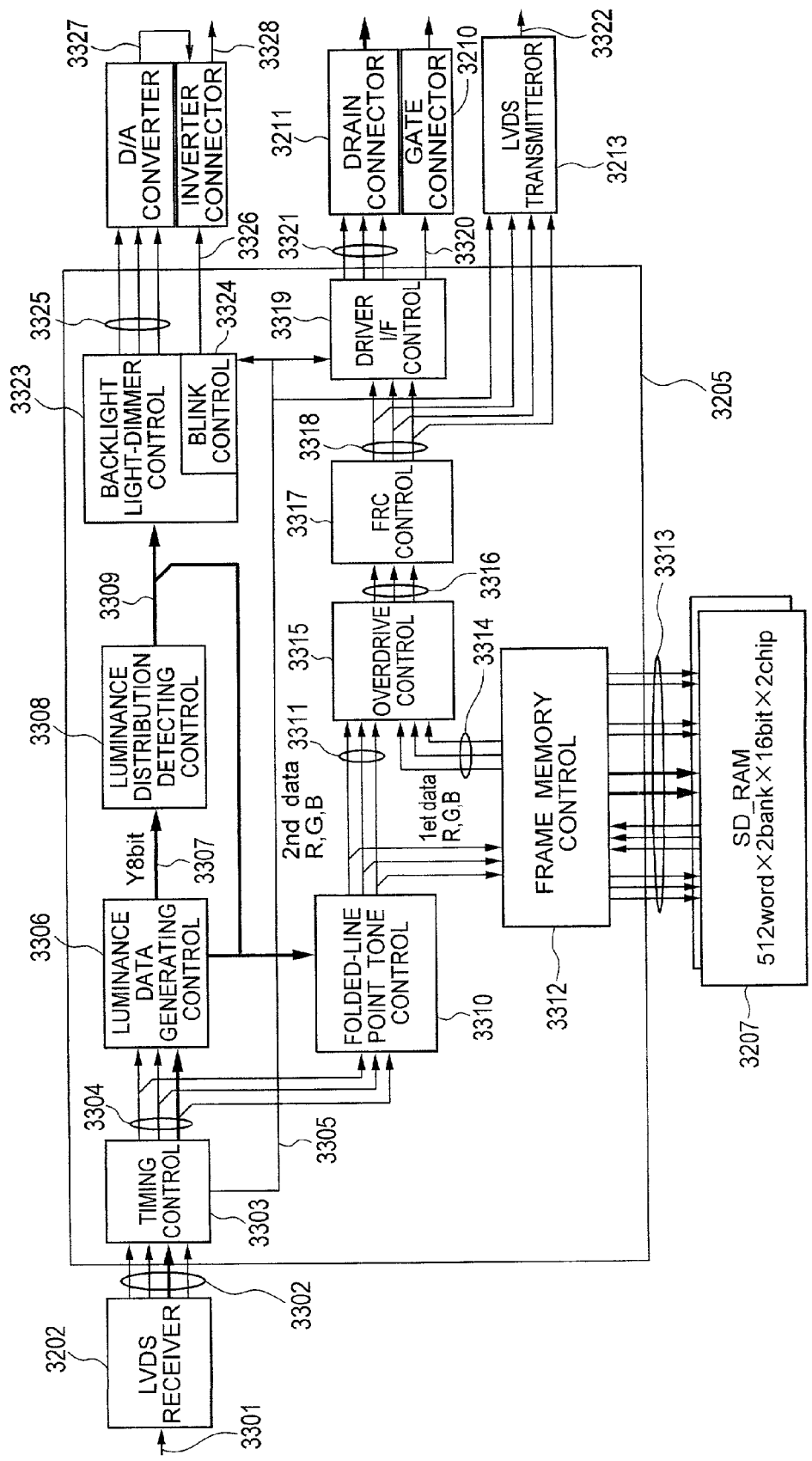
FIG. 33 is a schematic configuration diagram of the internal function of LSIs mounted on the TCON board according to the present invention.

FIG. 33 is a schematic configuration diagram of the internal function of the LSIs mounted on the TCON board according to the present invention.

In FIG. 33, the reference numerals denote the following components, respectively: 3301 the low-voltage differential digital image-signal, 3302 the digital image-signal converted into the TTL format by the image data conversion (i.e., low-voltage differential→TTL) LSI 1 3202, 3303 a timing control unit for subjecting the digital image-signal to a reference timing conversion inside the LSI 3205, 3304 R, G, and B image data outputted by the timing control unit 3303, 3305 a reference timing signal inside the LSI outputted similarly by the timing control unit 3303, 3306 a luminance data generation controlling unit for generating luminance data from the R, G, and B image data, 3307 the luminance data outputted by the luminance data generation controlling unit 3306, 3308 a luminance distribution detection controlling unit for inputting the luminance data 3307 so as to detect the luminance distribution state within 1 screen, 3309 the luminance distribution data outputted by the luminance distribution detection controlling unit 3308, 3310 a folded-line point tone controlling unit for inputting the R, G, and B image data 3304 and the luminance distribution data 3309 so as to execute an output tone characteristic control, 3311 the output tone data outputted by the folded-line point tone controlling unit 3310, 3312 a frame memory controlling unit for controlling the frame memory 3207, 3313 a frame memory interface signal controlled by the frame memory controlling unit 3312, 3314 frame memory read data read out from the frame memory 3207, 3315 an overdrive controlling unit for controlling a corrected value of the output tone data 3311 in accordance with the comparison result with the frame memory read data 3314, 3316 after-correction output-tone data outputted by the overdrive controlling unit 3315, 3317 a FRC controlling unit for increasing the tone number in a pseudo manner from the after-correction output tone data 3316, 3318 pseudo tone display data outputted by the FRC controlling unit 3317, 3319 a driver interface controlling unit for driving the driver IC inside the liquid crystal panel 3101, 3320 a gate driver controlling signal outputted by the driver interface controlling unit 3319, 3321 a drain driver controlling signal outputted similarly by the driver interface controlling unit 3319, 3322 the low-voltage differential digital image-signal outputted by the image data conversion (i.e., TTL→low-voltage differential) LSI 2 3213, 3323 a backlight light-dimmer controlling unit for controlling the brightness of the backlight with the luminance distribution data 3309 employed as the reference, 3324 a blink controlling unit for controlling the lighting-up time-period and the non-lighting-up time-period of the backlight with the luminance distribution data 3309 and the reference timing signal 3305 inside the LSI employed as the reference, 3325 a digital backlight light-dimmer signal outputted by the backlight light-dimmer controlling unit 3323, 3326 a backlight ON/OFF signal outputted by the blink controlling unit 3324, 3327 an analogue backlight light-dimmer signal outputted by the D/A converter 3215, and 3328 an inverter controlling signal outputted to the inverter board through the inverter control connector unit 3216.

At first, the digital image-signal 3302 obtained by converting the low-voltage differential digital image-signal 3301 into the TTL format is inputted into the timing control unit 3303. Then, the timing control unit outputs the delay-adjusted R, G, and B image data 3304 and the reference timing signal 3305 becoming the reference inside the LSI 3205. The outputted R, G, and B image data 3304 are inputted into the luminance data generation controlling unit 3306 and the folded-line point tone controlling unit 3310. The luminance data generation controlling unit 3306 generates and outputs the luminance data 3307 from the inputted R, G, and B image data 3304. This luminance data is inputted into the luminance distribution detection controlling unit 3308 at the next stage, and the controlling unit outputs the luminance distribution data 3309 where the luminance data by the amount of 1 frame has been accumulated. The luminance distribution data 3309 is outputted to the folded-line point tone controlling unit 3310 and the backlight light-dimmer controlling unit 3323. The backlight light-dimmer controlling unit 3323 judges a characteristic of the image data for each frame from this luminance distribution information, thereby outputting the digital backlight light-dimmer signal 3325 for obtaining an excellent display. This light-dimmer signal 3325 is inputted into the D/A converter 3215 so as to be converted into the analogue backlight light-dimmer signal 3327, then being outputted to the inverter control connector unit 3216. Meanwhile, concerning the ON/OFF control over the backlight, the blink controlling unit 3324 fetches the reference timing signal 3305 so as to control the lighting-up time-period and the non-lighting-up time-period during the 1-frame time-period, then, as the backlight ON/OFF signal 3326, outputting the reference timing signal to the inverter control connector unit 3216. The inverter control connector unit 3216 independently outputs the analogue backlight light-dimmer signal 3327 and the backlight ON/OFF signal 3326 to the inverter control board 3103. In the mean time, the image data processing is as follows: The R, G, and B image data 3304 and the luminance distribution data 3309 are inputted into the folded-line point tone controlling unit 3310. The folded-line point tone controlling unit 3310, as is the case with the backlight control, judges the characteristic of the image data for each frame from the luminance distribution data 3309, thereby executing for each frame the tone characteristic (i.e., the V-B characteristic) setting for obtaining the excellent display. The tone-controlled output tone data 3311 is inputted into the overdrive controlling unit 3315, and at the same time is written into the frame memory 3207 as the frame memory interface signal 3313 through the frame memory controlling unit 3312. The tone data stored into the frame memory 3207 is similarly read out by the frame memory controlling unit 3312, then being inputted into the overdrive controlling unit 3315 as the frame memory read data 3314. Here, the output tone data 3311 turns out to become tone data 1 frame after with respect to the frame memory read data 3314. The overdrive controlling unit 3315 detects a difference in the tone data between these adjacent frames, then judging the movement amount of the image data from this difference. From this movement amount, the overdrive controlling unit determines, for each frame, the response-rate or the image data corrected-value at the optimum for the luminance, thereby executing a correction toward the output tone data 3311. The after-correction output tone data 3316 outputted thereafter is inputted into the FRC controlling unit 3317. The FRC controlling unit generates the pseudo tone display data 3318 for performing a multi-tone display in a pseudo manner in a liquid crystal panel with a smaller tone number. The pseudo tone display data 3318 is inputted into the driver interface controlling unit 3319 together with the reference timing signal 3305. Then, after being converted into the gate driver controlling signal 3320 and the drain driver controlling signal 3321, the display data is outputted to the liquid crystal panel 3101 through the for-gate signal connector 3210 and the for-drain signal connector 3211. Also, as the 2nd channel, the pseudo tone display data 3318 is directly outputted by the LSI 3205, then being outputted as the low-voltage differential digital image-signal 3322 through the image data conversion (i.e., TTL→low-voltage differential) LSI 2 3213, Here, when implementing a liquid crystal module that allows the display in the configuration illustrate in FIG. 31, the above-described 2nd channel is unnecessary.

TABLE 1

| SW NO. | | function | setting condition |
|---|---|---|---|
| SW 1 | 1 | light-dimmer control ON/OFF setting | 1 = ON, 0 = OFF |
| | 2 | overdrive ON/OFF setting | 1 = ON, 0 = OFF |
| | 3 | FRC ON/OFF setting | 1 = ON, 0 = OFF |
| | 4 | blink ON/OFF setting | 0 = ON, 1 = OFF |
| SW 2 | 1 | blink duty setting | 0 = 50%, 1 = 60% |
| | 2 | blink phase [0] setting | blink phase [2:0] = 0°~360° delay setting |
| | 3 | blink phase [1] setting | equal assignment (1 step = 45° delay) |
| | 4 | blink phase [2] setting | |
| SW 3 | 1 | overdrive characteristic setting [0] | 4 μm product Super TFT panel |
| | 2 | overdrive characteristic setting [1] | |

TABLE 1-continued

| SW NO. | | function | setting condition |
|---|---|---|---|
| | 3 | overdrive characteristic setting [2] | characteristic setting [3:0] = [0, 1, 1, 0] |
| | 4 | overdrive characteristic setting [3] | |

Table 1 illustrates an example of the list of types of function settings that are mounted on the LSI 3205 illustrated in FIG. 33 and are established by the operation mode setting SW 3206. The present example indicates the following settings: Valid/invalid settings of the respective functions of the backlight light-dimmer controlling unit 3323, the overdrive controlling unit 3315, the FRC controlling unit 3317, and the blink controlling unit 3324, the ratio setting of the in-1-frame lighting-up time-period at the time when the blink controlling unit 3324 is valid, the phase setting of the same in-1-frame lighting-up time-period, and the optimum overdrive characteristic setting of the overdrive controlling unit 3315 in agreement with each liquid crystal panel. In this way, the various types of functions mounted on the LSI 3205 have been made settable independently of each other.

TABLE 2

| TTL image-signal | | LVDS image-signal | |
|---|---|---|---|
| signal name | function | signal name | function |
| R[7:0] | red 8-bit image-signal | Y0$_+$/Y0$_-$ | low-voltage differential channel 0 |
| G[7:0] | green 8-bit image-signal | Y1$_+$/Y1$_-$ | low-voltage differential channel 1 |
| B[7:0] | blue 8-bit image-signal | Y2$_+$/Y2$_-$ | low-voltage differential channel 2 |
| DTMG | image valid signal | Y3$_+$/Y3$_-$ | low-voltage differential channel 3 |
| VSYNC | vertical synchronization signal | CLK$_+$/CLK$_-$ | low-voltage differential channel CLK |
| HSYNC | horizontal synchronization signal | | |

Table 2 illustrates an input/output signal specification of the image data conversion (i.e., low-voltage differential→TTL) LSI 1 3202 and that of the image data conversion (i.e., TTL→low-voltage differential) LSI 2 3213. In the image data conversion (i.e., low-voltage differential→TTL) LSI 1 3202, the input becomes the LVDS image-signals and the output becomes the TTL image-signals. In the image data conversion (i.e., TTL→low-voltage differential) LSI 2 3213, the input/output become opposite thereto. The TTL image-signals include the respective R, G, and B 8-bit image-signals, the valid display time-period signal, the vertical synchronization signal, and the horizontal synchronization signal. The LVDS image-signals include the 5 pairs of low-voltage differential signals.

Figure 34:
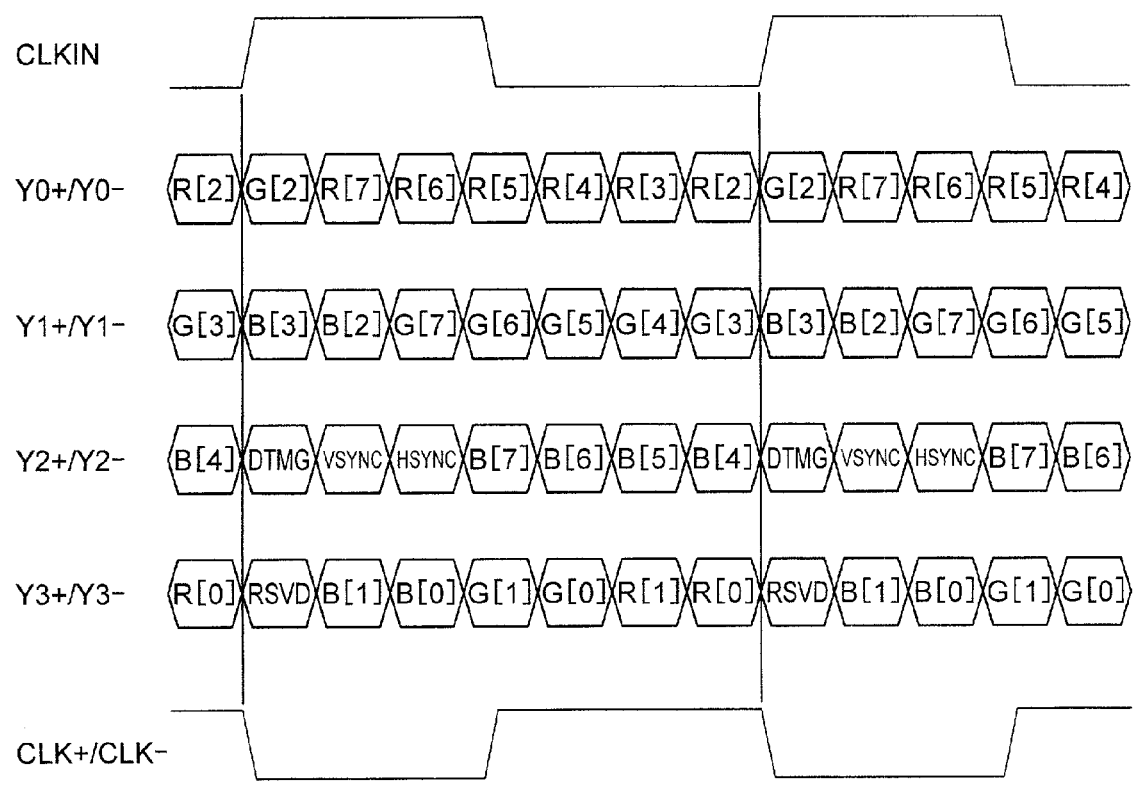
FIG. 34 is a specification diagram of image data conversion (i.e., low-voltage differential→TTL, and TTL→low-voltage differential) input/output signals according to the present invention.

FIG. 34 illustrates a timing diagram for the signal specifications illustrated in the above-illustrated Table 2.

In FIG. 34, a single clock constitutes the 1 pair of low-voltage differential signal (CLK$_+$/CLK$_-$), and its operation frequency is equal to an input clock (CLKIN) frequency. The other 4 pairs of low-voltage differential signals (Y0$_+$/Y0$_-$~Y3$_+$/Y3$_-$) drive the above-described input clock (CLKIN) frequency by 7-multiplication. The TTL image-signals transfer the respective R, G, and B 8-bit image-signals, the display valid-time-period signal, the vertical synchronization signal, and the horizontal synchronization signal. Incidentally, TI-fabricated "SN75LVDS84", Thine-fabricated "THC63LVDF84", or the like are available as the image data conversion (i.e., low-voltage differential→TTL) LSI 1 3202. TI-fabricated "SN75LVDS83", Thine-fabricated "THC63LVDF83", and the like are also available as the image data conversion (i.e., TTL→low-voltage differential) LSI 2 3213.

Figure 35:
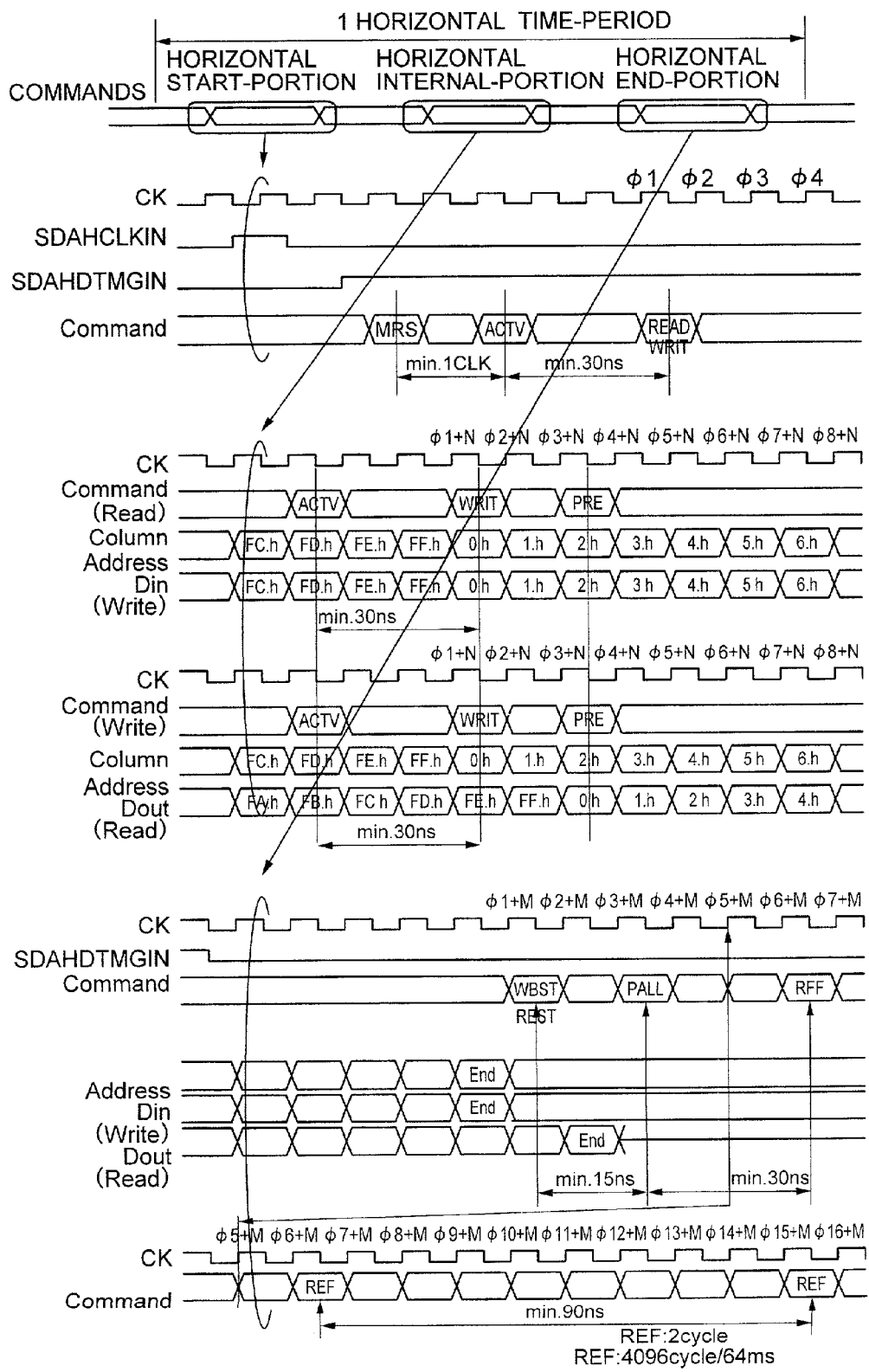
FIG. 35 is a schematic timing diagram of the operation of a frame memory controlling unit according to the present invention.

FIG. 35 illustrates a schematic timing diagram of the operation of the frame memory controlling unit 3312 for controlling the frame memory 3207. As the frame memory, when the resolution of the liquid crystal panel is set to be of the XGA size, it is possible to use a 16-Mbit product SD_RAM. The configuration of the 16-Mbit product SD_RAM is 512 K×16 bits×2 banks. Accordingly, since the data bus width is 16 bits wide, when employing the 24-bit configuration of the respective R, G, and B 8-bit image-signals, the 2 memories are used each for the writing and the reading, i.e., the 4 memories are used in total. When employing a 16-bit configuration of 5-bit R, 6-bit G, and 5-bit B image-signals, the 1 memory is used each for the writing and the reading, i.e., the 2 memories are used in total. The 1 horizontal time-period of the image data is divided into a start-portion, an internal-portion, and an end-portion, thereby executing the command control. A full-page burst mode is employed for the access and, after setting the commands, the writing/reading control for each pixel is executed continuously in synchronization the clock. The horizontal start-portion generates the commands in the sequence of MRS for executing the mode setting, ACTV for executing a row address latch and a bank selection, and READ/WRIT for setting the read or the write. The horizontal internal-portion generates the commands in the sequence of the ACTV for executing the row address latch and the bank selection, the READ/WRIT for setting the read or the write, and PRE for executing a pre-charge processing of a bank selected by the address. The horizontal end-portion generates the commands in the sequence of WBST/RBST for stopping the full-page burst processing of the read or the write, PALL for executing the pre-charge processing of all the banks, and REF for executing a refresh operation automatically. The processing in the 1 horizontal time-period is executed by the generation of the above-mentioned commands. Concerning the vertical direction, the same processing is repeated in a time-period during which the display valid-time-period signal is valid, thereby executing the image data processing by the amount of 1 frame.

TABLE 3

| signal name | main function |
| --- | --- |
| CL 1 | data (1-line amount) latch & output signal |
| CL 2 | data fetch clock |
| STH | data fetch start signal |
| M | alternating current converting signal |
| FLM | shift data fetch signal |
| CL 3 | data shift clock |

Table 3 illustrates the function list of the gate driver controlling signal 3320 and the drain driver controlling signal 3321. The gate driver controlling signal 3320 includes the shift data fetch signal (FLM) and the data shift clock (CL 3). The drain driver controlling signal 3321 includes the data (1-line amount) latch & output signal (CL 1), the data fetch clock (CL 2), the data fetch start signal (STH), and the alternating current converting signal (M), respectively.

TABLE 4

| item | symbol | set value | unit | remark |
| --- | --- | --- | --- | --- |
| data delay | tDATA | 5 | TPIC | |
| STH delay | tSTH | 5 | TPIC | |
| drain output timing | tCL1 | 1040 | TPIC | |
| CL 1 pulse-width | tCL1W | 80 | TPIC | |
| M set up | tM | 8 | TPIC | |
| FLM delay | tF | 4 | TPIC | |
| gate delay | tGD | 949, 857, 767, 663 | TPIC | 1.4 us, 2.8 us, 4.2 us, 5.8 us |

Figure 36:
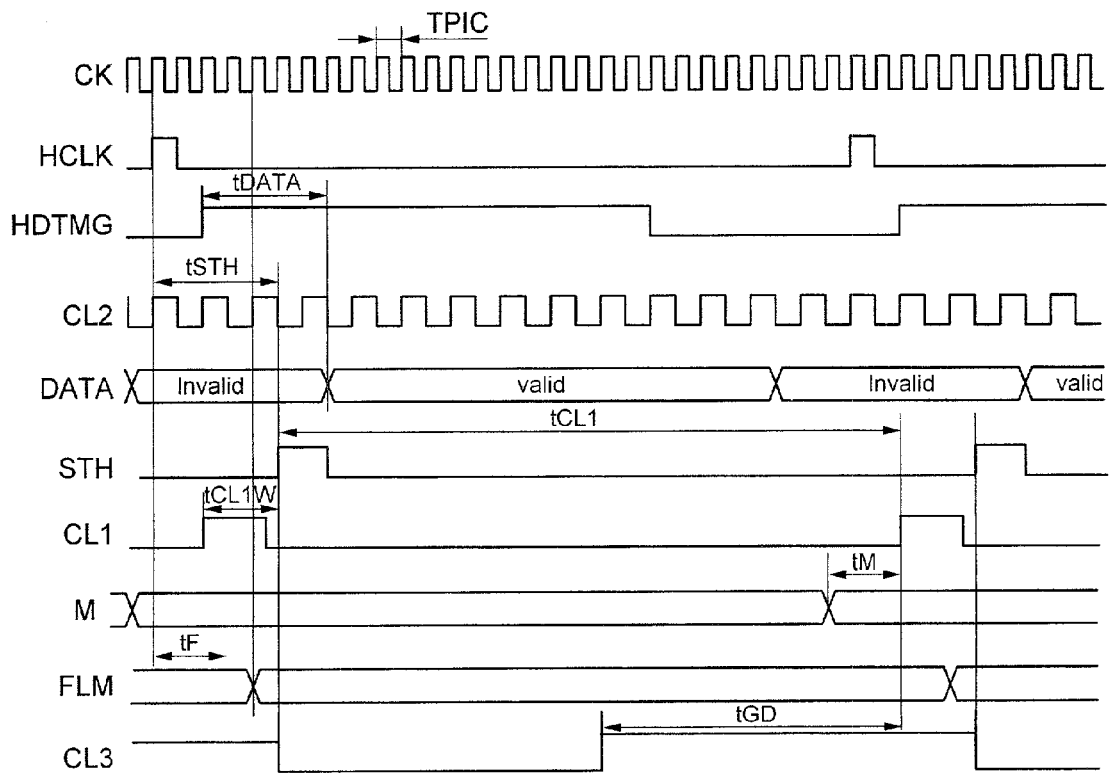
FIG. 36 is a timing diagram of a driver interface according to the present invention.

Table 4 and FIG. 36 illustrate an example of the driver interface timing setting specification illustrated in Table 3. The respective interface signals are generated from the dotclock (CK) that is the reference signal inside the LSI 3205, a horizontal start pulse (HCLK), and a horizontal display valid-time-period signal (HDTMG).

TABLE 5

| signal name | main function |
| --- | --- |
| DACLK | D/A converter control clock |
| DACSN | D/A converter control chip selection signal |
| DADATA | D/A converter input digital data |

Table 5 illustrates the function list of the digital backlight light-dimmer signal 3325. The digital backlight light-dimmer signal 3325 has the D/A converter control clock (DACLK), the D/A converter control chip selection signal (DACSN), and the D/A converter input digital data (DADATA). As the D/A converter that matches this function, e.g., "AD5300" (fabricated by Analogue Device) or the like is applicable.

TABLE 6

| signal name | main function | set value |
| --- | --- | --- |
| D[15]–D[14] | Don't care | all "0" |
| D[13]–D[12] | Mode set | all "0" |
| D[11]–D[04] | Set data | per-frame updating |
| D[03]–D[00] | Don't care | all "0" |

Figure 37:
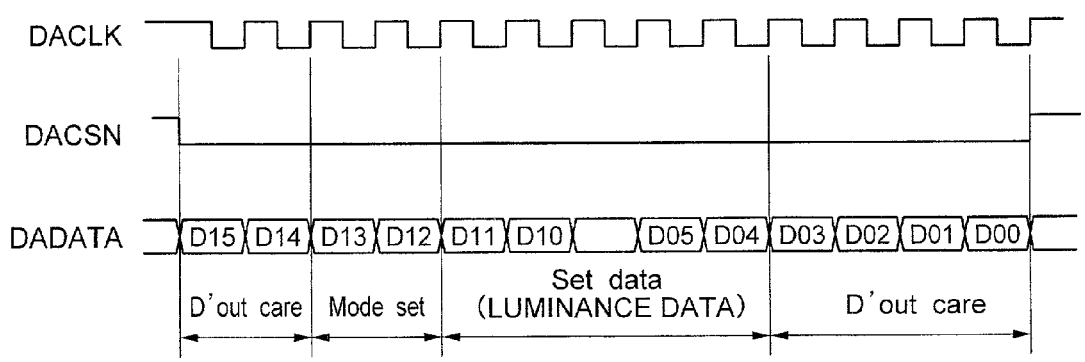
FIG. 37 is a timing diagram of a digital backlight light-dimmer signal according to the present invention.

Table 6 and FIG. 37 illustrate an example of the digital backlight light-dimmer signal timing specification fitted to the AD5300 (fabricated by Analogue Device). The D/A converter input digital data (DADATA) is transferred in series. The header's 2 bits (i.e., D[15]–D[14]) mean being undefined, and the subsequent 2 bits (i.e., D[13]–D[12]) mean a mode setting, and the further subsequent 8 bits (i.e., D[11]–D[04]) mean the data, and the remaining 4 bits (i.e., D[03]–D[00]) mean being undefined. Here, the 2-bit (i.e., D[13]–D[12]) mode setting is "all 0" which is the setting of a normal operation, and the 8-bit (i.e., D[11]–D[04]) data is the digital backlight light-dimmer signal 3325 outputted from the backlight light-dimmer controlling unit 3323 in accordance with the luminance distribution data 3309 in FIG. 33.

As having been explained so far, as illustrated in FIGS. 31 to 37 and in Tables 1 to 6, the controlling circuit of the liquid crystal display apparatus according to the present invention includes the following components that implement its main functions: The LSI, the frame memory, the low-voltage differential transferring LSIs, and the D/A converter.

Hereinafter, the detailed explanation will be given concerning the tone control function and the backlight control function in compliance with the input image data, which are mounted on the above-described LSI 3205 and are the primary object of the present invention.

Figure 38:
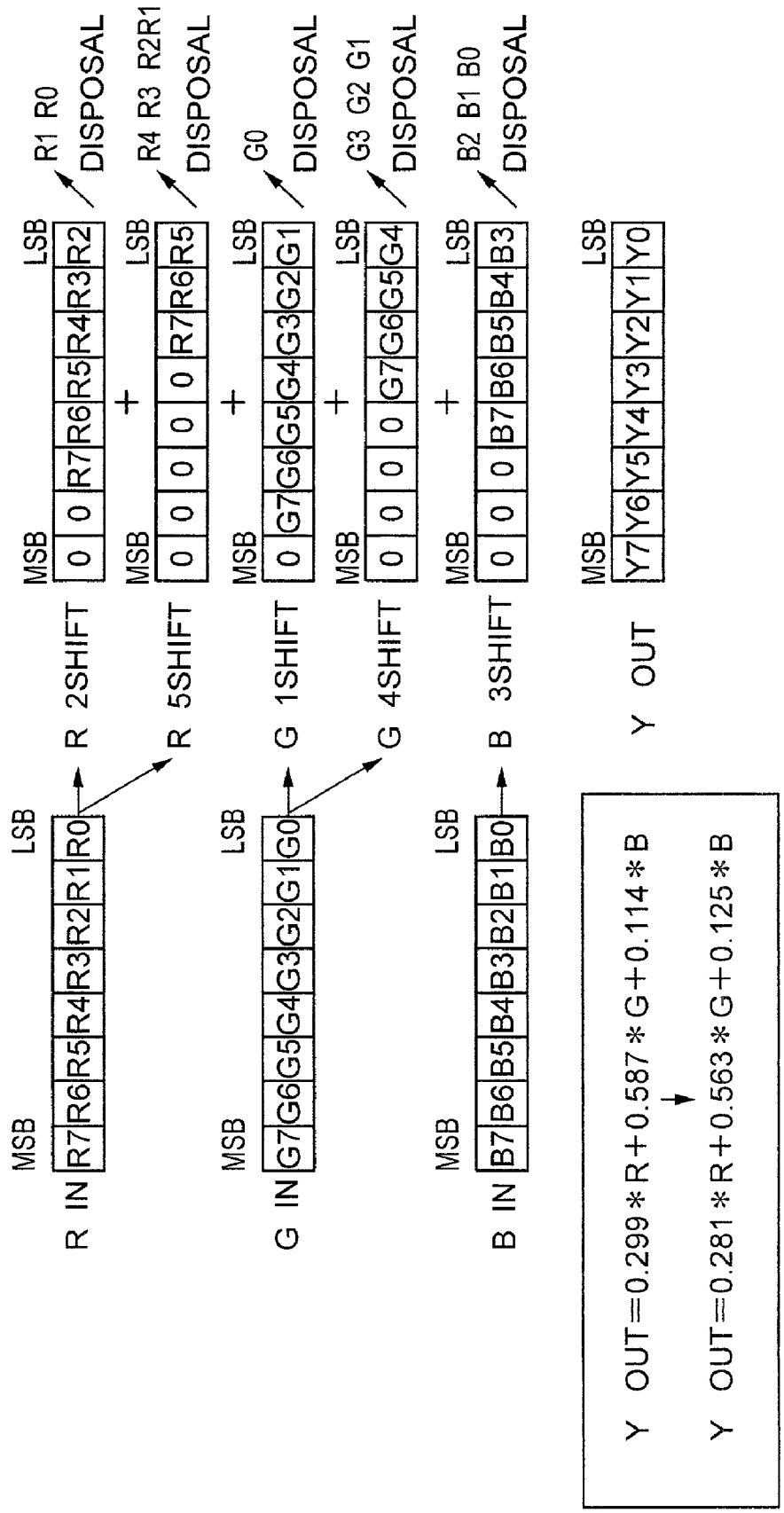
FIG. 38 is a conceptual diagram of the operation of a luminance data generation controlling unit according to the present invention.

FIG. 38 illustrates a conceptual diagram of the operation of the above-described luminance data generation controlling unit 3306.

In FIG. 38, in the case where the luminance data (Y) is generated from the R, G, and B image data, the ratios of the respective colors are given by the following formula (i.e., formula 1):

$$\text{luminance data}(Y) = \qquad \text{(formula 1)}$$
$$0.299 \times R(\text{red}) + 0.587 \times G(\text{green}) + 0.144 \times B(\text{blue})$$

Processing this formula precisely with the hardware is difficult because of an increase in the circuit size, a decrease in the processing speed, and so on. Also, the luminance data generated here is the data for obtaining the characteristics of the display data. Taking this into consideration, the approximation processing is executed so that the luminance data can be implemented with the hardware. Since the processing in a pixel unit is required, it has been planned to implement the luminance data by the shift and the addition processing. In FIG. 38, assuming that the R, G, and B image data are 8-bit digital image data respectively, the R color is shifted by 2 bits and by 5 bits in the right direction (a 1-bit shifting in the right direction means a division by 2, and a n-bit shifting means a division by the nth power of 2), and the G color is shifted by 1 bit and by 4 bits in the right direction, and the B color is shifted by 3 bits, then adding all the respective shift data. This procedure allows the following approximation processing formula for the above-presented formula (i.e., formula 1):

$$\text{luminance data}(Y) = \qquad \text{(formula 2)}$$
$$0.281 \times R(\text{red}) + 0.563 \times G(\text{green}) + 0.125 \times B(\text{blue})$$

Figure 39:
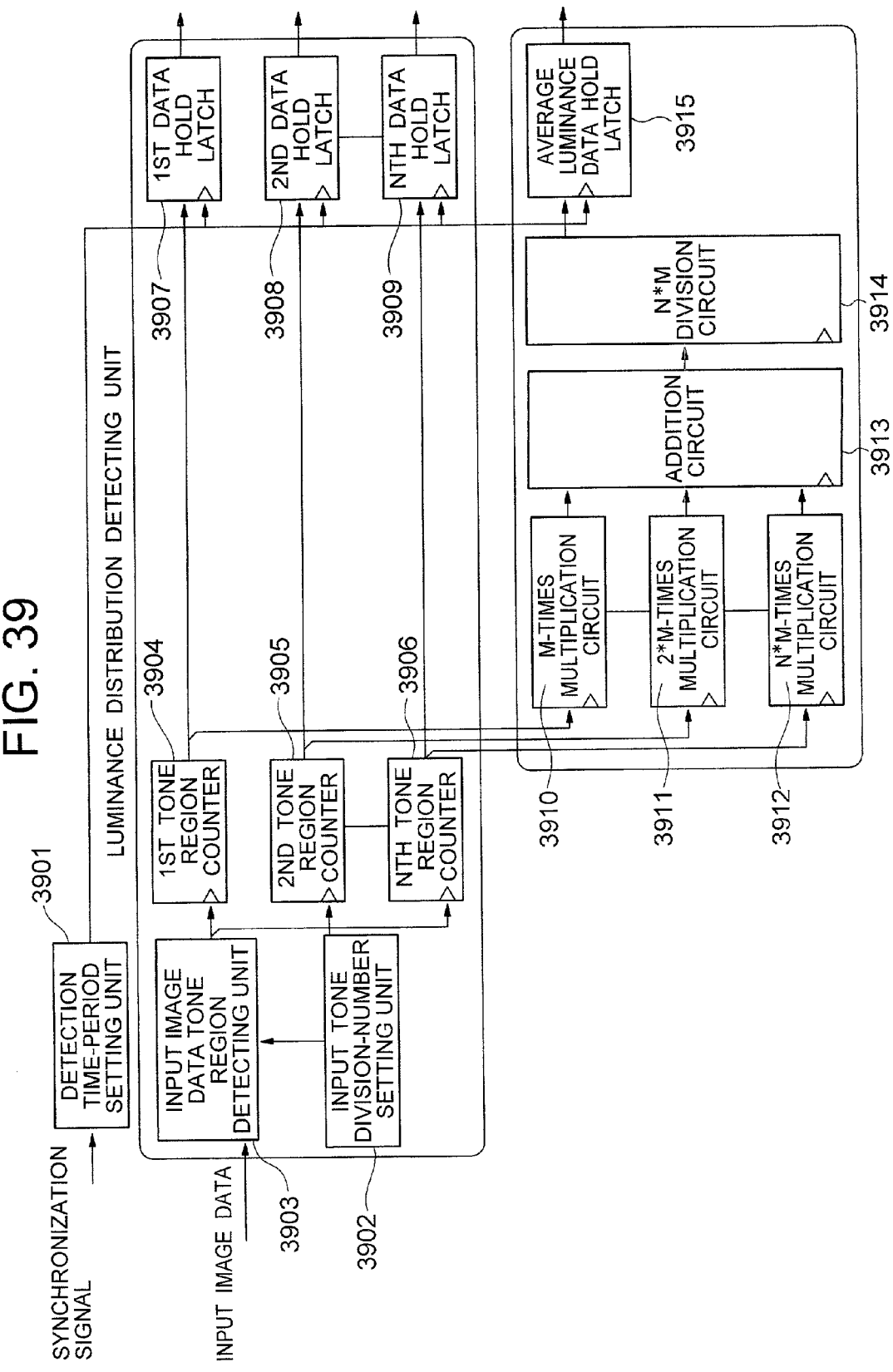
FIG. 39 is a schematic configuration diagram of a luminance distribution detection controlling unit according to the present invention.

FIG. 39 illustrates a schematic configuration diagram of the luminance distribution detection controlling unit 3308.

In FIG. 39, the reference numerals denote the following configuration components, respectively: 3901 a detection time-period setting unit for setting a detection time-period at 1-time, 3902 an input tone division-number setting unit for setting a division-number of an input entire tone region, 3903 an input image data tone region detecting unit for detecting to which region the input image data corresponds among the respective divided tone regions set in the input tone division-number setting unit 3902, 3904 a 1st tone region counter for counting data in a lowest tone region, 3905 a 2nd tone region counter for counting data in a 2nd-lowest tone region, 3906 a nth tone region counter for counting data in a highest tone region, 3907 a 1st data hold latch for latching the total number of the data in the lowest tone region in the detection time-period at 1-time, 3908 a 2nd data hold latch for latching the total number of the data in the 2nd-lowest tone region similarly, 3909 a nth data hold latch for latching the total number of the data in the highest tone region similarly, 3910 a m-times multiplication circuit for multiplying, by m, a counted value by the 1st tone region counter 3904, 3911 a 2*m-times multiplication circuit for multiplying, by 2*m, a counted value by the 2nd tone region counter 3905, 3912 a n*m-times multiplication circuit for multiplying, by n*m, a counted value by the nth tone region counter 3906, 3913 an addition circuit for adding output data from the respective multiplication circuits, 3914 a n*m division circuit for dividing, by n*m, an output from the addition circuit 3913, and 3915 an average luminance data hold latch for latching an output from the division circuit 3914 as an average luminance value.

At first, the detection time-period at 1-time is set into the detection time-period setting unit 3901. The output from this setting unit becomes a latch clock for a final-stage data hold latch of the respective detecting functions. Also, the division-number of the input entire tone region is set into the input tone division-number setting unit 3902. Here, as an example, it is assumed that the input entire tone region is set to be 256 tones (8 bits) and the division-number is set to be 8 divisions. The output from this setting unit is inputted into the input image data tone region detecting unit 3903. This detecting unit judges to which region the tone value of the input image data corresponds among the respective divided tone regions from the input tone division-number setting unit 3902, then outputting a region-counting clock corresponding to the region. Here, from the setting that the input entire tone region is of 256 tones and the division-number is 8, the tone range of each divided tone region becomes a 32-tone basis region. Accordingly, in order to enhance the characteristic detection accuracy of the input image data, it is advisable to increase the division-number and the tone number of each divided tone region. The enhancement in the accuracy, however, results in an increase in the circuit size. Consequently, depending on the usage, the accuracy has been made changeable. Based on the clock from the input image data tone region detecting unit 3903, the 1st tone region counter 3904, the 2nd tone region counter 3905, and the nth tone region counter 3906 count the data numbers for each divided tone region. During the setting time-period by the detection time-period setting unit 3901, the 1st data hold latch 3907, the 2nd data hold latch 3908, and nth data hold latch 3909 latch the data numbers as the luminance distribution data, thereby executing the detection of the luminance distribution. The detection of the average luminance value is executed as follows: The respective outputs from the 1st tone region counter 3904, the 2nd tone region counter 3905, and the nth tone region counter 3906 are multiplied by the m-times multiplication circuit 3910, the 2*m-times multiplication circuit 3911, and the n*m-times multiplication circuit 3912, respectively. Next, the respective outputs from the multiplication circuits are added by the addition circuit 3913, and the output from the addition circuit is divided by the n*m division circuit 3914. Finally, during the setting time-period by the detection time-period setting unit 3901, the output from the division circuit is latched as the average luminance data by the average luminance data hold latch 3915, thereby executing the detection of the average luminance value. Here, m means the tone number within each divided tone region, and becomes equal to 32 in the present example. Consequently, when employing a 16-bit configuration for the respective multiplication circuits 3910 to 3912 and the addition circuit 3913, the division by the division circuit 3914 becomes a one by n*m=8*32=256.

This division can be implemented by a simple logic of the 8-bit shift processing in the right direction (i.e., the higher-order 8 bits are selected).

Figure 40:
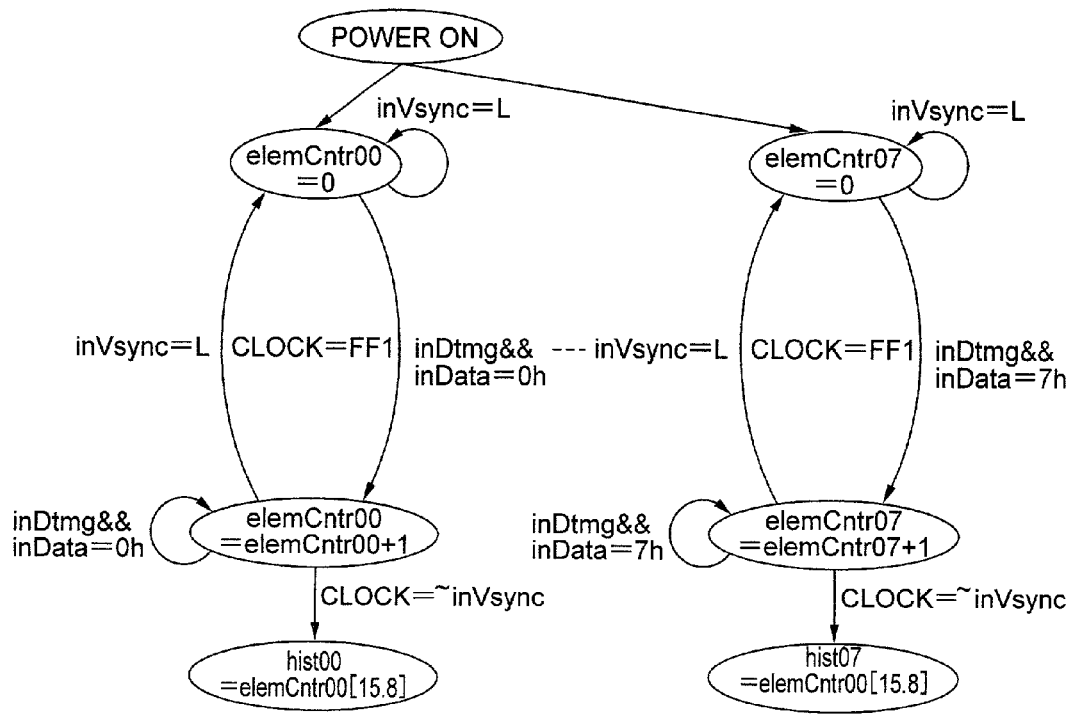
FIG. 40 is a state transition diagram for illustrating the operation of a luminance distribution detecting unit according to the present invention.

FIG. 40 is a state transition diagram for illustrating the operation of a luminance distribution detecting unit in the schematic configuration diagram of the luminance distribution detection controlling unit 3308 illustrated in FIG. 39. FIG. 40 illustrates the following case used as the one example of the explanation in FIG. 39: The input entire tone region is set to be 256 tones (8 bits), and the division-number is set to be 8 divisions, and the resolution of the input image data is set to be the XGA size (i.e., 1024 dots×768 lines).

In FIG. 40, the detection time-period setting unit 3901 includes vertical synchronization signals (inVsync) and display valid-time-period signals (inDtmg). The valid display data are displayed at the time when the display valid-time-period signals (inDtmg) are valid. The luminance distribution results, which are updated on the 1-frame basis, are updated in timings of the vertical synchronization signals (invsync). As the counters (i.e., elemCntr) for accumulating the luminance data number in the respective divided tone regions, 8 of the counters (i.e., elemCntr00 to elemCntr07) are prepared since the divided tone regions are of 8 divisions. Then, the corresponding counter's value is added to a result obtained by decoding the higher-order 3 bits of the 8-bit tone data. The accumulated 1-frame amount of luminance distribution results are updated (i.e., hist00 to hist07) in the timings of the vertical synchronization signals (in-Vsync). Here, it is required that the size of the respective counters be presented assuming that the same tone data exist by the amount of 1 frame. The present example employs the XGA resolution, which requires the counters equivalent to the amount of 1024×768=786432 pixels. Namely, 20-bit counters become necessary.

Figure 41:
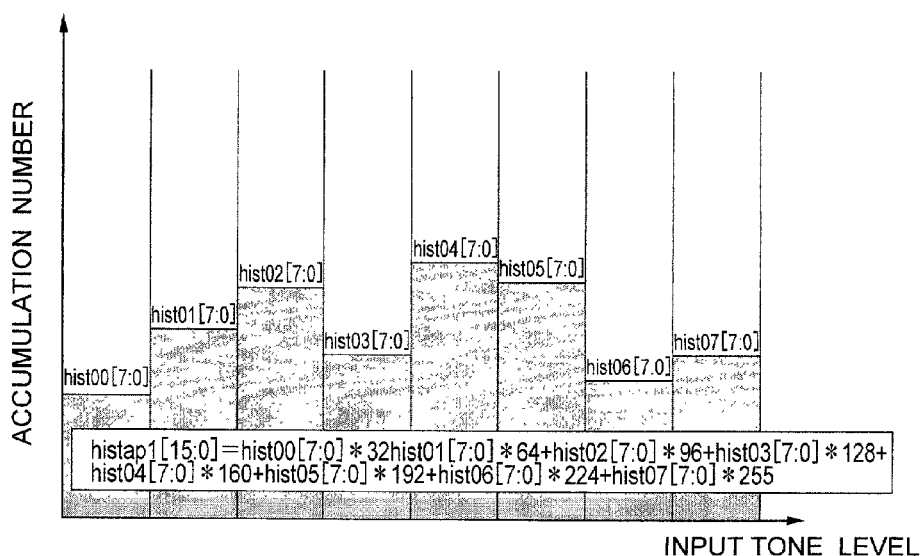
FIG. 41 is a schematic diagram for showing a luminance distribution detection result obtained by the luminance distribution detection controlling unit according to the present invention, and an arithmetic-calculation formula for calculating a luminance average value from the detection result.

FIG. 41 illustrates a schematic diagram for showing the luminance distribution detection result obtained by the luminance distribution detection controlling unit in accordance with FIGS. 39 and 40, and an arithmetic-calculation formula for calculating the luminance average value from the detection result.

As illustrated in FIG. 41, the luminance distribution state makes it possible to extract the per-frame light-and-shade state of the image data. Also, the luminance average value makes it possible to extract the per-frame screen brightness.

Figure 42:
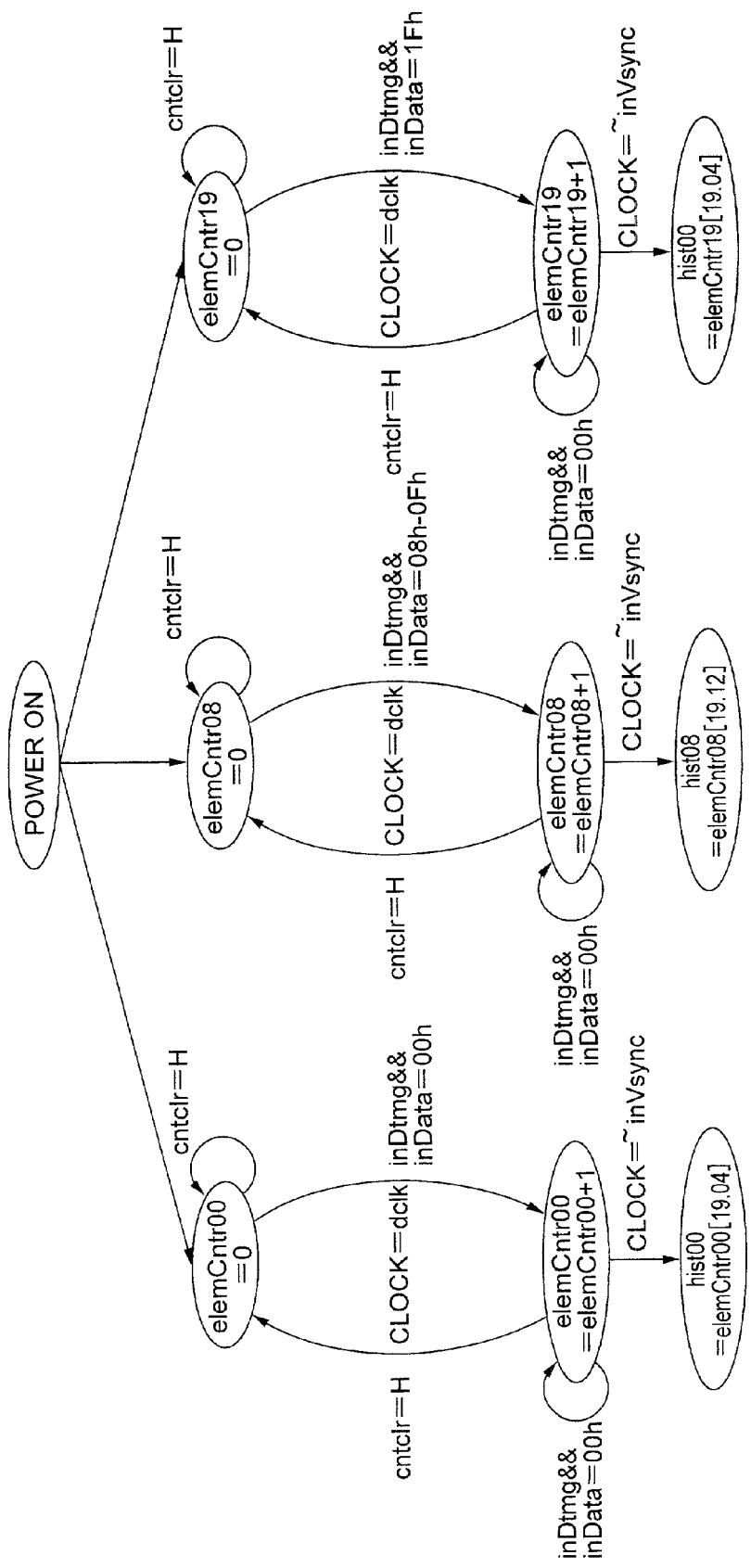
FIG. 42 is a state transition diagram for illustrating the operation of another embodiment that differs from the embodiment illustrated in FIG. 40 of the luminance distribution detecting unit according to the present invention.

As another example of the state transition diagram illustrated in FIG. 40 where the input entire tone region is set to be 256 tones (8 bits) and the division-number is set to be 8 divisions, FIG. 42 illustrates a state transition diagram under the following setting condition: The input entire tone region is set to be 256 tones (8 bits), and the division-number is set to be 20 divisions, and 8-divided tone regions on the lower-order side and those on the higher-order side are set to be of a 8-tone basis division, and 4-divided immediate tone regions are set to be of a 32-tone basis division.

In FIG. 42, concerning the counters (i.e., elemCntr) for accumulating the luminance data number in the respective divided tone regions, the divided tone regions are of 20 divisions. On account of this, 20 of the counters (i.e., elemCntr00 to elemCntr19) are prepared. Here, in the respective 8-divided tone regions on the lower-order side and on the higher-order side, the corresponding counter's value is added to a result obtained by decoding the higher-order 5 bits of the 8-bit tone data (i.e., elemCntr00 to elemCntr07, elemCntr12 to elemCntr19). In the 4-divided immediate tone regions, the corresponding counter's value is added to a result obtained by decoding the higher-order 3 bits of the 8-bit tone data (i.e., elemCntr08 to elemCntr11).

The other controls are executed in much the same way as the case of the 8-divided tone regions illustrated in FIG. 40. Namely, the accumulated 1-frame amount of luminance distribution results are updated (i.e., hist00 to hist19) in the timings of the vertical synchronization signals (inVsync). Also, similarly to the previously-described case, it is required that the size of the respective counters be presented assuming that the same tone data exist by the amount of 1 frame. Namely, the present example employs the XGA resolution, which requires the counters equivalent to the amount of the 1024×768=786432 pixels. This indicates that the 20-bit counters become necessary.

Figure 43:
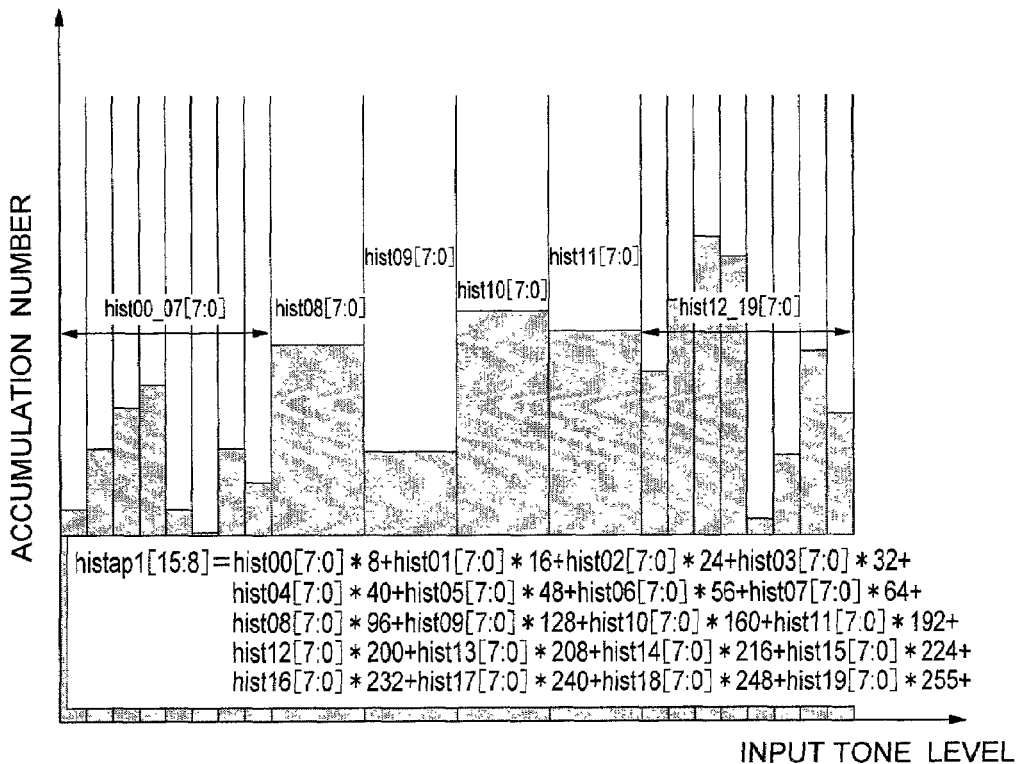
FIG. 43 is a schematic diagram for showing a luminance distribution detection result obtained by another embodiment that differs from the embodiment illustrated in FIG. 41 of the luminance distribution detection controlling unit according to the present invention, and an arithmetic-calculation formula for calculating a luminance average value from the detection result.

FIG. 43 illustrates a schematic diagram for showing the luminance distribution detection result in the case where the tone dividing control in accordance with FIG. 42 is executed, and an arithmetic-calculation formula for calculating the luminance average value from the detection result.

As illustrated in FIG. 43, in comparison with the case of the 8-divided tone regions illustrated in FIG. 41, the luminance distribution state makes it possible to detect the distribution states of the lower-order and the higher-order tone portions in more detail. Also, the luminance average value makes it possible to extract the per-frame screen brightness similarly to the case of the 8-divided tone regions illustrated in FIG. 41.

Figure 44:
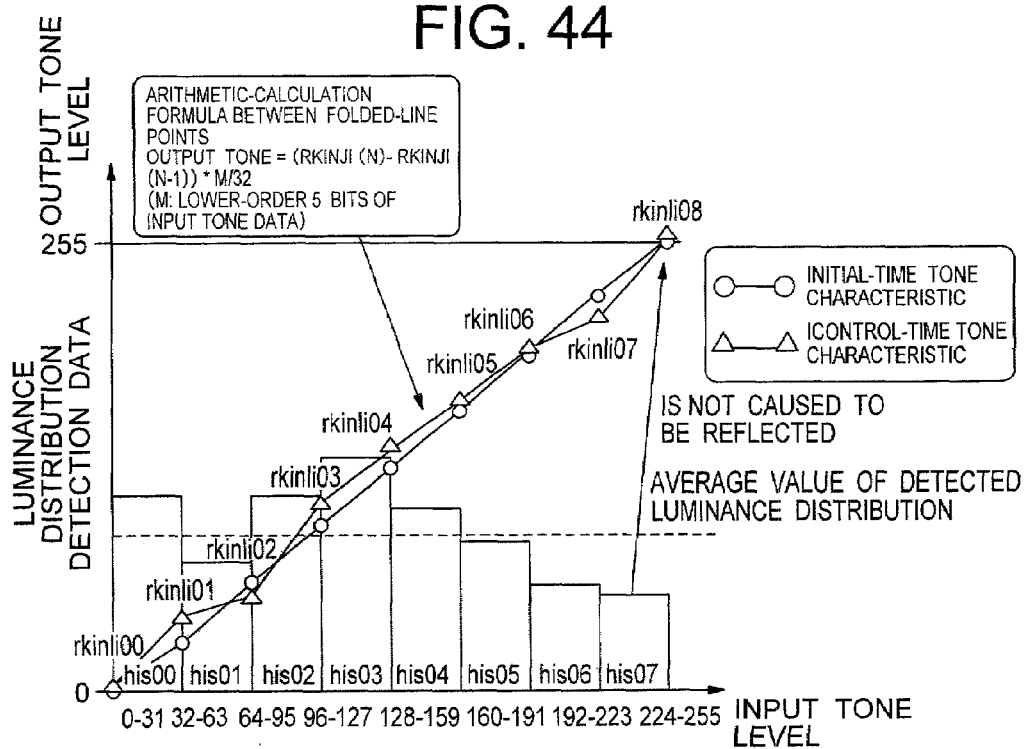
FIG. 44 is a diagram for illustrating the tone control by a folded-line point tone controlling unit according to the present invention.

FIG. 44 illustrates one example of the tone control performed by the above-described folded-line point tone controlling unit 3310 using the luminance distribution detection results illustrated in FIG. 40 and FIG. 42 at the time when the tone region is divided into the 8 regions.

In FIG. 44, in the tone control according to the folded-line point method, 9 folded-line points are set on the 1-frame basis first. Next, between the adjacent points, the input tone data inputted on a 1-dotclock basis is converted into output tone data in accordance with a straight-lined arithmetic-calculation formula, thereby, in real time, implementing the output tone data between the adjacent points. Here, in the case of the equally-8-divided tone regions, an arithmetic-calculation formula of the following formula 3 can be employed as the straight-lined arithmetic-calculation formula between the adjacent points:

$$\text{output tone data} = (rkinji(n) - rkinji(n-1)) \times M / 32 \quad \text{(formula 3)}$$

$rkinji(n)$: higher-order side folded-line point set values $rkinji(n-1)$: lower-order side folded-line point set values $M$: lower-order 5 bits of input tone data Here, the folded-line points are set as an example where the luminance distribution data illustrated in FIG. 41 is caused to be reflected so as to implement a higher picture-quality. The folded-line points are set in such a manner as to correspond to the luminance distribution accumulation number in each divided tone region. In this case, if the detected luminance distribution number in each tone region is larger as compared with an average value m (which, in the present example, is equal to a value obtained by dividing the 1-frame amount of pixel number by 8, i.e., the number of the divided tone regions) of the luminance distribution numbers within 1 frame, the distribution number in the tone region is judged to be larger than the average value. Based on this judgement, the higher-order side folded-line points are made larger as compared with the points (i.e., o points in the drawing) at the time of a linear characteristic. This procedure increases the dynamic range in the tone region, thereby making it possible to obtain the excellent picture-quality. Conversely, if the detected luminance distribution number in each region is smaller as compared with the average value m, the distribution number in the tone region is judged to be smaller than the average value, and the higher-order side folded-line points are made smaller as compared with the points (i.e., the o points in the drawing) at the time of the linear characteristic. Although this procedure decreases the dynamic range in the tone region, it can increase the dynamic ranges in the tone regions the luminance distribution numbers of which have exceeded the average value. This condition, eventually, enhances the contrasts of the regions occupying most of the distributions as the screen as a whole, thereby allowing the excellent picture-quality to be obtained.

Figure 45:
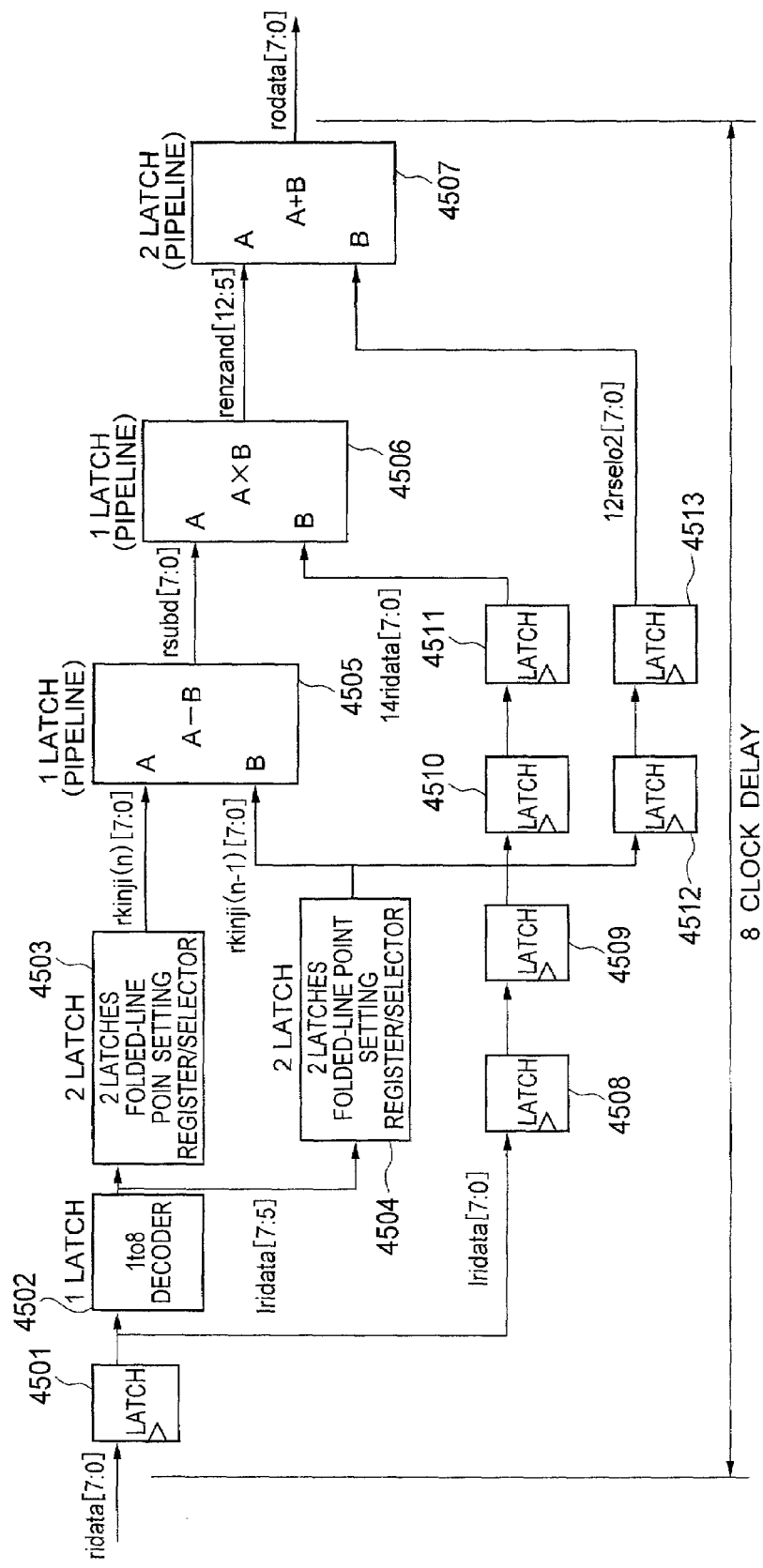
FIG. 45 is a schematic configuration diagram of the folded-line point tone controlling unit according to the present invention.

FIG. 45 is a schematic configuration diagram of the folded-line point tone controlling unit 3310 using the luminance distribution detection result illustrated in FIG. 44 at the time when the tone region is divided into the 8 regions.

In FIG. 45, the reference numerals denote the following configuration components: 4501 a latch circuit 1 for latching the input image data, 4502 a 1-to-8 decoder circuit by the higher-order 3 bits out of output image data from the latch circuit 1 4501, 4503 a higher-order tone side folded-line point setting register/selector circuit, 4504 a lower-order tone side folded-line point setting register/selector circuit, 4505 a subtraction circuit for subtracting a selected value by the lower-order tone side folded-line point setting register/selector circuit 4504 from a selected value by the higher-order tone side folded-line point setting register/selector circuit 4503, 4506 a multiplication circuit for multiplying, by an output result from the subtraction circuit 4505, a value obtained by delaying the output from the latch circuit 1 4501 with the use of latch circuits 2 to 5 4508 to 4511, and 4507 an addition circuit for adding, to an output result from the multiplication circuit 4506, a value obtained by delaying the output from the lower-order tone side folded-line point setting register/selector circuit 4504 with the use of latch circuits 6, 7 4512, 4513.

The controlling circuits illustrated in FIG. 45 play a role of implementing the straight-lined formula between the respective folded-line points illustrated in FIG. 44. In the controlling circuits, the higher-order tone side folded-line point setting register/selector circuit 4503 and the lower-order tone side folded-line point setting register/selector circuit 4504 set the folded-line point set values corresponding to the luminance distribution state (i.e., rkinji00 to rkinji08) while updating the folded-line point set values on the 1-frame basis. Consequently, when the per-pixel image data (i.e., ridata [7:0]) is inputted, the controlling units select 2 adjacent folded-line point set values so as to perform the arithmetic-calculation between the selected 2 tones, then outputting the image data (i.e., rodata [7:0]). There exists an 8-clock delay from the inputting of the input image data (i.e., ridata [7:0]) to the obtaining of the output image data (i.e., rodata [7:0]).

The present control permits an optimum tone control to be executed in harmony with the characteristics of the per-frame image data.

Figure 46:
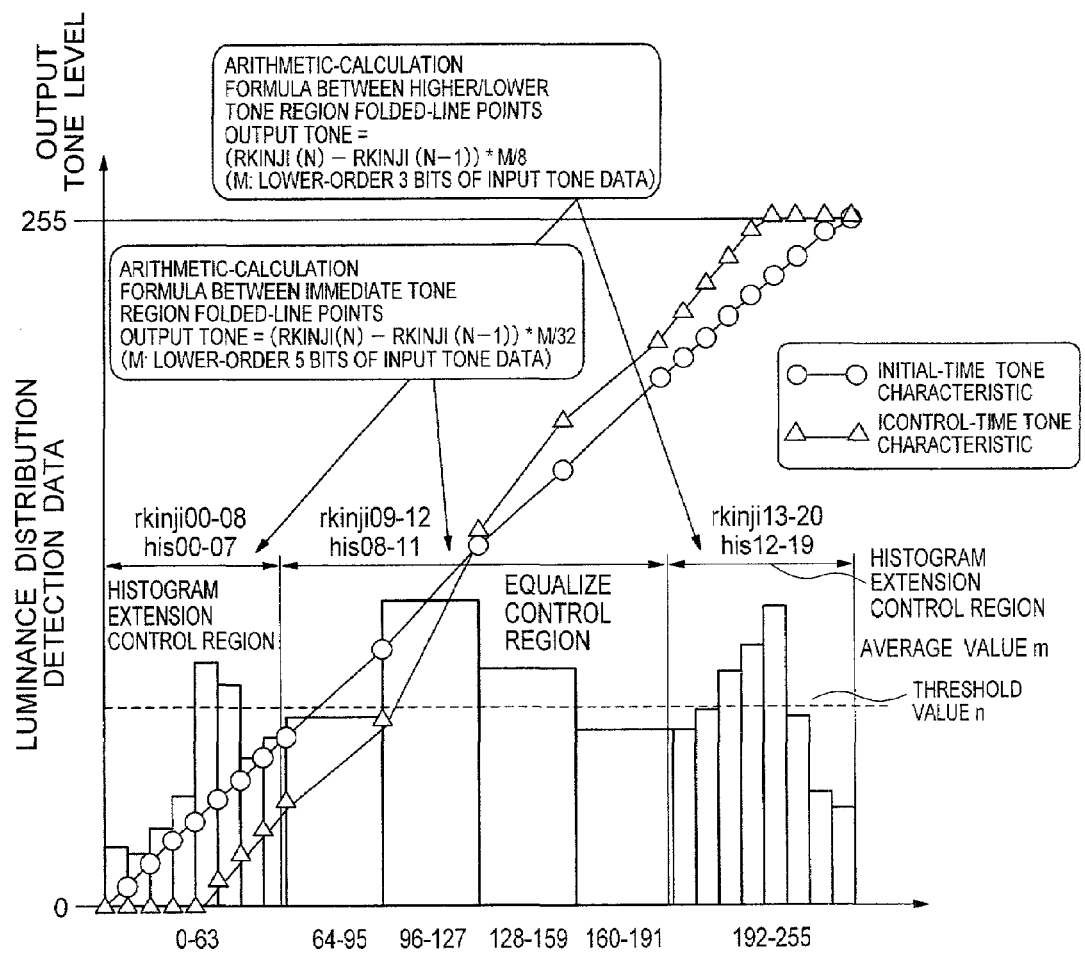
FIG. 46 is a diagram for illustrating the tone control by another embodiment that differs from the embodiment illustrated in FIG. 44 of the folded-line point tone controlling unit according to the present invention.

FIG. 46 illustrates one example of the tone control performed by the folded-line point tone controlling unit 3310 using the luminance distribution detection result illustrated in FIG. 43 at the time when the tone region is divided into the 20 regions.

In FIG. 46, in the tone control according to the folded-line point method, 20 folded-line points are set on the 1-frame basis first. Next, between the adjacent points, the input tone data inputted on a 1-dotclock basis is converted into output tone data in accordance with a straight-lined arithmetic-calculation formula, thereby, in real time, implementing the output tone data between the adjacent points. Here, the straight-lined arithmetic-calculation formula between the adjacent points differs between the case of the equally-8-tone-basis-divided lower-order and higher-order tone regions (i.e., hist00 to hist08, hist12 to hist19) and the case of the 32-tone-basis-divided immediate tone regions (i.e., hist08 to hist11). In the cases, arithmetic-calculation formulae of the following formulae 4, 5 can be employed, respectively:

$$\text{output tone data} = (rkinji(n) - rkinji(n-1)) \times M / 8 \quad \text{(formula 4)}$$

$rkinji(n)$: higher-order side folded-line point set values $rkinji(n-1)$: lower-order side folded-line point set values $M$: lower-order 3 bits of input tone data $$\text{output tone data} = (rkinji(n) - rkinji(n-1)) \times M / 32 \quad \text{(formula 5)}$$

$rkinji(n)$: higher-order side folded-line point set values $rkinji(n-1)$: lower-order side folded-line point set values $M$: lower-order 5 bits of input tone data Accordingly, as an example where the luminance distribution data illustrated in FIG. 43 is caused to be reflected so as to implement a higher picture-quality, performing a 2-step tone control allows the implementation. The 1st step tone control is as follows: With respect to the lower-order and the higher-order tone regions divided on the 8-tone basis, the usage frequencies on the 1-frame basis are confirmed from the outer regions, respectively (i.e., hist00 in the lower-order tone region, hist19 in the higher-order tone region), thereby determining tone regions that can be crushed. Namely, the accumulation values are compared with a predetermined threshold value of the tone accumulation numbers from the outside of the respective tone regions, then crushing the tones up to a region that has exceeded the threshold value. In the lower-order tone region in FIG. 46, since hist04 has exceeded the threshold value n, the distribution frequencies of the tones prior thereto are judged to be smaller. Thus, 5 folded-line points from the lowest (i.e., rkinji00 to rkinji04) are set to be "0 tone". Similarly, in the higher-order tone region, since hist17 has exceeded the threshold value n, the distribution frequencies of the tones prior thereto are judged to be smaller. Thus, 4 folded-line points from the highest (i.e., rkinji17 to rkinji20) are set to be "255 tones". Instead of crushing the portions existing at both of the tone ends and having the smaller accumulation numbers, this 1st step tone control makes it possible to extend the dynamic ranges in the remaining tone regions. Also, in the present example, as the judging criterion for the tone regions to be crushed, the comparison with the threshold value n has been executed for each tone region independently. An algorithm for crushing the tone regions, however, is made available in a large variety of ways by the combination with the software processing, such as the comparison between the accumulation values from the tone regions at both ends and the threshold value n. In addition to the dynamic range's extension in the entire tone region by the 1st step, the 2nd step tone control is as follows: As having been explained in FIG. 44, the comparison with the luminance distribution average value m is performed for each distribution tone region. If the comparison result is larger, the higher-order side folded-line point set values are set to be larger as compared with the values (i.e., o points in the drawing) at the time of the linear characteristic so that the dynamic range in the tone region will be extended even further. Also, if the comparison result is smaller, the higher-order side folded-line point set values are set to be smaller as compared with the values at the time of the linear characteristic so that the dynamic range in the tone region will be reduced. FIG. 46 illustrates the one example where the 2-step tone control has been applied to the 32-tone-basis-divided immediate tone regions (i.e., rkinji09 to rkinji12). In FIG. 46, the extension control regions of the dynamic ranges by the 1st step are designated as histogram extension control regions, and the extension control region of the dynamic range by the 2nd step is designated as an equalize control region.

Also, the extension application range of the dynamic ranges by the 2-step is not limited to the 32-tone-basis-divided immediate tone regions (i.e., rkinji09 to rkinji12), and the 2-step may be applied to the 8-tone-basis-divided higher-order tone regions (i.e., rkinji04 to rkinji17 in FIG. 46).

As described above, the tone controlling method illustrated in FIG. 46 makes it possible to obtain an excellent display the dynamic range of which has been extended even further as well as to cover the tone controlling method illustrated in FIG. 44.

Figure 47:
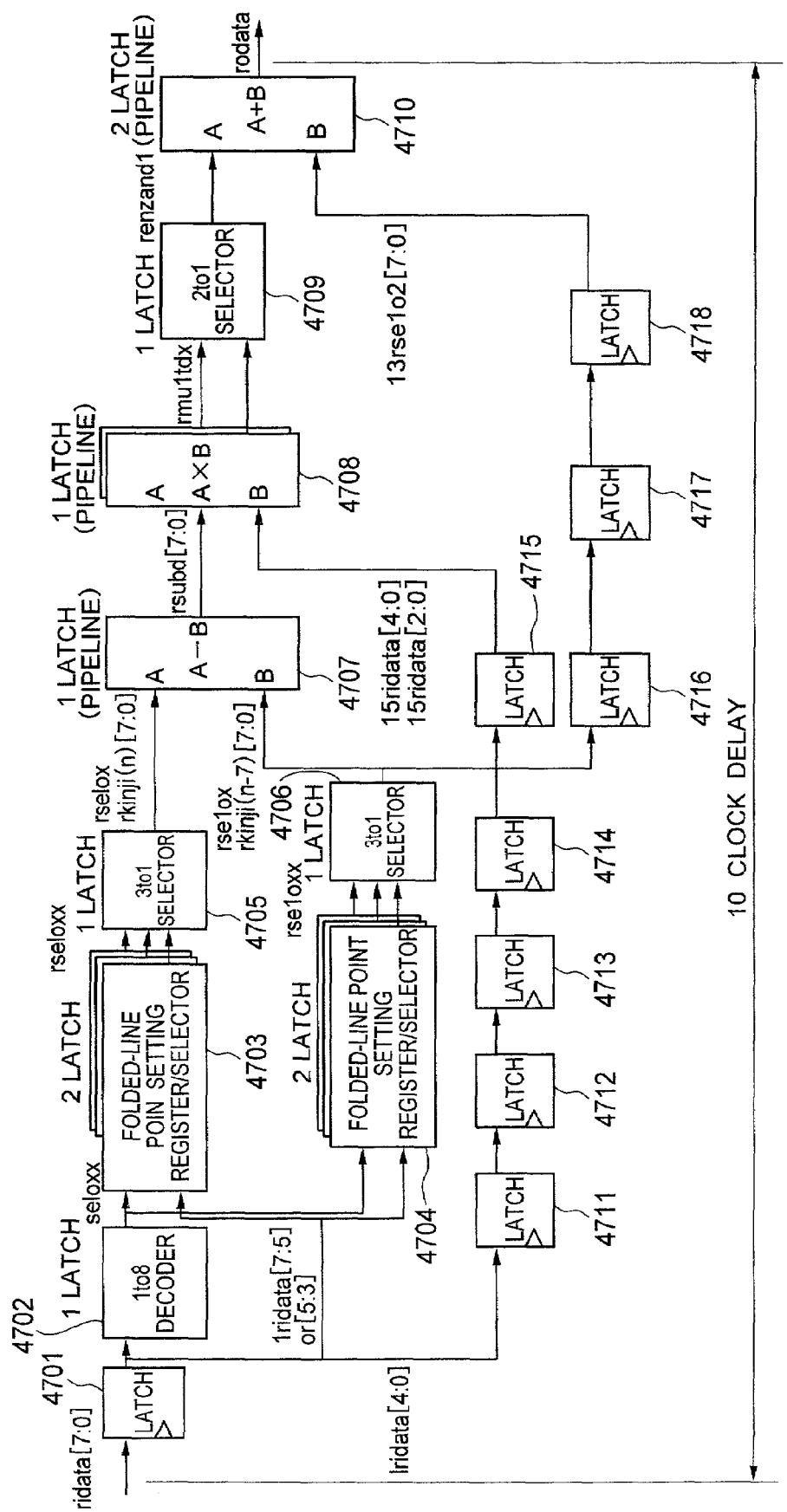
FIG. 47 is a schematic configuration diagram of another embodiment that differs from the embodiment illustrated in FIG. 45 of the folded-line point tone controlling unit according to the present invention.

FIG. 47 is a schematic configuration diagram of the above-described folded-line point tone controlling unit 3310 using the luminance distribution detection result illustrated in FIG. 46 at the time when the tone region is divided into the 20 regions.

In FIG. 47, the reference numerals denote the following configuration components: 4701 a latch circuit 1 for latching the input image data, 4702 a 1-to-8 decoder circuit by the higher-order 3 bits out of output image data from the latch circuit 1 4701, 4703 a higher-order tone side folded-line point setting register/selector circuit for the respective lower-order tone, immediate tone, and higher-order tone divided tone regions, 4704 a lower-order tone side folded-line point setting register/selector circuit for the respective lower-order tone, immediate tone, and higher-order tone divided tone regions, 4705 a 3-to-1 selector circuit for selecting one of outputs from the higher-order tone side folded-line point setting register/selector circuit 4703 for the respective lower-order tone, immediate tone, and higher-order tone 3-divided tone regions, 4706 a 3-to-1 selector circuit for selecting one of outputs from the lower-order tone side folded-line point setting register/selector circuit for the respective lower-order tone, immediate tone, and higher-order tone 3-divided tone regions, 4707 a subtraction circuit for subtracting the selected value by the lower-order tone side 3-to-1 selector circuit 4706 from the selected value by the higher-order tone side 3-to-1 selector circuit 4705, 4708 a multiplication circuit separated into 2 channels of the lower-order and higher-order tones and the immediate tone for multiplying, by an output result from the subtraction circuit 4707, a value obtained by delaying the output from the latch circuit 1 4701 with the use of latch circuits 2 to 6 4711 to 4714, 4709 a 2-to-1 selector circuit for selecting either of output results from the 2-channel multiplication circuit 4708, and 4710 an addition circuit for adding, to the output from the 2-to-1 selector circuit 4709, a value obtained by delaying the output from the lower-order tone side 3-to-1 selector circuit 4706 with the use of latch circuits 7 to 9, 4716 to 4718.

As is the case with the controlling circuits illustrated in FIG. 45, the controlling circuits illustrated in FIG. 47 play a role of implementing the straight-lined formula between the respective folded-line points illustrated in FIG. 46. In the controlling circuits, the higher-order tone side folded-line point setting register/selector circuit 4703 and the lower-order tone side folded-line point setting register/selector circuit 4704 set the folded-line point set values corresponding to the luminance distribution state (i.e., rkinji00 to rkinji20) while updating the folded-line point set values on the 1-frame basis. Consequently, when the per-pixel image data (i.e., ridata [7:0]) is inputted, the controlling units select 2 adjacent folded-line point set values so as to perform the arithmetic-calculation between the selected 2 tones, then outputting the image data (i.e., rodata [7:0]). There exists a 10-clock delay from the inputting of the input image data (i.e., ridata [7:0]) to the obtaining of the output image data (i.e., rodata [7:0]). Accordingly, the present control also permits the optimum tone control to be executed in harmony with the characteristics of the per-frame image data.

Next, the explanation will be given below regarding the luminance control and an improving control over the motion-frame picture blur with the use of the digital backlight light-dimmer signal 3325 and the backlight ON/OFF signal 3326 illustrated in FIG. 33.

Figure 48:
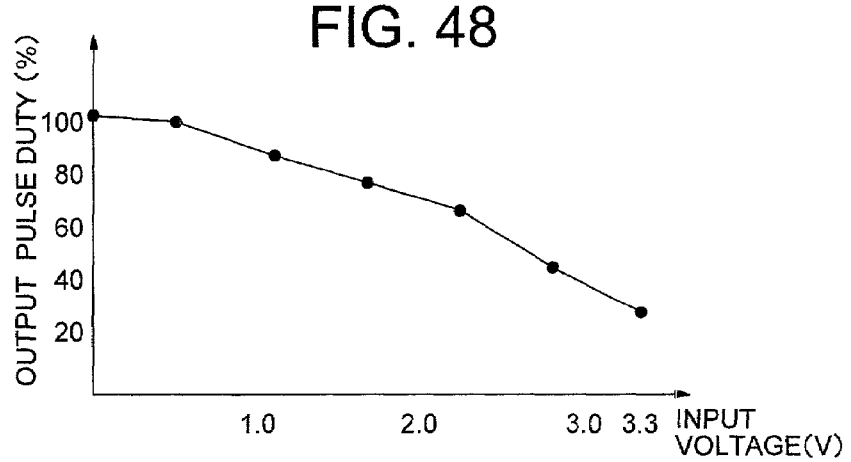
FIG. 48 illustrates an example of a light-dimmer characteristic diagram in an inverter board according to the present invention.

FIG. 48 illustrates an example of the light-dimmer characteristic diagram in the above-described inverter board 3103. The voltage as an input is made variable from 0 V to 3.3 V, and the duty ratio of an output pulse is changed in response to the voltage. Namely, the lower the input voltage becomes, the larger the pulse-width duty ratio becomes and conversely, the higher the input voltage becomes, the smaller the pulse-width duty ratio becomes. Since the duty ratio corresponds to the ON/OFF of the backlight, the backlight becomes brighter as the voltage level becomes lower and conversely, the backlight becomes darker as the voltage level becomes higher. Consequently, the digital backlight light-dimmer signal 3325 from the above-described backlight light-dimmer controlling unit 3323 is controlled in the scheme illustrated in Tables 5, 6 and in FIG. 37, then being fed into the above-described D/A converter 3215. Based on the analogue backlight light-dimmer signal 3327 outputted from the D/A converter 3215 in this way, the light-dimmer control is executed with the inverter board's characteristic illustrated in FIG. 48.

Figure 49:
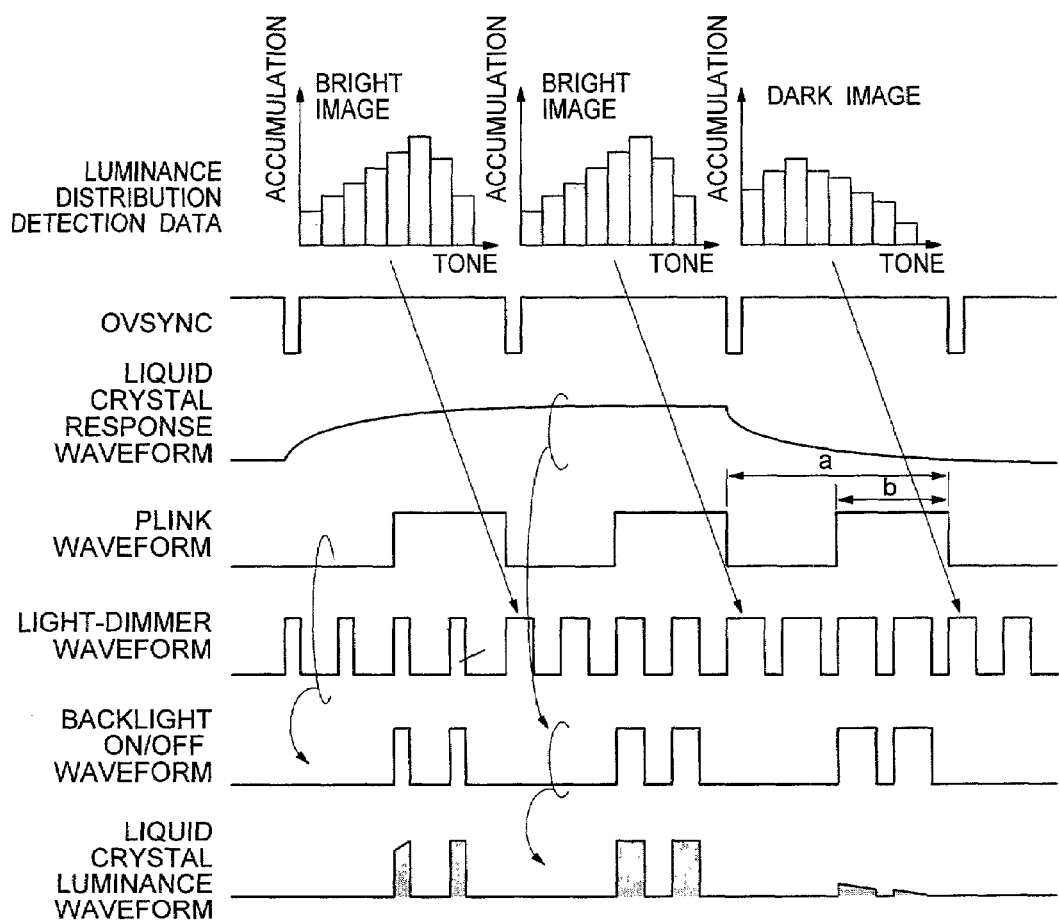
FIG. 49 illustrates an example of the luminance control and the motion-frame picture's blur improving control by a backlight light-dimmer controlling unit and a blink controlling unit according to the present invention.

FIG. 49 illustrates an example of the luminance control and the improving control over the motion-frame picture blur by the backlight light-dimmer controlling unit 3323 and the blink controlling unit 3324. In the present example, the explanation will be given regarding the case where the light-dimmer control and the blink control are executed using the control signals independent of each other.

FIG. 49 is a diagram for illustrating the case where, with respect to the continuous per-frame image data, the luminance distribution data outputted from the above-described luminance distribution detection controlling unit 3308 are transferred in the order of a bright image→a bright image→a dark image.

In general, when displaying a motion-frame picture with a liquid crystal display apparatus, if the motion-frame picture is a bright image, the motion-frame picture blur phenomenon that accompanies the response-rate exceeding 1 frame becomes less conspicuous and worrying as compared with the case of a dark image. Conversely, if, taking the motion-frame picture blur into consideration, the blink pulse-width for the bright image is narrowed, the bright image is converted into a dark image, which, subjectively, will become conspicuous and worrying. Accordingly, the voltage level of the analogue backlight light-dimmer signal 3327 is lowered for the bright image, thereby increasing the pulse-width duty ratio of the light-dimmer waveform for the backlight. Conversely, the voltage level of the analogue backlight light-dimmer signal 3327 is heightened for the dark image, thereby decreasing the pulse-width duty ratio of the light-dimmer waveform for the backlight. Also, the present control causes the luminance distribution data to be reflected onto the next frame detected. This is expressed by the relationship between the luminance distribution detection data and the light-dimmer waveform. Moreover, the blink control is executed in order to improve the motion-frame picture blur phenomenon resulting from the fact that the response-rate necessitates a time of the 1-frame time-period or more. In FIG. 49, the target is set onto a lower screen portion of the display screen, and the control is performed so that the blink waveform is switched ON in the latter-half of the 1-frame time-period. Namely, in FIG. 49, assuming that the time needed for the 1-frame time-period is equal to "a" and the time during which the blink waveform is kept ON in the latter-half of the 1-frame time-period is equal to "b", the blink waveform duty ratio becomes equal to a ratio of "b:a", which will be fixed in the present example. The blink controlling unit 3324 in FIG. 33 executes the present control, using the vertical reference timing signal 3305 from the timing control unit 3303. The actual backlight ON/OFF waveform turns out to become a waveform resulting from superimposing the blink waveform for the motion-frame picture blur improving control on the light-dimmer waveform for the light-dimmer control. The liquid crystal luminance waveform based on this waveform turns out to become the sloped-line portions in FIG. 49. This lengthens the light-emission time of the luminance waveform if the luminance distribution detection data is judged to be of the bright image (conversely, this shortens the light-emission time of the luminance waveform if the luminance distribution detection data is judged to be of the dark image). Also, it turns out that the light-emissions occur in the stationary timings of the liquid crystal response waveform (no light-emissions occur in the transient timings). This condition makes it possible to obtain an excellent display state without the motion-frame picture blur.

Figure 50:
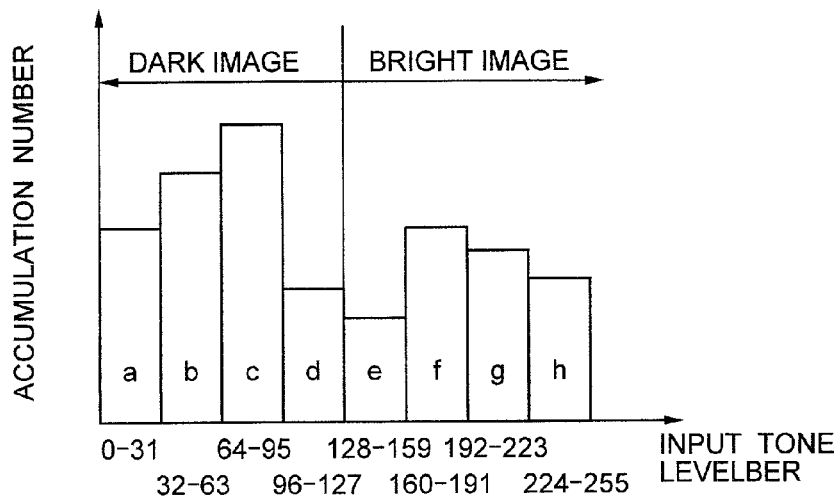
FIG. 50 illustrates an example of the image judgement based on the luminance distribution detection data according to the present invention.

FIG. 50 illustrates an example of the image judgement based on the luminance distribution detection data in the example illustrated in FIG. 49. FIG. 50 illustrates the luminance distribution detection data in the case where, as illustrated in FIG. 41, the entire tone region is equally divided into the 8 regions and the resolution of the input image data is set to be the XGA size (i.e., 1024×768). In this case, the number of the pixels by the amount of 1 frame is given by the following formula (i.e., formula 6):

$$1-\text{frame total pixel number} = \\ 1024 \text{ dots} \times 768 \text{ lines} = 786432 = \text{C0000h}$$ (formula 6)

Here, in order to suppress the circuit size, the judgement is performed employing only the higher-order bits of the detected data. In the case of FIG. 50, the higher-order 8 bits are employed. The higher-order 8 bits become "C0h" in the hexadecimal number system, and become "192" in the decimal number system. Consequently, the average point number in the respective equally-8-divided tone regions becomes equal to 24 points. In the present example, as illustrated in FIG. 50, if, as the image judging condition, the point numbers in the respective tone regions e, f, g, and h (i.e., 128 to 159, 160 to 191, 192 to 223, and 224 to 255 tones) are each larger than any one of 48, 40, 32, and 24 points, the case is judged to be of the bright image, and all the cases other than the above-described condition are judged to be of the dark image.

Figure 51:
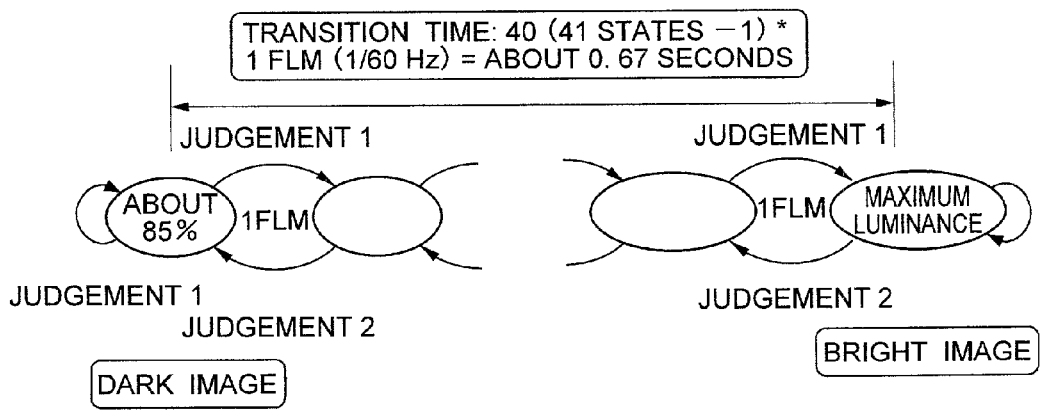
FIG. 51 illustrates an example of a state transition diagram of the light-dimmer control in accordance with an image judging condition's example according to the present invention.

FIG. 51 illustrates an example of a state transition diagram of the light-dimmer control in accordance with the image judging condition's example illustrated in FIG. 50.

In the present example illustrated in FIG. 51, the light-dimmer control is performed in a light-dimmer range ranging from a maximum luminance to a minimum luminance that is set to be 85% of the maximum luminance. Between both of the luminances, the transition is performed for each frame in accordance with the image judging condition illustrated in FIG. 50. The transition time from the maximum luminance to the minimum luminance or from the minimum luminance to the maximum luminance is set to necessitate 40 frames (i.e., about 0.67 seconds in the case where the 1 frame is of 60 Hz) at the minimum. This is intended to prevent the occurrence of a flicker. Here, the flicker occurs by the control such that, when the bright images and the dark images are inputted alternately for each frame, the transition is performed between the maximum and the minimum luminances in the 1 frame. Consequently, at a point-in-time when the image judging condition is inverted halfway during the transition, the transition moves in the opposite direction at the point-in-time.

As having been described so far, the light-dimmer waveform control illustrated in FIG. 49 is executed in accordance with the light-dimmer controlling algorithms illustrated in FIGS. 50 and 51.

Figure 52:
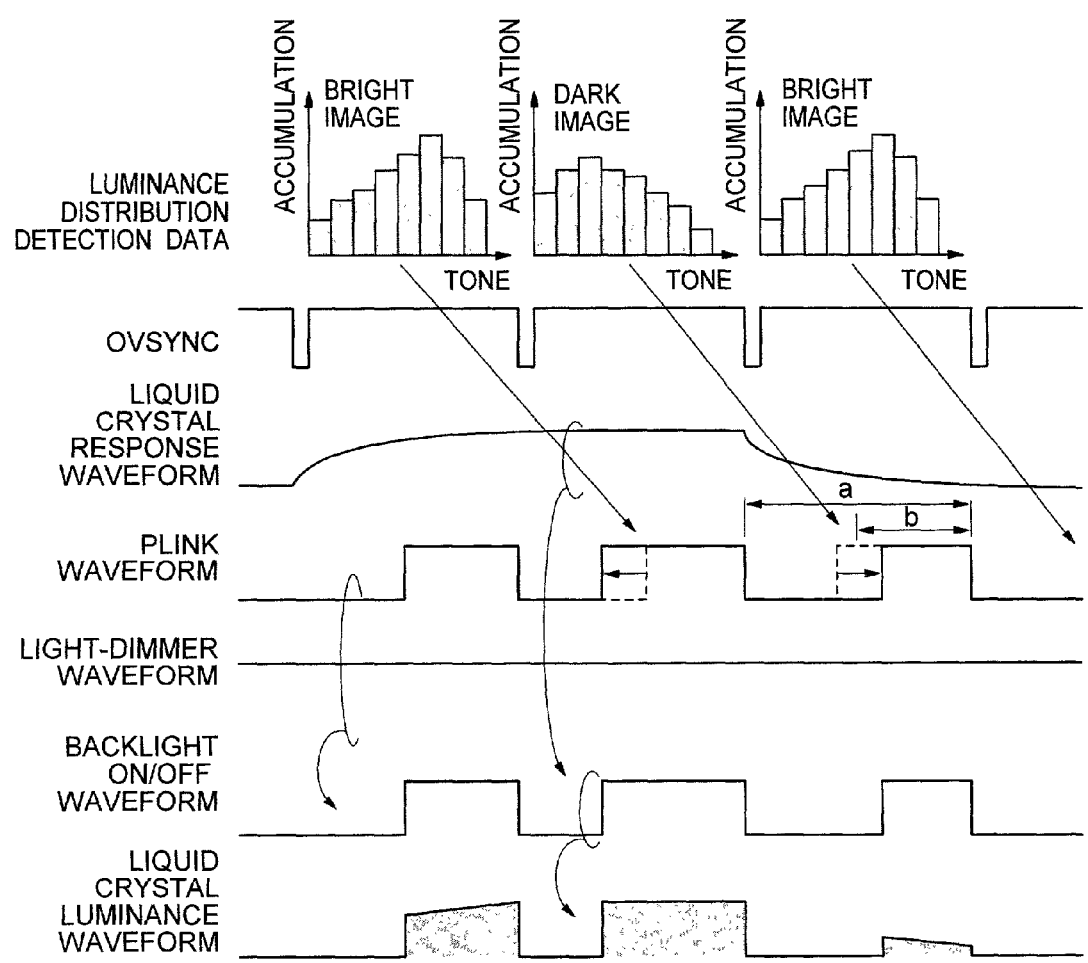
FIG. 52 illustrates an example of the luminance control and the motion-frame picture's blur improving control by another embodiments that differs from the embodiments illustrated in FIG. 49 of the backlight light-dimmer controlling unit and the blink controlling unit according to the present invention.

FIG. 52 illustrates another example that differs from the example illustrated in FIG. 49 of the luminance control and the motion-frame picture blur improving control by the backlight light-dimmer controlling unit 3323 and the blink controlling unit 3324.

In the example illustrated in FIG. 49, the final liquid crystal luminance waveform has become the waveform resulting from superimposing the blink waveform by the blink controlling unit 3324 on the light-dimmer waveform by the backlight light-dimmer controlling unit 3323. In contrast to this, in the present example, the control over the light-dimmer waveform by the backlight light-dimmer controlling unit 3323 is not executed. Instead, the light-dimmer waveform is always maintained in the maximum luminance state, and the light-dimmer control corresponding to the luminance distribution detection data is executed together with the blink control by the blink controlling unit 3324. Namely, the control signal from the backlight light-dimmer controlling unit 3323 is controlled so that the output pulse duty always becomes equal to 100% from the light-dimmer characteristic diagram in the inverter board 3103 illustrated in FIG. 48. Next, the blink controlling unit 3324, as the example of improving the motion-frame picture blur, sets the target onto the lower screen portion of the display screen, then performing the control so that the blink waveform is switched ON in the latter-half of the 1-frame. Moreover, the blink controlling unit modifies the pulse-width of the blink waveform in correspondence with the state of the luminance distribution detection data. In the example in FIG. 52, the image data are inputted in the order of "the bright image→the dark image→the bright image". Consequently, the pulse-width of the blink waveform is widened for the bright image in the next frame, and the pulse-width of the blink waveform is narrowed for the dark image in the next frame. Furthermore, in the example in FIG. 52, the blink pulse-width in the backward edge of the pulse is fixed, and the modification of the blink pulse-width duty is executed in the forward edge thereof. As a result, assuming that the time needed for the 1-frame time-period is equal to "a" and the time during which the blink waveform is kept ON in the latter-half of the 1-frame is equal to "b", the blink waveform duty ratio becomes equal to a ratio of "b:a", which is varied in correspondence with the luminance distribution detection data. Also, according to the present example, only the backlight ON/OFF control suffices as the interface for the inverter board 3103. Accordingly, it can be said that the present controlling function has a general versatility.

Figure 53:
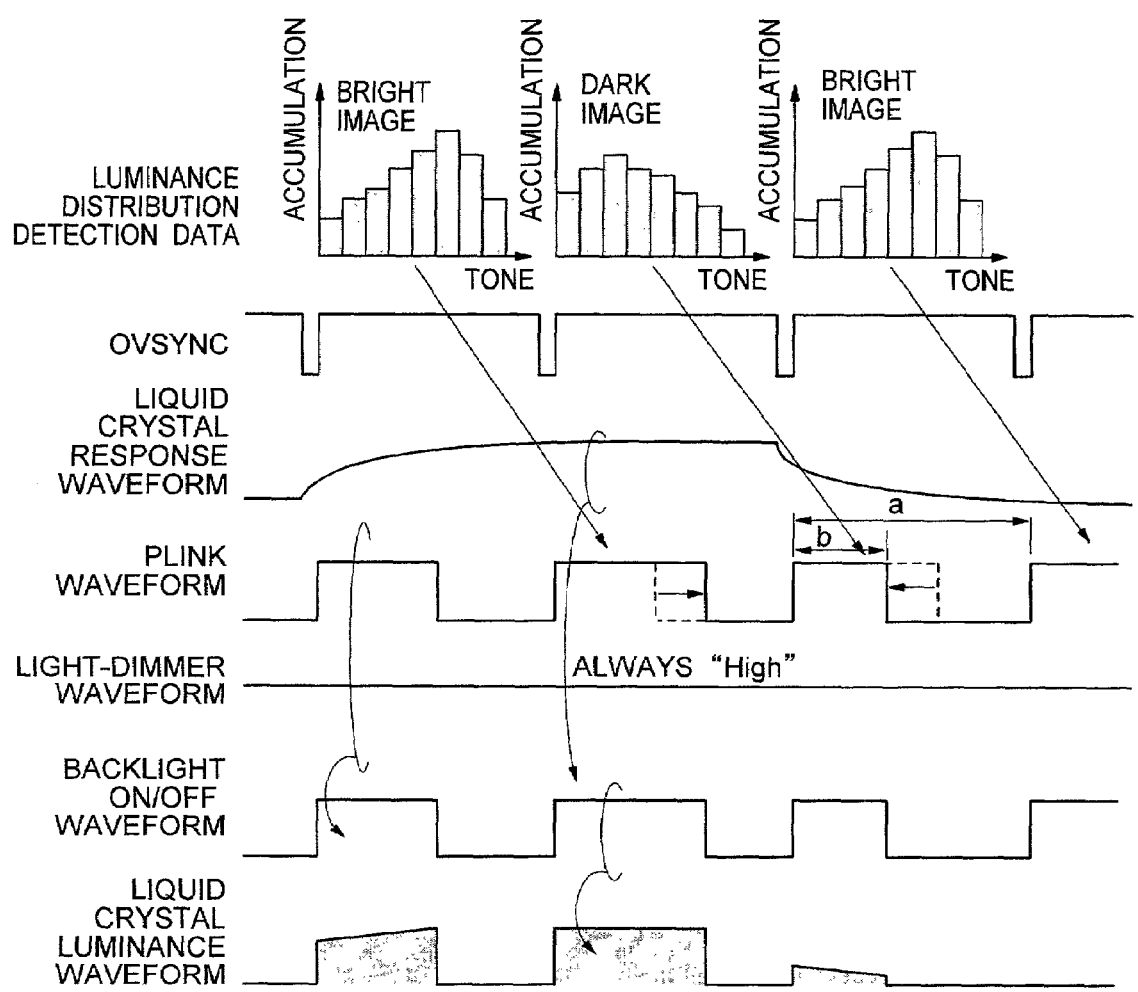
FIG. 53 illustrates an example of the luminance control and the motion-frame picture's blur improving control by another embodiments that differs from the embodiments illustrated in FIGS. 49 and 52 of the backlight light-dimmer controlling unit and the blink controlling unit according to the present invention.

FIG. 53 illustrates another example that differs from the examples illustrated in FIGS. 49 and 52 of the luminance control and the motion-frame picture blur improving control by the backlight light-dimmer controlling unit 3323 and the blink controlling unit 3324.

In the example illustrated in FIG. 53, in contrast to the example illustrated in FIG. 52, concerning the modification of the blink pulse-width duty for the blink waveform controlled in accordance with the luminance distribution detection data, the blink pulse-width in the forward edge of the pulse is fixed, and the modification is executed in the backward edge thereof. Namely, in FIG. 53, the blink controlling unit 3324, as the example of improving the motion-frame picture blur, sets the target onto the upper screen portion of the display screen, then performing the control so that the blink waveform is switched ON in the former-half of the 1-frame. Moreover, the blink controlling unit modifies the pulse-width of the blink waveform in correspondence with the state of the luminance distribution detection data. The blink pulse-width in the forward edge of the pulse is fixed, and the modification of the blink pulse-width duty is executed in the backward edge thereof. As a result, as is the case with the example illustrated in FIG. 52, assuming that the time needed for the 1-frame time-period is equal to "a" and the time during which the blink waveform is kept ON in the former-half of the 1-frame is equal to "b", the blink waveform duty ratio becomes equal to a ratio of "b:a", which is varied in correspondence with the luminance distribution detection data. Also, in the present example as well, only the backlight ON/OFF control suffices as the interface for the inverter board 3103. Accordingly, it can be said that the present controlling function has a general versatility.

Figure 54:
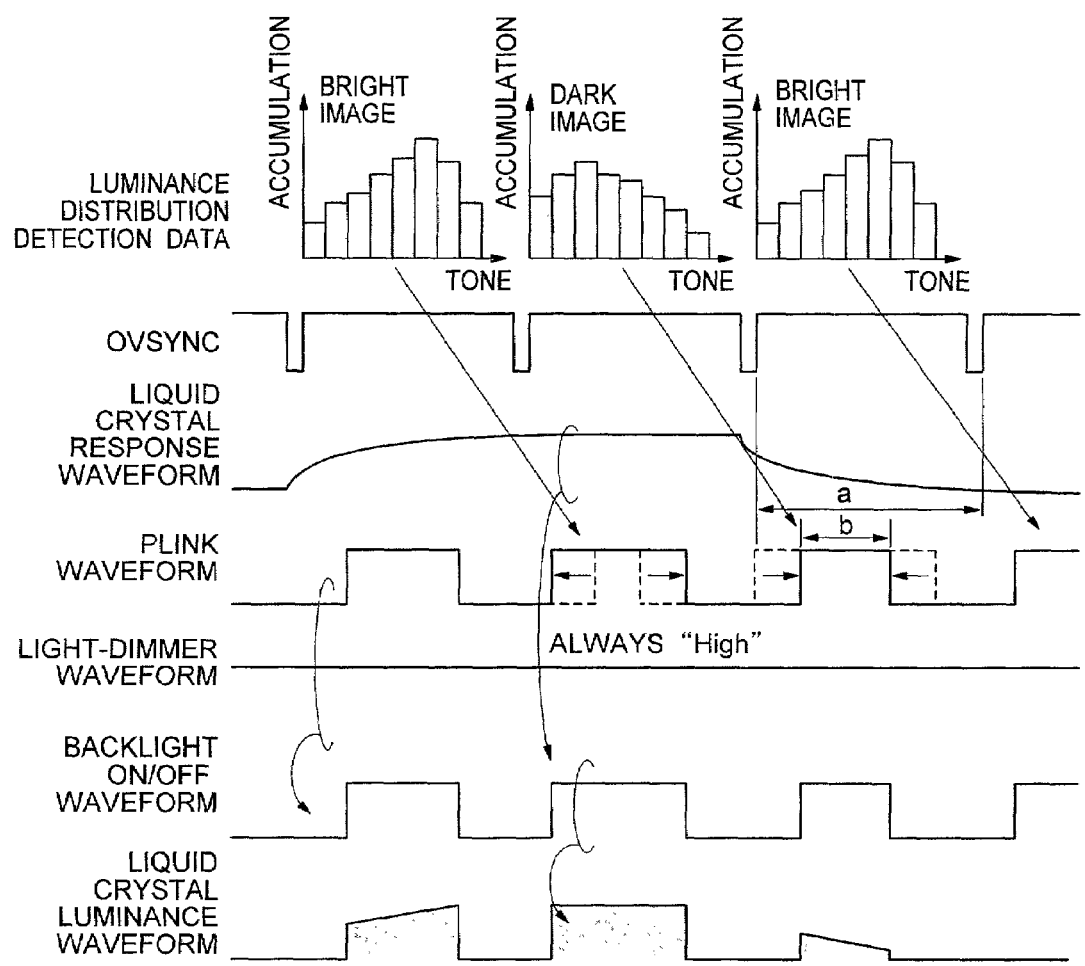
FIG. 54 illustrates an example of the luminance control and the motion-frame picture's blur improving control by another embodiments that differs from the embodiments illustrated in FIGS. 49, 52 and 53 of the backlight light-dimmer controlling unit and the blink controlling unit according to the present invention.

FIG. 54 illustrates another example that differs from the examples illustrated in FIGS. 49, 52, and 53 of the luminance control and the motion-frame picture blur improving control by the backlight light-dimmer controlling unit 3323 and the blink controlling unit 3324.

The present example has both of the examples in FIG. 52 and in FIG. 53. Namely, in FIG. 54, the blink controlling unit 3324, as the example of improving the motion-frame picture blur, sets the target onto the central screen portion of the display screen, then performing the control so that the blink waveform is switched ON in the intermediate region of the 1-frame. Moreover, the blink controlling unit modifies the pulse-width of the blink waveform in correspondence with the state of the luminance distribution detection data. The modification of the blink pulse-width duty is executed both in the forward edge of the pulse and in the backward edge thereof. As a result, as is the case with the examples illustrated in FIGS. 52 and 53, assuming that the time needed for the 1-frame time-period is equal to "a" and the time during which the blink waveform is kept ON in the intermediate region of the 1-frame is equal to "b", the blink waveform duty ratio becomes equal to a ratio of "b:a", which is varied in correspondence with the luminance distribution detection data. Also, in the present example as well, only the backlight ON/OFF control suffices as the interface for the inverter board 3103. Accordingly, the present controlling function has a general versatility.

Figure 55:
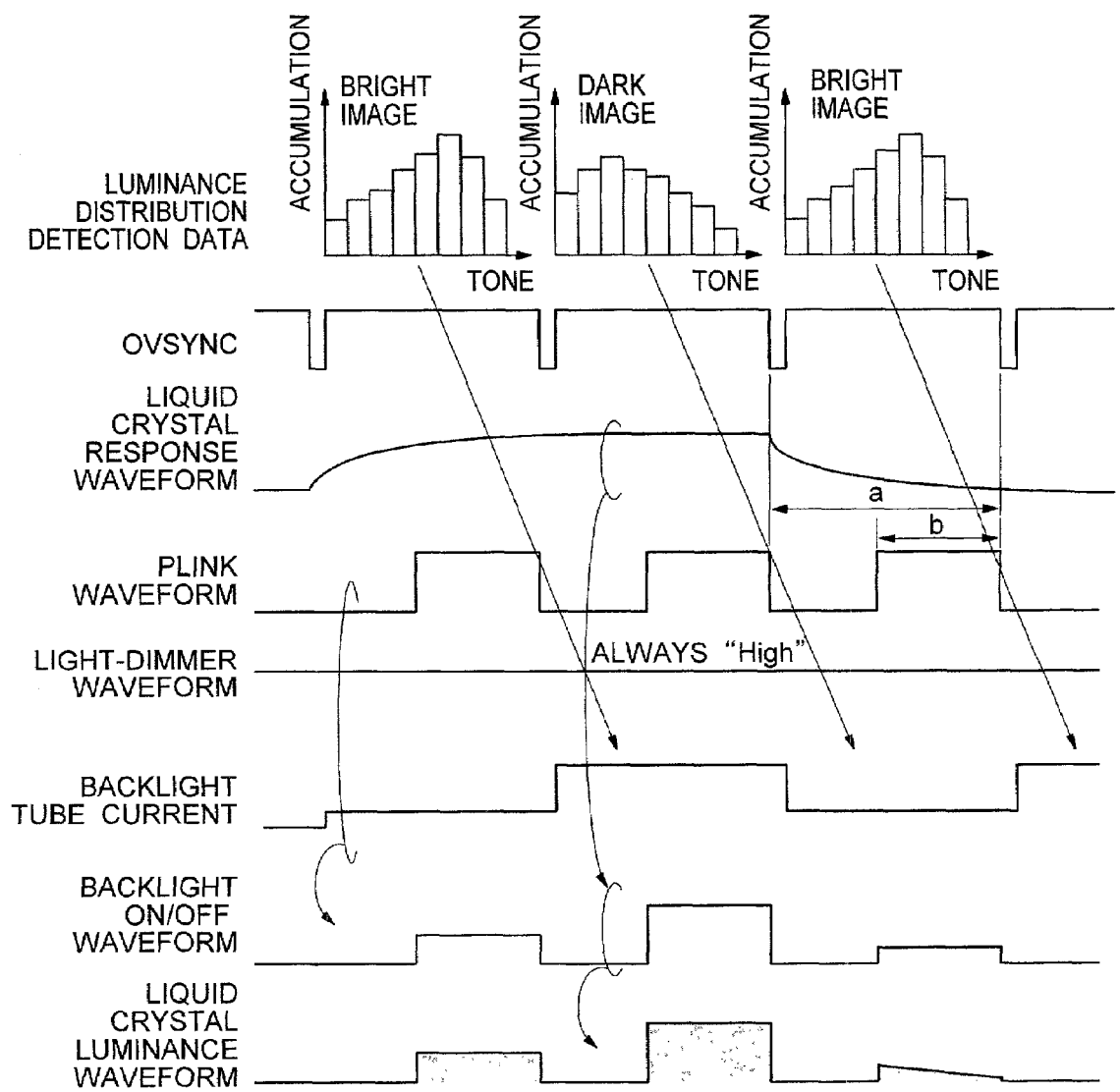
FIG. 55 illustrates an example of the luminance control and the motion-frame picture's blur improving control by another embodiments that differs from the embodiments illustrated in FIGS. 49, 52, 53 and 54 of the backlight light-dimmer controlling unit and the blink controlling unit according to the present invention.

FIG. 55 illustrates another example that differs from the examples illustrated in FIGS. 49, 52, 53, and 54 of the luminance control and the motion-frame picture blur improving control by the backlight light-dimmer controlling unit 3323 and the blink controlling unit 3324. In the above-described respective embodiments, when focusing an attention on the improvement of the motion-frame picture blur, the addition of the light-dimmer control has made the liquid crystal luminance waveform differ from the blink waveform. For example, in the example illustrated in FIG. 49, an OFF time-period that accompanies the light-dimmer control has existed in the ON pulses of the blink waveform. In the examples illustrated in FIGS. 52 to 54, the light-dimmer control has changed the ON pulses of the blink waveforms set in the particular positions within a 1 screen in order to improve the motion-frame picture blur.

The example illustrated in FIG. 55, which improves these changes in the ON pulses, controls a backlight tube current as the light-dimmer control. Namely, concerning the improvement of the motion-frame picture blur, as is the case with the example illustrated in FIG. 49, the target is set onto the lower screen portion of the display screen, and the control is performed so that the blink waveform is switched ON in the latter-half of the 1-frame. Namely, in FIG. 55, assuming that the time needed for the 1-frame time-period is equal to "a" and the time during which the blink waveform is kept ON in the latter-half of the 1-frame is equal to "b", the blink waveform duty ratio becomes equal to a ratio of "b:a", which will be fixed in the present example. Concerning the light-dimmer control, if the luminance distribution detection data is judged to be of the bright image signal, the tube current quantity for the backlight is increased in the next frame, thereby enhancing the luminance. Also, if the luminance distribution detection data is judged to be of the dark image signal, the tube current quantity for the backlight is decreased in the next frame, thereby lowering the luminance. Based on the light-dimmer control by the backlight tube current quantity in accordance with the luminance distribution detection data, the present control makes it possible to fix, in whatever cases, the blink waveform for improving the motion-frame picture blur. This condition allows the stable motion-frame picture blur improving effect to be always obtained with respect to a particular region on the display screen.

The embodiments in the present invention allow the high-display-quality motion-frame picture display that exhibits the excellent light-emission efficiency and uniformity at a high-luminance of the lamps in correspondence with the movement speed of the image data.

Moreover, the embodiments in the present invention make it possible to change, in real time, the dynamic range in correspondence with the tone characteristic of the image data. This allows the high-display-quality motion-frame picture display that exhibits the excellent light-emission efficiency and uniformity at a high-luminance.

The present modes control the light-emission point-in-time or time-period of the light-source in correspondence with the movement amount or the luminance of the displayed image. This results in an effect of enhancing the luminance of the displayed image with a high-efficiency and suppressing the heat-liberation from the light-source.

Also, the present modes control the light-emission point-in-time or time-period of the light-source in response to the luminance of the displayed image and the response characteristic in the liquid crystal portion. This brings about an effect of improving the motion-frame picture blur.

Also, the present modes control the input/output tone characteristic in response to the luminance of the displayed image. This brings about an effect of enhancing the contrast.

What is claimed is:

1. A display apparatus for executing a display corresponding to display data to be inputted from the outside, comprising:
   a display panel,
   a light-source for illuminating said display panel, and
   a controlling circuit for controlling light-emission luminance of said light-source irrespective of red, green and blue data of said display data, said controlling circuit switching said light-source between a 1st light-emission luminance and 2nd light-emission luminance during one period for updating said display data to said display, and said controlling circuit changing a time ratio of said 1st light-emission luminance and that of said 2nd light-emission luminance during said one period in accordance with said display data,
   wherein said controlling circuit comprises:
   a data storing unit for storing said display data by the amount of at least 1 frame,
   a data comparing unit for comparing corresponding pixels between said display data stored in said data storing unit and said display data to be inputted, and
   a pulse controlling unit for outputting a signal in correspondence with a comparison result by said data comparing unit, said signal controlling said time ratio of said 1st light-emission luminance in said one period.

2. The display apparatus as claimed in claim 1, wherein said data storing unit employs, as a comparison pixel, a portion of all the pixels on said display panel so as to store said display data into said comparison pixel, said data comparing unit comparing said pixel data stored into said comparison pixel with said pixel data of said inputted data corresponding thereto.

3. The display apparatus as claimed in claim 2, wherein said comparison pixel is located at a predetermined position in a display unit of said display panel.

4. A display apparatus for executing a display in correspondence with display data to be inputted, comprising:
   a display panel,
   a light-source for illuminating said liquid crystal panel,
   a luminance distribution detection controlling circuit for detecting, in accordance with said image data to be inputted, luminance distribution data by the amount of at least 1 frame of said image data, and
   a tone controlling circuit for updating a set value in at least 1 specified tone position in accordance with said luminance distribution data, and for determining a tone characteristic between said updated respective set values on a 1-frame basis with the use of a predetermined arithmetic-calculation formula.

5. The display apparatus as claimed in claim 4, wherein the number of said specified tones and a spacing between said set tones, which are updated on the 1-frame basis with respect to a tone region, are settable values.

6. The display apparatus as claimed in claim 4, wherein the display apparatus is a liquid crystal display apparatus, and said display panel is a liquid crystal display panel.

7. The display apparatus for executing a display in correspondence with image data to be inputted, comprising:
   a display panel,
   a light-source for illuminating said display panel,
   a luminance distribution detection controlling circuit for detecting, in accordance with said image data to be inputted, luminance distribution data by the amount of at least 1 frame of said image data, and
   a light-source controlling circuit for controlling at least either of a light-emission time-period and a light-emission time of said light-source in accordance with said luminance distribution data:
   wherein said light-source controlling circuit controls said light-source light-emission time so that a light-source light-emission time for displaying image data becomes longer than a light-source light-emission time for displaying relatively darker image data, said image data being relatively brighter than predetermined image data.

8. The display apparatus as claimed in claim 7, wherein the display apparatus is a liquid crystal display apparatus, and said display panel is a liquid crystal display panel.

* * * * *